US007980596B2

(12) United States Patent
Labrec

(10) Patent No.: US 7,980,596 B2
(45) Date of Patent: *Jul. 19, 2011

(54) INCREASING THERMAL CONDUCTIVITY OF HOST POLYMER USED WITH LASER ENGRAVING METHODS AND COMPOSITIONS

(75) Inventor: Brian C. Labrec, North Oxford, MA (US)

(73) Assignee: L-1 Secure Credentialing, Inc., Billerica, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/687,270

(22) Filed: Jan. 14, 2010

(65) Prior Publication Data

US 2010/0181754 A1 Jul. 22, 2010

Related U.S. Application Data

(63) Continuation of application No. 10/677,092, filed on Sep. 30, 2003, now Pat. No. 7,728,048, which is a continuation-in-part of application No. 10/326,886, filed on Dec. 20, 2002, now abandoned.

(60) Provisional application No. 60/344,677, filed on Dec. 24, 2001, provisional application No. 60/344,675, filed on Dec. 24, 2001, provisional application No. 60/344,676, filed on Dec. 24, 2001, provisional application No. 60/471,429, filed on May 16, 2003, provisional application No. 60/500,204, filed on Sep. 3, 2003, provisional application No. 60/504,352, filed on Sep. 19, 2003.

(51) Int. Cl.
*B42D 15/10* (2006.01)
*B42D 15/00* (2006.01)
*B29C 65/00* (2006.01)
*C08F 2/42* (2006.01)

(52) U.S. Cl. ............... 283/75; 283/74; 283/77; 283/78; 283/79; 283/82; 283/86; 522/1; 522/2; 522/71; 522/81; 522/82; 156/244.16; 156/242; 156/243; 156/244.17; 156/244.18; 156/244.27; 156/277; 156/60; 40/124.01; 40/124.191; 428/29; 428/411.1; 428/412

(58) Field of Classification Search .................. 522/1, 2, 522/71, 81, 82; 156/23, 242, 243, 244.16, 156/244.17, 244.18, 244.27, 277, 60; 283/74, 283/75, 77, 78, 79, 82, 86; 40/124.01, 124.191; 428/29, 411.1, 412

See application file for complete search history.

(56) References Cited

U.S. PATENT DOCUMENTS

| | | |
|---|---|---|
| 3,153,166 A | 10/1964 | Thorton, Jr. et al. |
| 3,413,171 A | 11/1968 | Hannon |
| 3,569,619 A | 3/1971 | Simjian |
| 3,571,957 A | 3/1971 | Cumming et al. |
| 3,582,439 A | 6/1971 | Thomas |
| 3,601,913 A | 8/1971 | Pollock |
| 3,614,839 A | 10/1971 | Thomas |
| 3,647,275 A | 3/1972 | Ward |
| 3,665,162 A | 5/1972 | Yamamoto et al. |
| 3,703,628 A | 11/1972 | Philipson, Jr. |
| 3,737,226 A | 6/1973 | Shank |
| 3,758,970 A | 9/1973 | Annenberg |
| 3,802,101 A | 4/1974 | Scantlin |
| 3,805,238 A | 4/1974 | Rothfjell |
| 3,838,444 A | 9/1974 | Loughlin et al. |
| 3,845,391 A | 10/1974 | Crosby |
| 3,860,558 A | 1/1975 | Klemchuk |
| 3,914,877 A | 10/1975 | Hines |
| 3,922,074 A | 11/1975 | Ikegami et al. |
| 3,975,291 A | 8/1976 | Claussen et al. |
| 3,984,624 A | 10/1976 | Waggener |
| 4,035,740 A | 7/1977 | Schafer et al. |
| 4,051,374 A | 9/1977 | Drexhage et al. |
| 4,069,487 A | 1/1978 | Kasai et al. |
| 4,072,911 A | 2/1978 | Walther et al. |
| 4,096,015 A | 6/1978 | Kawamata et al. |
| 4,097,279 A | 6/1978 | Whitehead |
| 4,100,509 A | 7/1978 | Walther et al. |
| 4,119,361 A | 10/1978 | Greenaway |
| 4,131,337 A | 12/1978 | Moraw et al. |
| 4,171,766 A | 10/1979 | Ruell |
| 4,179,686 A | 12/1979 | Bonicalzi et al. |
| 4,225,967 A | 9/1980 | Miwa et al. |
| 4,230,990 A | 10/1980 | Lert, Jr. et al. |
| 4,231,113 A | 10/1980 | Blasbalg |

(Continued)

FOREIGN PATENT DOCUMENTS

CA 2235002 A1 12/1998

(Continued)

OTHER PUBLICATIONS

"Access Control and Copyright Protection for Images WorkPackage 8: Watermarking" Jun. 30, 1995, 46 pages.

(Continued)

*Primary Examiner* — Sanza L McClendon
(74) *Attorney, Agent, or Firm* — Mintz Levin Cohn Ferris Glovsky and Popeo, P.C.

(57) ABSTRACT the invention provides a composition having laser engraving properties, comprising a host material and a laser enhancing additive. The host material comprises a material, such as a polymer, modified by a first process, whereby the host material as modified by the first process has increased thermal conductivity as compared to the host material before the first process. The laser enhancing additive comprises a first quantity of at least one of copper potassium iodide ($CuKI_3$), Copper Iodide (CuI), potassium iodide (KI), sodium iodide (NaI), and aluminum iodide (AlI), and a second quantity of at least one substance selected from the group consisting of zinc sulfide (ZnS), barium sulfide (BaS), alkyl sulfonate, and thioester.

12 Claims, 13 Drawing Sheets

U.S. PATENT DOCUMENTS

| | | |
|---|---|---|
| 4,238,849 A | 12/1980 | Gassmann |
| 4,252,995 A | 2/1981 | Schmidt et al. |
| 4,256,900 A | 3/1981 | Raue |
| 4,270,130 A | 5/1981 | Houle et al. |
| 4,271,395 A | 6/1981 | Brinkmann et al. |
| 4,274,062 A | 6/1981 | Brinkmann et al. |
| 4,289,957 A | 9/1981 | Neyroud et al. |
| 4,301,091 A | 11/1981 | Schieder et al. |
| 4,304,809 A | 12/1981 | Moraw et al. |
| 4,313,197 A | 1/1982 | Maxemchuk |
| 4,313,984 A | 2/1982 | Moraw et al. |
| 4,317,782 A | 3/1982 | Eckstein et al. |
| 4,324,421 A | 4/1982 | Moraw et al. |
| 4,326,066 A | 4/1982 | Eckstein et al. |
| 4,338,258 A | 7/1982 | Brinkwerth et al. |
| 4,356,052 A | 10/1982 | Moraw et al. |
| 4,367,488 A | 1/1983 | Leventer et al. |
| 4,379,947 A | 4/1983 | Warner |
| 4,380,027 A | 4/1983 | Leventer et al. |
| 4,384,973 A | 5/1983 | Harnisch |
| 4,395,600 A | 7/1983 | Lundy et al. |
| 4,425,642 A | 1/1984 | Moses et al. |
| 4,450,024 A | 5/1984 | Haghiri-Tehrani et al. |
| 4,467,209 A | 8/1984 | Maurer et al. |
| 4,468,468 A | 8/1984 | Benninghoven et al. |
| 4,476,468 A | 10/1984 | Goldman |
| 4,506,148 A | 3/1985 | Berthold et al. |
| 4,507,346 A | 3/1985 | Maurer et al. |
| 4,510,311 A | 4/1985 | Eckstein |
| 4,523,508 A | 6/1985 | Mayer et al. |
| 4,523,777 A | 6/1985 | Holbein et al. |
| 4,527,059 A | 7/1985 | Benninghoven et al. |
| 4,528,588 A | 7/1985 | Lofberg |
| 4,529,992 A | 7/1985 | Ishida et al. |
| 4,532,508 A | 7/1985 | Ruell |
| 4,536,013 A | 8/1985 | Haghiri-Therani et al. |
| 4,544,181 A | 10/1985 | Maurer et al. |
| 4,547,804 A | 10/1985 | Greenberg |
| 4,551,265 A | 11/1985 | Brinkwerth et al. |
| 4,553,261 A | 11/1985 | Froessl |
| 4,590,366 A | 5/1986 | Rothfjell |
| 4,595,950 A | 6/1986 | Lofberg |
| 4,596,409 A | 6/1986 | Holbein et al. |
| 4,597,592 A | 7/1986 | Maurer et al. |
| 4,597,593 A | 7/1986 | Maurer |
| 4,617,216 A | 10/1986 | Haghiri-Tehrani et al. |
| 4,621,271 A | 11/1986 | Brownstein |
| 4,629,215 A | 12/1986 | Maurer et al. |
| 4,637,051 A | 1/1987 | Clark |
| 4,652,722 A | 3/1987 | Stone et al. |
| 4,653,775 A | 3/1987 | Raphael et al. |
| 4,653,862 A | 3/1987 | Morozumi |
| 4,654,290 A | 3/1987 | Spanjer |
| 4,654,867 A | 3/1987 | Labedz et al. |
| 4,660,221 A | 4/1987 | Dlugos |
| 4,663,518 A | 5/1987 | Borror et al. |
| 4,665,431 A | 5/1987 | Cooper |
| 4,670,882 A | 6/1987 | Telle et al. |
| 4,672,605 A | 6/1987 | Hustig et al. |
| 4,672,891 A | 6/1987 | Maurer et al. |
| 4,675,746 A | 6/1987 | Tetrick et al. |
| 4,677,435 A | 6/1987 | Causse D'Agraives et al. |
| 4,682,794 A | 7/1987 | Margolin |
| 4,687,526 A | 8/1987 | Wilfert |
| 4,689,477 A | 8/1987 | Goldman |
| 4,703,476 A | 10/1987 | Howard |
| 4,711,690 A | 12/1987 | Haghiri-Tehrani |
| 4,712,103 A | 12/1987 | Gotanda |
| 4,718,106 A | 1/1988 | Weinblatt |
| 4,723,072 A | 2/1988 | Naruse |
| 4,735,670 A | 4/1988 | Maurer et al. |
| 4,738,949 A | 4/1988 | Sethi et al. |
| 4,739,377 A | 4/1988 | Allen |
| 4,741,042 A | 4/1988 | Throop et al. |
| 4,748,452 A | 5/1988 | Maurer |
| 4,750,173 A | 6/1988 | Bluthgen |
| 4,751,525 A | 6/1988 | Robinson |
| 4,754,128 A | 6/1988 | Takeda et al. |
| 4,765,656 A | 8/1988 | Becker et al. |
| 4,766,026 A | 8/1988 | Lass et al. |
| 4,775,901 A | 10/1988 | Nakano |
| 4,776,013 A | 10/1988 | Kafri et al. |
| 4,782,342 A | 11/1988 | Walton |
| 4,790,566 A | 12/1988 | Boissier et al. |
| 4,803,114 A | 2/1989 | Schledorn |
| 4,805,020 A | 2/1989 | Greenberg |
| 4,807,031 A | 2/1989 | Broughton et al. |
| 4,811,357 A | 3/1989 | Betts et al. |
| 4,811,408 A | 3/1989 | Goldman |
| 4,816,372 A | 3/1989 | Schenk et al. |
| 4,816,374 A | 3/1989 | Lecomte |
| 4,820,912 A | 4/1989 | Samyn |
| 4,822,973 A | 4/1989 | Fahner et al. |
| 4,835,517 A | 5/1989 | van der Gracht et al. |
| 4,837,422 A | 6/1989 | Dethloff et al. |
| 4,855,827 A | 8/1989 | Best |
| 4,861,620 A | 8/1989 | Azuma et al. |
| 4,864,618 A | 9/1989 | Wright et al. |
| 4,866,771 A | 9/1989 | Bain |
| 4,876,617 A | 10/1989 | Best et al. |
| 4,877,713 A | 10/1989 | Fujita et al. |
| 4,879,747 A | 11/1989 | Leighton et al. |
| 4,884,139 A | 11/1989 | Pommier |
| 4,888,798 A | 12/1989 | Earnest |
| 4,889,749 A | 12/1989 | Ohashi et al. |
| 4,894,110 A | 1/1990 | Lass et al. |
| 4,903,301 A | 2/1990 | Kondo et al. |
| 4,908,836 A | 3/1990 | Rushforth et al. |
| 4,908,873 A | 3/1990 | Philibert et al. |
| 4,915,237 A | 4/1990 | Chang et al. |
| 4,916,300 A | 4/1990 | Ishida |
| 4,921,278 A | 5/1990 | Shiang et al. |
| 4,939,515 A | 7/1990 | Adelson |
| 4,941,150 A | 7/1990 | Iwasaki |
| 4,943,973 A | 7/1990 | Werner |
| 4,943,976 A | 7/1990 | Ishigaki |
| 4,944,036 A | 7/1990 | Hyatt |
| 4,945,215 A | 7/1990 | Fukushima et al. |
| 4,947,028 A | 8/1990 | Gorog |
| 4,959,406 A | 9/1990 | Foltin et al. |
| 4,963,998 A | 10/1990 | Maufe |
| 4,965,827 A | 10/1990 | McDonald |
| 4,967,273 A | 10/1990 | Greenberg |
| 4,968,063 A | 11/1990 | McConville et al. |
| 4,969,041 A | 11/1990 | O'Grady et al. |
| 4,972,471 A | 11/1990 | Gross et al. |
| 4,972,476 A | 11/1990 | Nathans |
| 4,977,594 A | 12/1990 | Shear |
| 4,979,210 A | 12/1990 | Nagata et al. |
| 4,990,759 A | 2/1991 | Gloton et al. |
| 4,993,068 A | 2/1991 | Piosenka et al. |
| 4,994,831 A | 2/1991 | Marandi |
| 4,996,530 A | 2/1991 | Hilton |
| 4,999,065 A | 3/1991 | Wilfert |
| 5,010,405 A | 4/1991 | Schreiber et al. |
| 5,013,900 A | 5/1991 | Hoppe |
| 5,023,907 A | 6/1991 | Johnson et al. |
| 5,024,989 A | 6/1991 | Chiang et al. |
| 5,027,401 A | 6/1991 | Soltesz |
| 5,036,513 A | 7/1991 | Greenblatt |
| 5,053,956 A | 10/1991 | Donald et al. |
| 5,060,981 A | 10/1991 | Fossum et al. |
| 5,061,341 A | 10/1991 | Kildal et al. |
| 5,063,446 A | 11/1991 | Gibson |
| 5,073,899 A | 12/1991 | Collier et al. |
| 5,079,648 A | 1/1992 | Maufe |
| 5,086,469 A | 2/1992 | Gupta et al. |
| 5,095,196 A | 3/1992 | Miyata |
| 5,103,459 A | 4/1992 | Gilhousen et al. |
| 5,113,445 A | 5/1992 | Wang |
| 5,113,518 A | 5/1992 | Durst, Jr. et al. |
| 5,122,813 A | 6/1992 | Lass et al. |
| 5,128,779 A | 7/1992 | Mallik |
| 5,138,070 A | 8/1992 | Berneth |
| 5,138,604 A | 8/1992 | Umeda et al. |
| 5,138,712 A | 8/1992 | Corbin |
| 5,146,457 A | 9/1992 | Veldhuis et al. |

| | | | | | |
|---|---|---|---|---|---|
| 5,148,498 A | 9/1992 | Resnikoff et al. | 5,450,490 A | 9/1995 | Jensen et al. |
| 5,150,409 A | 9/1992 | Elsner | 5,450,492 A | 9/1995 | Hook et al. |
| 5,156,938 A | 10/1992 | Foley et al. | 5,451,478 A | 9/1995 | Boggs et al. |
| 5,157,424 A | 10/1992 | Craven et al. | 5,463,209 A | 10/1995 | Figh et al. |
| 5,161,210 A | 11/1992 | Druyvesteyn et al. | 5,466,012 A | 11/1995 | Puckett et al. |
| 5,166,676 A | 11/1992 | Milheiser | 5,469,506 A | 11/1995 | Berson et al. |
| 5,169,707 A | 12/1992 | Faykish et al. | 5,471,533 A | 11/1995 | Wang et al. |
| 5,171,625 A | 12/1992 | Newton | 5,473,631 A | 12/1995 | Moses |
| 5,173,840 A | 12/1992 | Kodai et al. | 5,474,875 A | 12/1995 | Loerzer et al. |
| 5,179,392 A | 1/1993 | Kawaguchi | 5,479,168 A | 12/1995 | Johnson et al. |
| 5,181,786 A | 1/1993 | Hujink | 5,489,639 A | 2/1996 | Faber et al. |
| 5,185,736 A | 2/1993 | Tyrrell et al. | 5,490,217 A | 2/1996 | Wang et al. |
| 5,199,081 A | 3/1993 | Saito et al. | 5,493,677 A | 2/1996 | Balogh et al. |
| 5,200,822 A | 4/1993 | Bronfin et al. | 5,495,411 A | 2/1996 | Ananda |
| 5,208,450 A | 5/1993 | Uenishi et al. | 5,495,581 A | 2/1996 | Tsai |
| 5,212,551 A | 5/1993 | Conanan | 5,496,071 A | 3/1996 | Walsh |
| 5,213,337 A | 5/1993 | Sherman | 5,499,294 A | 3/1996 | Friedman |
| 5,215,864 A | 6/1993 | Laakmann | 5,505,494 A | 4/1996 | Belluci et al. |
| 5,216,543 A | 6/1993 | Calhoun | 5,509,693 A | 4/1996 | Kohls |
| 5,228,056 A | 7/1993 | Schilling | 5,515,081 A | 5/1996 | Vasilik |
| 5,237,164 A | 8/1993 | Takada | 5,522,623 A | 6/1996 | Soules et al. |
| 5,243,423 A | 9/1993 | DeJean et al. | 5,523,125 A | 6/1996 | Kennedy et al. |
| 5,244,861 A | 9/1993 | Campbell et al. | 5,524,933 A | 6/1996 | Kunt et al. |
| 5,245,329 A | 9/1993 | Gokcebay | 5,528,222 A | 6/1996 | Moskowitz et al. |
| 5,249,546 A | 10/1993 | Pennelle | 5,529,345 A | 6/1996 | Kohls |
| 5,253,078 A | 10/1993 | Balkanski et al. | 5,530,852 A | 6/1996 | Meske, Jr. et al. |
| 5,258,998 A | 11/1993 | Koide | 5,534,372 A | 7/1996 | Koshizuka et al. |
| 5,259,025 A | 11/1993 | Monroe et al. | 5,548,645 A | 8/1996 | Ananda |
| 5,261,987 A | 11/1993 | Luening et al. | 5,550,346 A | 8/1996 | Andriash et al. |
| 5,262,860 A | 11/1993 | Fitzpatrick et al. | 5,553,143 A | 9/1996 | Ross et al. |
| 5,267,334 A | 11/1993 | Normille et al. | 5,576,377 A | 11/1996 | El Sayed et al. |
| 5,267,755 A | 12/1993 | Yamauchi et al. | 5,579,479 A | 11/1996 | Plum |
| 5,272,039 A | 12/1993 | Yoerger | 5,579,694 A | 12/1996 | Mailloux |
| 5,280,537 A | 1/1994 | Sugiyama et al. | 5,594,226 A | 1/1997 | Steger |
| 5,284,364 A | 2/1994 | Jain | 5,594,809 A | 1/1997 | Kopec et al. |
| 5,288,976 A | 2/1994 | Citron et al. | 5,612,943 A | 3/1997 | Moses et al. |
| 5,293,399 A | 3/1994 | Hefti | 5,613,004 A | 3/1997 | Cooperman et al. |
| 5,294,944 A | 3/1994 | Takeyama et al. | 5,617,119 A | 4/1997 | Briggs et al. |
| 5,295,203 A | 3/1994 | Krause et al. | 5,629,980 A | 5/1997 | Stefik et al. |
| 5,298,922 A | 3/1994 | Merkle et al. | 5,633,119 A | 5/1997 | Burberry et al. |
| 5,299,019 A | 3/1994 | Pack et al. | 5,634,012 A | 5/1997 | Stefik et al. |
| 5,304,513 A | 4/1994 | Haghiri-Tehrani et al. | 5,635,012 A | 6/1997 | Belluci et al. |
| 5,305,400 A | 4/1994 | Butera | 5,636,276 A | 6/1997 | Brugger |
| 5,315,098 A | 5/1994 | Tow | 5,636,292 A | 6/1997 | Rhoads |
| 5,319,453 A | 6/1994 | Copriviza et al. | 5,638,443 A | 6/1997 | Stefik et al. |
| 5,319,724 A | 6/1994 | Blonstein et al. | 5,639,819 A | 6/1997 | Farkas et al. |
| 5,319,735 A | 6/1994 | Preuss et al. | 5,640,193 A | 6/1997 | Wellner |
| 5,321,751 A | 6/1994 | Ray et al. | 5,640,647 A | 6/1997 | Hube |
| 5,325,167 A | 6/1994 | Melen | 5,646,997 A | 7/1997 | Barton |
| 5,334,573 A | 8/1994 | Schild | 5,646,999 A | 7/1997 | Saito |
| 5,336,657 A | 8/1994 | Egashira et al. | 5,652,626 A | 7/1997 | Kawakami et al. |
| 5,336,871 A | 8/1994 | Colgate, Jr. | 5,652,714 A | 7/1997 | Peterson et al. |
| 5,337,361 A | 8/1994 | Wang et al. | 5,657,462 A | 8/1997 | Brouwer et al. |
| 5,351,302 A | 9/1994 | Leighton et al. | 5,659,164 A | 8/1997 | Schmid et al. |
| 5,354,097 A | 10/1994 | Tel | 5,659,726 A | 8/1997 | Sandford, II et al. |
| 5,374,976 A | 12/1994 | Spannenburg | 5,663,766 A | 9/1997 | Sizer, II |
| 5,379,344 A | 1/1995 | Larsson et al. | 5,664,018 A | 9/1997 | Leighton |
| 5,379,345 A | 1/1995 | Greenberg | 5,665,951 A | 9/1997 | Newman et al. |
| 5,380,695 A | 1/1995 | Chiang et al. | 5,668,636 A | 9/1997 | Beach et al. |
| 5,384,846 A | 1/1995 | Berson et al. | 5,669,995 A | 9/1997 | Hong |
| 5,385,371 A | 1/1995 | Izawa | 5,671,005 A | 9/1997 | McNay et al. |
| 5,387,013 A | 2/1995 | Yamauchi et al. | 5,671,282 A | 9/1997 | Wolff et al. |
| 5,393,099 A | 2/1995 | D'Amato | 5,673,316 A | 9/1997 | Auerbach et al. |
| 5,394,274 A | 2/1995 | Kahn | 5,680,223 A | 10/1997 | Cooper et al. |
| 5,396,559 A | 3/1995 | McGrew | 5,681,356 A | 10/1997 | Barak et al. |
| 5,404,377 A | 4/1995 | Moses | 5,684,885 A | 11/1997 | Cass et al. |
| 5,408,542 A | 4/1995 | Callahan | 5,687,191 A | 11/1997 | Lee et al. |
| 5,409,797 A | 4/1995 | Hosoi et al. | 5,687,236 A | 11/1997 | Moskowitz et al. |
| 5,421,619 A | 6/1995 | Dyball | 5,689,620 A | 11/1997 | Kopec et al. |
| 5,422,230 A | 6/1995 | Boggs et al. | 5,691,757 A | 11/1997 | Hayashihara et al. |
| 5,422,963 A | 6/1995 | Chen et al. | 5,694,471 A | 12/1997 | Chen et al. |
| 5,422,995 A | 6/1995 | Aoki et al. | 5,698,296 A | 12/1997 | Dotson et al. |
| 5,428,607 A | 6/1995 | Hiller et al. | 5,706,364 A | 1/1998 | Kopec et al. |
| 5,428,731 A | 6/1995 | Powers, III | 5,715,403 A | 2/1998 | Stefik |
| 5,432,870 A | 7/1995 | Schwartz | 5,717,018 A | 2/1998 | Magerstedt et al. |
| 5,436,970 A | 7/1995 | Ray et al. | 5,719,667 A | 2/1998 | Miers |
| 5,446,273 A | 8/1995 | Leslie | 5,721,583 A | 2/1998 | Harada et al. |
| 5,448,053 A | 9/1995 | Rhoads | 5,721,781 A | 2/1998 | Deo et al. |
| 5,449,200 A | 9/1995 | Andric et al. | 5,721,788 A | 2/1998 | Powell et al. |

| | | | | | | |
|---|---|---|---|---|---|---|
| 5,734,119 A | 3/1998 | France et al. | | 5,905,251 A | 5/1999 | Knowles |
| 5,734,752 A | 3/1998 | Knox | | 5,905,800 A | 5/1999 | Moskowitz et al. |
| 5,740,244 A | 4/1998 | Indeck et al. | | 5,907,149 A | 5/1999 | Marckini |
| 5,742,845 A | 4/1998 | Wagner | | 5,912,974 A | 6/1999 | Holloway et al. |
| 5,744,792 A | 4/1998 | Imataki et al. | | 5,913,210 A | 6/1999 | Call |
| 5,745,308 A | 4/1998 | Spangenberg | | 5,915,027 A | 6/1999 | Cox et al. |
| 5,745,604 A | 4/1998 | Rhoads | | 5,915,588 A | 6/1999 | Stoken et al. |
| 5,748,763 A | 5/1998 | Rhoads | | 5,918,213 A | 6/1999 | Bernard et al. |
| 5,751,854 A | 5/1998 | Saitoh et al. | | 5,918,214 A | 6/1999 | Perkowski |
| 5,754,675 A | 5/1998 | Valadier | | 5,919,853 A | 7/1999 | Condit et al. |
| 5,760,386 A | 6/1998 | Ward | | 5,920,861 A | 7/1999 | Hall et al. |
| 5,761,686 A | 6/1998 | Bloomberg | | 5,920,878 A | 7/1999 | DeMont |
| 5,763,868 A | 6/1998 | Kubota et al. | | 5,925,500 A | 7/1999 | Yang et al. |
| 5,765,152 A | 6/1998 | Erickson | | 5,926,822 A | 7/1999 | Garman |
| 5,768,001 A | 6/1998 | Kelley et al. | | 5,928,989 A | 7/1999 | Ohnishi et al. |
| 5,768,426 A | 6/1998 | Rhoads | | 5,930,369 A | 7/1999 | Cox et al. |
| 5,769,301 A | 6/1998 | Hebert et al. | | 5,930,377 A | 7/1999 | Powell et al. |
| 5,774,168 A | 6/1998 | Blome | | 5,930,767 A | 7/1999 | Reber et al. |
| 5,774,452 A | 6/1998 | Wolosewicz | | 5,932,863 A | 8/1999 | Rathus et al. |
| 5,776,278 A | 7/1998 | Tuttle et al. | | 5,933,798 A | 8/1999 | Linnartz |
| 5,778,102 A | 7/1998 | Sandford, II et al. | | 5,933,829 A | 8/1999 | Durst et al. |
| 5,783,024 A | 7/1998 | Forkert | | 5,936,986 A | 8/1999 | Cantatore et al. |
| 5,786,587 A | 7/1998 | Colgate, Jr. | | 5,938,726 A | 8/1999 | Reber et al. |
| 5,787,186 A | 7/1998 | Schroeder | | 5,938,727 A | 8/1999 | Ikeda |
| 5,790,662 A | 8/1998 | Valerij et al. | | 5,939,695 A | 8/1999 | Nelson |
| 5,790,703 A | 8/1998 | Wang | | 5,939,699 A | 8/1999 | Perttunen et al. |
| 5,795,643 A | 8/1998 | Steininger et al. | | 5,940,595 A | 8/1999 | Reber et al. |
| 5,799,092 A | 8/1998 | Kristol et al. | | 5,943,422 A | 8/1999 | Van Wie et al. |
| 5,801,687 A | 9/1998 | Peterson et al. | | 5,944,356 A | 8/1999 | Bergmann et al. |
| 5,801,857 A | 9/1998 | Heckenkamp et al. | | 5,949,055 A | 9/1999 | Fleet et al. |
| 5,804,803 A | 9/1998 | Cragun et al. | | 5,950,173 A | 9/1999 | Perkowski |
| 5,808,758 A | 9/1998 | Solmsdorf | | 5,951,055 A | 9/1999 | Mowry, Jr. |
| 5,809,139 A | 9/1998 | Girod et al. | | 5,953,710 A | 9/1999 | Fleming |
| 5,809,160 A | 9/1998 | Powell et al. | | 5,955,021 A | 9/1999 | Tiffany, III |
| 5,809,317 A | 9/1998 | Kogan et al. | | 5,955,961 A | 9/1999 | Wallerstein |
| 5,809,633 A | 9/1998 | Mundigl et al. | | 5,958,528 A | 9/1999 | Bernecker |
| 5,815,292 A | 9/1998 | Walters | | 5,962,840 A | 10/1999 | Haghiri-Tehrani et al. |
| 5,816,619 A | 10/1998 | Schaede | | 5,963,916 A | 10/1999 | Kaplan |
| 5,818,441 A | 10/1998 | Throckmorton et al. | | 5,965,242 A | 10/1999 | Patton et al. |
| 5,822,436 A | 10/1998 | Rhoads | | 5,969,324 A | 10/1999 | Reber et al. |
| 5,824,715 A | 10/1998 | Hayashihara et al. | | 5,971,277 A | 10/1999 | Cragun et al. |
| 5,825,892 A | 10/1998 | Braudaway et al. | | 5,973,842 A | 10/1999 | Spangenberg |
| 5,828,325 A | 10/1998 | Wolosewicz et al. | | 5,974,141 A | 10/1999 | Saito |
| 5,828,814 A | 10/1998 | Cyman et al. | | 5,974,548 A | 10/1999 | Adams |
| 5,835,639 A | 11/1998 | Honsinger et al. | | 5,977,514 A | 11/1999 | Feng et al. |
| 5,840,791 A | 11/1998 | Magerstedt et al. | | 5,978,773 A | 11/1999 | Hudetz et al. |
| 5,841,886 A | 11/1998 | Rhoads | | 5,979,757 A | 11/1999 | Tracy et al. |
| 5,841,978 A | 11/1998 | Rhoads | | 5,983,218 A | 11/1999 | Syeda-Mahmood |
| 5,844,685 A | 12/1998 | Gontin | | 5,984,366 A | 11/1999 | Priddy |
| 5,845,281 A | 12/1998 | Benson et al. | | 5,985,078 A | 11/1999 | Suess et al. |
| 5,848,413 A | 12/1998 | Wolff | | 5,991,876 A | 11/1999 | Johnson et al. |
| 5,848,424 A | 12/1998 | Scheinkman et al. | | 5,995,105 A | 11/1999 | Reber et al. |
| 5,852,673 A | 12/1998 | Young | | 6,000,607 A | 12/1999 | Ohki et al. |
| 5,853,955 A | 12/1998 | Towfiq | | 6,002,383 A | 12/1999 | Shimada |
| 5,855,969 A | 1/1999 | Robertson | | 6,003,581 A | 12/1999 | Aihara |
| 5,857,038 A | 1/1999 | Owada et al. | | 6,007,660 A | 12/1999 | Forkert |
| 5,859,920 A | 1/1999 | Daly et al. | | 6,007,929 A | 12/1999 | Robertson et al. |
| 5,861,662 A | 1/1999 | Candelore | | 6,012,641 A | 1/2000 | Watada |
| 5,862,260 A | 1/1999 | Rhoads | | 6,017,972 A | 1/2000 | Harris et al. |
| 5,864,622 A | 1/1999 | Marcus | | 6,022,905 A | 2/2000 | Harris et al. |
| 5,864,623 A | 1/1999 | Messina et al. | | 6,024,287 A | 2/2000 | Takai et al. |
| 5,866,644 A | 2/1999 | Mercx et al. | | 6,026,193 A | 2/2000 | Rhoads |
| 5,867,199 A | 2/1999 | Knox et al. | | 6,028,134 A | 2/2000 | Zhang et al. |
| 5,869,819 A | 2/1999 | Knowles et al. | | 6,036,099 A | 3/2000 | Leighton |
| 5,871,615 A | 2/1999 | Harris | | 6,036,807 A | 3/2000 | Brongers |
| 5,872,589 A | 2/1999 | Morales | | 6,037,102 A | 3/2000 | Loerzer et al. |
| 5,872,627 A | 2/1999 | Miers | | 6,042,249 A | 3/2000 | Spangenberg |
| 5,875,249 A | 2/1999 | Mintzer et al. | | 6,047,888 A | 4/2000 | Dethloff |
| 5,879,502 A | 3/1999 | Gustafson | | 6,049,463 A | 4/2000 | O'Malley et al. |
| 5,879,784 A | 3/1999 | Breen et al. | | 6,052,486 A | 4/2000 | Knowlton et al. |
| 5,888,624 A | 3/1999 | Haghiri et al. | | 6,054,170 A | 4/2000 | Chess et al. |
| 5,892,661 A | 4/1999 | Stafford et al. | | 6,060,981 A | 5/2000 | Landes |
| 5,892,900 A | 4/1999 | Ginter et al. | | 6,064,764 A | 5/2000 | Bhaskaran et al. |
| 5,893,910 A | 4/1999 | Martineau et al. | | 6,065,119 A | 5/2000 | Sandford, II et al. |
| 5,895,074 A | 4/1999 | Chess et al. | | 6,066,437 A | 5/2000 | Kosslinger |
| 5,900,608 A | 5/1999 | Iida | | 6,066,594 A | 5/2000 | Gunn et al. |
| 5,902,353 A | 5/1999 | Reber et al. | | 6,075,223 A | 6/2000 | Harrison |
| 5,903,729 A | 5/1999 | Reber et al. | | 6,078,664 A | 6/2000 | Moskowitz et al. |
| 5,905,248 A | 5/1999 | Russell et al. | | 6,086,971 A | 7/2000 | Haas et al. |

| | | | | | | |
|---|---|---|---|---|---|---|
| 6,100,804 | A | 8/2000 | Brady et al. | 6,381,415 B1 | 4/2002 | Terada |
| 6,101,602 | A | 8/2000 | Fridrich | 6,389,151 B1 | 5/2002 | Carr et al. |
| 6,104,812 | A | 8/2000 | Koltai et al. | 6,390,375 B2 | 5/2002 | Kayanakis |
| 6,110,864 | A | 8/2000 | Lu | 6,398,245 B1 | 6/2002 | Gruse et al. |
| 6,111,506 | A | 8/2000 | Yap et al. | 6,400,386 B1 | 6/2002 | No |
| 6,122,403 | A | 9/2000 | Rhoads | 6,404,643 B1 | 6/2002 | Chung |
| 6,127,475 | A | 10/2000 | Vollenberg et al. | 6,408,082 B1 | 6/2002 | Rhoads et al. |
| 6,127,928 | A | 10/2000 | Issacman et al. | 6,411,392 B1 | 6/2002 | Bender et al. |
| 6,128,401 | A | 10/2000 | Suzuki et al. | 6,413,399 B1 | 7/2002 | Kasevich |
| 6,131,161 | A | 10/2000 | Linnartz | 6,413,687 B1 | 7/2002 | Hattori et al. |
| 6,141,438 | A | 10/2000 | Blanchester | 6,418,232 B1 | 7/2002 | Nakano et al. |
| 6,143,852 | A | 11/2000 | Harrison et al. | 6,421,013 B1 | 7/2002 | Chung |
| 6,148,091 | A | 11/2000 | DiMaria | 6,424,029 B1 | 7/2002 | Giesler |
| 6,157,330 | A | 12/2000 | Bruekers et al. | 6,424,249 B1 | 7/2002 | Houvener |
| 6,159,327 | A | 12/2000 | Forkert | 6,424,725 B1 | 7/2002 | Rhoads et al. |
| 6,160,526 | A | 12/2000 | Hirai et al. | 6,425,081 B1 | 7/2002 | Iwamura |
| 6,163,842 | A | 12/2000 | Barton | 6,427,020 B1 | 7/2002 | Rhoads |
| 6,165,696 | A | 12/2000 | Fischer | 6,427,140 B1 | 7/2002 | Ginter et al. |
| 6,179,338 | B1 | 1/2001 | Bergmann et al. | 6,439,465 B1 | 8/2002 | Bloomberg |
| 6,185,312 | B1 | 2/2001 | Nakamura et al. | 6,442,284 B1 | 8/2002 | Gustafson et al. |
| 6,185,316 | B1 | 2/2001 | Buffam | 6,444,068 B1 | 9/2002 | Koops et al. |
| 6,185,683 | B1 | 2/2001 | Ginter et al. | 6,446,865 B1 | 9/2002 | Holt et al. |
| 6,186,404 | B1 | 2/2001 | Ehrhart et al. | 6,456,726 B1 | 9/2002 | Yu et al. |
| 6,196,460 | B1 | 3/2001 | Shin | 6,463,416 B1 | 10/2002 | Messina |
| 6,199,144 | B1 | 3/2001 | Arora et al. | 6,466,012 B1 | 10/2002 | Mouri et al. |
| 6,202,932 | B1 | 3/2001 | Rapeli | 6,470,090 B2 | 10/2002 | Oami et al. |
| 6,205,249 | B1 | 3/2001 | Moskowitz | 6,475,588 B1 | 11/2002 | Schottland et al. |
| 6,207,344 | B1 | 3/2001 | Ramlow et al. | 6,478,228 B1 | 11/2002 | Ikefuji et al. |
| 6,208,735 | B1 | 3/2001 | Cox et al. | 6,482,495 B1 | 11/2002 | Kohama et al. |
| 6,209,923 | B1 | 4/2001 | Thaxton et al. | 6,485,319 B2 | 11/2002 | Bricaud et al. |
| 6,214,916 | B1 | 4/2001 | Mercx et al. | 6,487,301 B1 | 11/2002 | Zhao |
| 6,214,917 | B1 | 4/2001 | Linzmeier et al. | 6,496,933 B1 | 12/2002 | Nunally |
| 6,221,552 | B1 | 4/2001 | Street et al. | 6,512,837 B1 | 1/2003 | Ahmed |
| 6,226,387 | B1 | 5/2001 | Tewfik et al. | 6,519,352 B2 | 2/2003 | Rhoads |
| 6,233,347 | B1 | 5/2001 | Chen et al. | 6,536,665 B1 | 3/2003 | Ray et al. |
| 6,233,684 | B1 | 5/2001 | Stefik et al. | 6,542,618 B1 | 4/2003 | Rhoads |
| 6,237,786 | B1 | 5/2001 | Ginter et al. | 6,542,933 B1 | 4/2003 | Durst, Jr. et al. |
| 6,238,840 | B1 | 5/2001 | Hirayama et al. | 6,546,112 B1 | 4/2003 | Rhoads |
| 6,240,121 | B1 | 5/2001 | Senoh | 6,577,746 B1 | 6/2003 | Evans et al. |
| 6,243,480 | B1 | 6/2001 | Zhao et al. | 6,577,759 B1 | 6/2003 | Caron et al. |
| 6,244,514 | B1 | 6/2001 | Otto | 6,580,819 B1 | 6/2003 | Rhoads |
| 6,246,775 | B1 | 6/2001 | Nakamura et al. | 6,581,839 B1 | 6/2003 | Lasch et al. |
| 6,246,777 | B1 | 6/2001 | Agarwal et al. | 6,608,911 B2 | 8/2003 | Lofgren et al. |
| 6,247,644 | B1 | 6/2001 | Horne et al. | 6,609,659 B2 | 8/2003 | Sehr |
| 6,250,554 | B1 | 6/2001 | Leo et al. | 6,614,914 B1 | 9/2003 | Rhoads et al. |
| 6,256,736 | B1 | 7/2001 | Coppersmith et al. | 6,616,993 B2 | 9/2003 | Usuki et al. |
| 6,257,486 | B1 | 7/2001 | Teicher et al. | 6,625,295 B1 | 9/2003 | Wolfgang et al. |
| 6,259,506 | B1 | 7/2001 | Lawandy | 6,636,615 B1 | 10/2003 | Rhoads et al. |
| 6,264,106 | B1 | 7/2001 | Bridgelall | 6,638,635 B2 | 10/2003 | Hattori et al. |
| 6,268,058 | B1 | 7/2001 | Tahon et al. | 6,650,761 B1 | 11/2003 | Rodriguez et al. |
| 6,272,176 | B1 | 8/2001 | Srinivasan | 6,668,068 B2 | 12/2003 | Hashimoto |
| 6,272,634 | B1 | 8/2001 | Tewfik et al. | 6,671,387 B1 | 12/2003 | Chen et al. |
| 6,275,599 | B1 | 8/2001 | Adler et al. | 6,674,886 B1 | 1/2004 | Davis et al. |
| 6,283,188 | B1 | 9/2001 | Maynard et al. | 6,679,425 B1 | 1/2004 | Sheppard et al. |
| 6,285,775 | B1 | 9/2001 | Wu et al. | 6,687,345 B1 | 2/2004 | Swartz et al. |
| 6,285,776 | B1 | 9/2001 | Rhoads | 6,704,869 B2 | 3/2004 | Rhoads et al. |
| 6,286,036 | B1 | 9/2001 | Rhoads | 6,709,333 B1 | 3/2004 | Bradford et al. |
| 6,286,761 | B1 | 9/2001 | Wen | 6,711,465 B2 | 3/2004 | Tomassi |
| 6,289,108 | B1 | 9/2001 | Rhoads | 6,712,397 B1 | 3/2004 | Mayer et al. |
| 6,291,551 | B1 | 9/2001 | Kniess et al. | 6,732,924 B2 | 5/2004 | Ishigame et al. |
| 6,292,092 | B1 | 9/2001 | Chow et al. | 6,748,533 B1 | 6/2004 | Wu et al. |
| 6,311,214 | B1 | 10/2001 | Rhoads | 6,752,432 B1 | 6/2004 | Richardson |
| 6,313,436 | B1 | 11/2001 | Harrison | 6,761,316 B2 | 7/2004 | Bridgelall et al. |
| 6,314,192 | B1 | 11/2001 | Chen et al. | 6,764,014 B2 | 7/2004 | Lasch et al. |
| 6,314,457 | B1 | 11/2001 | Schena et al. | 6,768,808 B2 | 7/2004 | Rhoads |
| 6,321,981 | B1 | 11/2001 | Ray et al. | 6,786,420 B1 | 9/2004 | Silverbrook |
| 6,324,091 | B1 | 11/2001 | Gryko et al. | 6,788,800 B1 | 9/2004 | Carr et al. |
| 6,324,573 | B1 | 11/2001 | Rhoads | 6,794,115 B2 | 9/2004 | Telser et al. |
| 6,326,128 | B1 | 12/2001 | Telser et al. | 6,803,114 B1 | 10/2004 | Vere et al. |
| 6,327,576 | B1 | 12/2001 | Ogasawara | 6,804,378 B2 | 10/2004 | Rhoads |
| 6,332,031 | B1 | 12/2001 | Rhoads et al. | 6,823,075 B2 | 11/2004 | Perry |
| 6,332,194 | B1 | 12/2001 | Bloom et al. | 6,827,277 B2 | 12/2004 | Bloomberg et al. |
| 6,334,187 | B1 | 12/2001 | Kadono | 6,827,283 B2 | 12/2004 | Kappe et al. |
| 6,343,138 | B1 | 1/2002 | Rhoads | 6,843,422 B2 | 1/2005 | Jones et al. |
| 6,345,104 | B1 | 2/2002 | Rhoads | 6,869,023 B2 | 3/2005 | Hawes |
| 6,357,664 | B1 | 3/2002 | Zercher | 6,882,737 B2 | 4/2005 | Lofgren et al. |
| 6,369,904 | B1 | 4/2002 | Bhattacharjya et al. | 6,883,716 B1 | 4/2005 | De Jong |
| 6,370,258 | B1 | 4/2002 | Uchida | 6,900,767 B2 | 5/2005 | Hattori |
| 6,372,394 | B1 | 4/2002 | Zientek | 6,910,628 B1 | 6/2005 | Sehr |

| | | |
|---|---|---|
| 6,913,199 B2 | 7/2005 | He |
| 6,923,378 B2 | 8/2005 | Jones et al. |
| 6,926,203 B1 | 8/2005 | Sehr |
| 6,932,378 B2 | 8/2005 | Thomas |
| 6,944,650 B1 | 9/2005 | Urien |
| 6,947,571 B1 | 9/2005 | Rhoads et al. |
| 6,954,293 B2 | 10/2005 | Heckenkamp et al. |
| 6,958,346 B2 | 10/2005 | Stoltefuss et al. |
| 6,959,098 B1 | 10/2005 | Alattar |
| 6,970,573 B2 | 11/2005 | Carr et al. |
| 6,975,746 B2 | 12/2005 | Davis et al. |
| 6,978,036 B2 | 12/2005 | Alattar et al. |
| 6,991,174 B2 | 1/2006 | Zuili |
| 6,999,936 B2 | 2/2006 | Sehr |
| 7,007,852 B2 | 3/2006 | Silverbrook et al. |
| 7,016,516 B2 | 3/2006 | Rhoads |
| 7,024,563 B2 | 4/2006 | Shimosato et al. |
| 7,113,596 B2 | 9/2006 | Rhoads |
| 7,152,786 B2 | 12/2006 | Brundage et al. |
| 7,159,116 B2 | 1/2007 | Moskowitz |
| 7,167,844 B1 | 1/2007 | Leong et al. |
| 7,181,042 B2 | 2/2007 | Tian |
| 7,185,201 B2 | 2/2007 | Rhoads et al. |
| 7,191,156 B1 | 3/2007 | Seder |
| 7,199,456 B2 | 4/2007 | Krappe et al. |
| 7,206,820 B1 | 4/2007 | Rhoads et al. |
| 7,289,643 B2 | 10/2007 | Brunk et al. |
| 2001/0002035 A1 | 5/2001 | Kayanakis |
| 2001/0007975 A1 | 7/2001 | Nyberg et al. |
| 2001/0008557 A1 | 7/2001 | Stefik et al. |
| 2001/0020270 A1 | 9/2001 | Yeung et al. |
| 2001/0021144 A1 | 9/2001 | Oshima et al. |
| 2001/0024510 A1 | 9/2001 | Iwamura |
| 2001/0026377 A1 | 10/2001 | Ikegami |
| 2001/0028725 A1 | 10/2001 | Nakagawa et al. |
| 2001/0028727 A1 | 10/2001 | Naito et al. |
| 2001/0037455 A1 | 11/2001 | Lawandy et al. |
| 2001/0040980 A1 | 11/2001 | Yamaguchi |
| 2001/0047478 A1 | 11/2001 | Mase |
| 2001/0051996 A1 | 12/2001 | Cooper et al. |
| 2001/0052076 A1 | 12/2001 | Kadono |
| 2001/0053235 A1 | 12/2001 | Sato |
| 2001/0054144 A1 | 12/2001 | Epstein et al. |
| 2001/0054149 A1 | 12/2001 | Kawaguchi et al. |
| 2002/0010684 A1 | 1/2002 | Moskowitz |
| 2002/0011519 A1 | 1/2002 | Shults |
| 2002/0015509 A1 | 2/2002 | Nakamura et al. |
| 2002/0018430 A1 | 2/2002 | Heckenkamp et al. |
| 2002/0019767 A1 | 2/2002 | Babbitt et al. |
| 2002/0023148 A1 | 2/2002 | Ritz et al. |
| 2002/0023218 A1 | 2/2002 | Lawandy et al. |
| 2002/0027359 A1 | 3/2002 | Cobben et al. |
| 2002/0033844 A1 | 3/2002 | Levy et al. |
| 2002/0034305 A1 | 3/2002 | Noyama et al. |
| 2002/0037091 A1 | 3/2002 | Terasaki |
| 2002/0037093 A1 | 3/2002 | Murphy |
| 2002/0046171 A1 | 4/2002 | Hoshino |
| 2002/0049908 A1 | 4/2002 | Shimosato et al. |
| 2002/0052885 A1 | 5/2002 | Levy |
| 2002/0054317 A1 | 5/2002 | Matsunoshita et al. |
| 2002/0059880 A1 | 5/2002 | Klinefelter et al. |
| 2002/0061120 A1 | 5/2002 | Carr et al. |
| 2002/0061121 A1 | 5/2002 | Rhoads et al. |
| 2002/0061122 A1 | 5/2002 | Fujihara et al. |
| 2002/0064298 A1 | 5/2002 | Rhoads et al. |
| 2002/0064759 A1 | 5/2002 | Durbin et al. |
| 2002/0067914 A1 | 6/2002 | Schumann et al. |
| 2002/0068987 A1 | 6/2002 | Hars |
| 2002/0070280 A1 | 6/2002 | Ikefuji et al. |
| 2002/0071556 A1 | 6/2002 | Moskowitz et al. |
| 2002/0073317 A1 | 6/2002 | Hars |
| 2002/0080396 A1 | 6/2002 | Silverbrook et al. |
| 2002/0095577 A1 | 7/2002 | Nakamura et al. |
| 2002/0096562 A1 | 7/2002 | Lewis |
| 2002/0097873 A1 | 7/2002 | Petrovic |
| 2002/0097891 A1 | 7/2002 | Hinishi |
| 2002/0105679 A1 | 8/2002 | Haynes |
| 2002/0106102 A1 | 8/2002 | Au et al. |
| 2002/0112171 A1 | 8/2002 | Ginter et al. |
| 2002/0114458 A1 | 8/2002 | Belenko et al. |
| 2002/0122568 A1 | 9/2002 | Zhao |
| 2002/0146549 A1 | 10/2002 | Kranenburg-Van Dijk et al. |
| 2002/0150277 A1 | 10/2002 | Nishimoto et al. |
| 2002/0158137 A1 | 10/2002 | Grey et al. |
| 2002/0164051 A1 | 11/2002 | Reed et al. |
| 2002/0176114 A1 | 11/2002 | Zeller et al. |
| 2003/0002710 A1 | 1/2003 | Rhoads |
| 2003/0005303 A1 | 1/2003 | Auslander et al. |
| 2003/0038174 A1 | 2/2003 | Jones |
| 2003/0039360 A1 | 2/2003 | Younis |
| 2003/0050961 A1 | 3/2003 | Rodriguez et al. |
| 2003/0089764 A1 | 5/2003 | Meadow et al. |
| 2003/0099374 A1 | 5/2003 | Choi et al. |
| 2003/0117262 A1 | 6/2003 | Anderegg et al. |
| 2003/0141358 A1 | 7/2003 | Hudson et al. |
| 2003/0178487 A1 | 9/2003 | Rogers |
| 2003/0178495 A1 | 9/2003 | Jones et al. |
| 2003/0211296 A1 | 11/2003 | Jones et al. |
| 2003/0234286 A1 | 12/2003 | Labrec et al. |
| 2004/0026496 A1 | 2/2004 | Zuili |
| 2004/0064415 A1 | 4/2004 | Abdallah et al. |
| 2004/0076310 A1 | 4/2004 | Hersch et al. |
| 2004/0158724 A1 | 8/2004 | Carr et al. |
| 2004/0181671 A1 | 9/2004 | Brundage et al. |
| 2004/0245346 A1 | 12/2004 | Haddock |
| 2005/0063027 A1 | 3/2005 | Durst et al. |
| 2005/0063562 A1 | 3/2005 | Brunk et al. |
| 2005/0092849 A1 | 5/2005 | Silverbrook |
| 2005/0094848 A1 | 5/2005 | Carr et al. |
| 2005/0258248 A1 | 11/2005 | Silverbrook et al. |
| 2006/0016107 A1 | 1/2006 | Davis |
| 2006/0040726 A1 | 2/2006 | Szrek et al. |
| 2007/0016790 A1 | 1/2007 | Brundage et al. |

FOREIGN PATENT DOCUMENTS

| | | |
|---|---|---|
| CH | 689680 A5 | 8/1999 |
| DE | 2943436 | 5/1981 |
| DE | 3806411 A1 | 9/1989 |
| EP | 19099 A1 | 11/1980 |
| EP | 0058482 A1 | 8/1982 |
| EP | 0279104 | 8/1988 |
| EP | 0372601 A1 | 6/1990 |
| EP | 0411232 A2 | 2/1991 |
| EP | 0441702 A1 | 8/1991 |
| EP | 0479265 | 4/1992 |
| EP | 0493091 A1 | 7/1992 |
| EP | 0581317 A2 | 2/1994 |
| EP | 0629972 | 12/1994 |
| EP | 0637514 | 2/1995 |
| EP | 0642060 | 3/1995 |
| EP | 0650146 A1 | 4/1995 |
| EP | 0697433 A1 | 2/1996 |
| EP | 0705025 A2 | 4/1996 |
| EP | 0734870 | 10/1996 |
| EP | 0739748 | 10/1996 |
| EP | 0975147 A2 | 1/2000 |
| EP | 0991014 A2 | 4/2000 |
| EP | 1035503 A1 | 9/2000 |
| EP | 1041815 A2 | 10/2000 |
| EP | 1077570 A2 | 2/2001 |
| EP | 1134710 A2 | 9/2001 |
| EP | 1147495 A1 | 10/2001 |
| EP | 1173001 A2 | 1/2002 |
| EP | 1202250 A1 | 5/2002 |
| EP | 1909971 A2 | 4/2008 |
| GB | 1088318 A | 10/1967 |
| GB | 1472581 A | 5/1977 |
| GB | 2063018 A | 5/1981 |
| GB | 2067871 A | 7/1981 |
| GB | 2132136 | 7/1984 |
| GB | 2196167 A | 4/1988 |
| GB | 2204984 A | 11/1988 |
| GB | 2227570 | 8/1990 |
| GB | 2240948 A | 8/1991 |
| GB | 2325765 A | 12/1998 |
| GB | 2346110 A | 8/2000 |
| GB | 2346111 A | 8/2000 |
| JP | 3185585 A | 8/1991 |

| | | | |
|---|---|---|---|
| JP | 4-248771 A | 9/1992 | |
| JP | 5242217 A | 9/1993 | |
| JP | 7115474 A | 5/1995 | |
| JP | 10171758 A | 6/1998 | |
| JP | 10177613 A | 6/1998 | |
| JP | 11259620 A | 9/1999 | |
| WO | WO-82/04149 A1 | 11/1982 | |
| WO | WO-89/08915 A1 | 9/1989 | |
| WO | WO-91/16722 A1 | 10/1991 | |
| WO | WO-94/03333 A1 | 2/1994 | |
| WO | WO-94/27228 A1 | 11/1994 | |
| WO | WO-95/10835 A1 | 4/1995 | |
| WO | WO-9509084 A1 | 4/1995 | |
| WO | WO-95/14289 A2 | 5/1995 | |
| WO | WO-9513597 A2 | 5/1995 | |
| WO | WO-95/20291 A1 | 7/1995 | |
| WO | WO-9603286 A1 | 2/1996 | |
| WO | WO-9626494 A1 | 8/1996 | |
| WO | WO-96/27259 A1 | 9/1996 | |
| WO | WO-96/36163 A2 | 11/1996 | |
| WO | WO-97/01446 A1 | 1/1997 | |
| WO | WO-97/43736 A1 | 11/1997 | |
| WO | WO-98/14887 A1 | 4/1998 | |
| WO | WO-98/20642 A1 | 5/1998 | |
| WO | WO-9819869 A1 | 5/1998 | |
| WO | WO-9820411 A1 | 5/1998 | |
| WO | WO-98/24050 A1 | 6/1998 | |
| WO | WO-98/40823 A1 | 9/1998 | |
| WO | WO-98/49813 A1 | 11/1998 | |
| WO | WO-9924934 | 5/1999 | |
| WO | WO-99/34277 A2 | 7/1999 | |
| WO | WO-00/43214 A1 | 7/2000 | |
| WO | WO-0039953 A1 | 7/2000 | |
| WO | WO-0043216 | 7/2000 | |
| WO | WO-0045344 A1 | 8/2000 | |
| WO | WO-00/78554 A1 | 12/2000 | |
| WO | WO-01/00719 A1 | 1/2001 | |
| WO | WO-0105075 A1 | 1/2001 | |
| WO | WO-0108405 A1 | 2/2001 | |
| WO | WO-0129764 A1 | 4/2001 | |
| WO | WO-0139121 A1 | 5/2001 | |
| WO | WO-01/43080 A1 | 6/2001 | |
| WO | WO-0145559 A1 | 6/2001 | |
| WO | WO-0173997 A1 | 10/2001 | |
| WO | WO-0196112 A1 | 12/2001 | |
| WO | WO-0197128 A1 | 12/2001 | |
| WO | WO-027425 A2 | 1/2002 | |
| WO | WO-027442 A1 | 1/2002 | |
| WO | WO-0217631 A1 | 2/2002 | |
| WO | WO-0219589 A1 | 3/2002 | |
| WO | WO-0226507 A1 | 4/2002 | |
| WO | WO-0227647 A1 | 4/2002 | |
| WO | WO-0242371 A2 | 5/2002 | |
| WO | WO-02053499 | 7/2002 | |
| WO | WO-02077380 A1 | 10/2002 | |
| WO | WO-02078965 A1 | 10/2002 | |
| WO | WO-03005291 | 1/2003 | |
| WO | WO-03055684 A2 | 7/2003 | |
| WO | WO-03056507 A1 | 7/2003 | |
| WO | WO-2004102353 A2 | 11/2004 | |

OTHER PUBLICATIONS

"Access Control and Copyright Protection for Images, WorkPackage 3: Evaluation of Existing Systems," Apr. 19, 1995, 68 pages.

"Access Control and Copyright Protection for Images, WorkPackage 1: Access Control and Copyright Protection for Images Need Evaluation," Jun. 1995, 21 pages.

"Copyright Protection for Digital Images, Digital Fingerprinting from FBI," Highwater FBI brochure 1995, 4 pages.

"Cyphertech Systems: Introduces Digital Encoding Device to Prevent TV Piracy," Hollywood Reporter, Oct. 20, 1993, p. 23.

"Foiling Card Forges With Magnetic Noise," Wall Street Journal, Feb. 8, 1994.

"High Water FBI Limited Presentation Image Copyright Protection Software," FBI Ltd. brochure, Jul. 1995, 17 pages.

"NAB—Cyphertech Starts Anti-Piracy Broadcast Tests," Newsbytes, NEW03230023, Mar. 23, 1994.

"The Copyright Can of Worms Opened Up by the New Electronic Media," Computergram Internations, pCGN07170006, Jul. 17, 1995 and The Copyright Can of Worms Opened Up by the New Electronic Media-2, Computergram Internations, pCGN07210008, Jul. 21, 1995, 3 pages.

U.S. Appl. No. 10/677,092, Office Action dated Jun. 20, 2007, 6 pages.

U.S. Appl. No. 10/803,538, Labrec, Advisory Action dated Dec. 14, 2007.

U.S. Appl. No. 10/803,538, Labrec, applicant's Amendment After Final dated Nov. 30, 2007.

U.S. Appl. No. 10/803,538, LaBrec, applicant's reponse dated May 8, 2007.

U.S. Appl. No. 10/803,538, Labrec, applicant's Request for Continued Examination dated Dec. 21, 2007.

U.S. Appl. No. 10/803,538, LaBrec, Office Action dated Dec. 8, 2006, plus response dated May 8, 2007.

U.S. Appl. No. 10/803,538, Labrec, Office Action dated Mar. 20, 2008.

U.S. Appl. No. 10/942,321, Labrec, applicant's Response dated Jul. 2, 2007.

U.S. Appl. No. 10/942,321, Labrec, Final Office Action dated Sep. 7, 2007.

U.S. Appl. No. 10/942,321, Labrec, Notice of Panel Decision dated Feb. 29, 2008.

U.S. Appl. No. 10/942,321, LaBrec, Office Action dated Feb. 1, 2007.

U.S. Appl. No. 10/942,321, Labrec, Request for Pre-Appeal Review dated Feb. 8, 2008.

Amended claims from WO03/056507, corresponding to those in EP 02 805 980.6.

Arachelian, "White Noise Storm," Apr. 11, 1994, Internet reference, 13 pages.

Arthur, "Digital Fingerprints Protect Artwork," New Scientist, Nov. 12, 1994, p. 24.

Aug. 16, 2007 communication from the Canadian Intellectual Property Office in Application No. 2,470,600, and a Feb. 15, 2008 Amendment in response thereto.

Australian Patent Application 2002353174, bibliographic information, 2002.

Australian Patent Application 2002353174, Office Action dated Sep. 5, 2007, 2 pages.

Bender et al., "Applications for Data Hiding," IBM Systems Journal, vol. 39, Nos. 3&4, 2000, pp. 547-568.

Bender et al., "Techniques for Data Hiding, " Massachusetts Institute of Technology, Media Laboratory, Jan. 1995, 10 pages.

Bender et al., "Techniques for Data Hiding," IBM Systems Journal, vol. 35, Nos. 3&4, 1996, pp. 313-336.

Bender et al., "Techniques for Data Hiding," SPIE vol. 2420, Jan. 1995, pp. 164-173.

Boland et al, "Watermarking Digital Images for Copyright Protection,"Fifth International Conference on Image Processing and its Applications, Conference Date Jul. 4-6, 1995, Conf. Publ. No. 410, pp. 326-330.

Boneh, "Collusion-Secure Fingerprinting for Digital Data," Department of Computer Science, Princeton University, 1995, 31 pages.

Bovik, "Handbook of Image and Video Processing," Academic Press, 2000, pp. 133-136, 154, 155.

Brassil et al., Electronic Marking and Identification Techniques to Discourage Document Copying, Proceedings of INFOCOM '94 Conference on Computer, IEEE Commun. Soc Conference, Jun. 12-16, 1994, 1278-1287.

Brown, "S-Tools for Windows, Version 1.00, Copyrgt. 1994 Andy Brown, What is Steganography," Internet reference, Mar. 6, 1994, 6 pages.

Bruckstein, A.M.; Richardson, T.J., A holographic transform domain image watermarking method, Circuits, Systems, and Signal Prcessing vol. 17, No. 3 p. 361-89, 1998. This paper includes an appendix containing an internal memo of Bell labs, which according to the authors of the paper, was dated Sep. 1994.

Canadian Patent application 2,469,938, applicant's Amendment dated Jan. 24, 2007.

Canadian Patent application 2,469,938, claims as filed, with effective filed of Dec. 20, 2002, 10 pages.

Canadian Patent application 2,469,938, Notice of Allowance dated Nov. 21, 2007.
Canadian Patent application 2,469,938, Office Action dated Jul. 24, 2006, 2 pages.
Caronni, "Assuring Ownership Rights for Digital Images," Published in the Proceedings of 'Reliable It Systems,' vis '95 HH. Bruggemann and W. Gerhardt-Hackl (Ed.), Vieweg Publishing Company, Germany, 1995, Jun. 14, 1994, 10 pages.
Castro et al., "Registration of Translated and rotated Images Using Finite Fourier Transforms," IEEE Transactions on pattern Analysis and Machine Intelligence, vol. PAMI-9, No. 5, Sep. 1987, 700-703.
Chinese Patent application 02826030.9, Amended Claims.
Chinese Patent application 02826030.9, Certificate of Patent, Patent No. ZL02826030.9.
Chinese Patent application 02826030.9, Notification of Registration/Allowance dated Jan. 5, 2007.
Chinese Patent application No. 02826030.9, First Office Action by the Chinese Patent Office dated Jun. 23, 2006, (English translation) 6 pages.
Chinese Patent application No. 02826030.9, US translation of pending claims, 10 pages.
Choudhury , et al., "Copyright Protection for Electronic Publishing over Computer Networks," IEEE Network Magazine, Jun. 1994, 18 pages.
Chow et al., "Forgery and Temper-Proof Identification Document," IEEE Proc. 1993 Int. Carnahan Conf. on Security Technology, Oct. 13-15, 1993, pp. 11-14.
Clariant Masterbatches Division Price Quotation #474938, Nov. 30, 2000, 2 pages.
Clariant Masterbatches, pricing, #762998, 2 pages.
Clarke, "Invisible Code Tags Electronic Images," Electronic Engineering Times, Jun. 12, 1995, n. 852, p. 42.
Collins, et al., "Using Bar Code—Why Its Taking Over", Second Edition, Data Capture Institute, 1990 (Contents & Index).
Cox et al., "Secure Spread Spectrum Watermarking for Images, Audio, and Video," IEEE1996, pp. 243-246.
Cox et al., "Secure Spread Spectrum Watermarking for Multimedia," NEC Research Institute Technical Report, Dec. 5, 1995, 33 pages.
Datacard DCL30, "The Most Secure Card Personalization System for ID Programs," 2002, 3 pages.
Dautzenberg, "Watermarking Images," Department of Microelectronics and Electrical Engineering, Trinity College Dublin, 47 pages, Oct. 1994.
Dittman, J. et al., Content-based Digital Signature for Motion Pictures Authentication and Content-Fragile Watermarking, IEEE Proc. Int. Conf. on Multimedia Computing and Systems, Jun. 1999, pp. 209-213.
Dittman, J., "Chapter 3: Telltale Watermarking," in Multiresolution Digital Watermarking: Algorithms and Implications for multimedia signals, Ph.D. thesis at Univ. of Toronto, 1999, pp. 23-52.
Dittmann et al., "Hologram Watermarks for Document Authentications," IEEE 2001, pp. 60-64.
Effekte, "Plastics on the Rise," Mar. 2001, 12 pages.
EM Industries inc., Lazer Flair LS Series Pigments, Dec. 11, 2002/ 3 pages.
EMI "Screening Content from Compact Discs: ID Trac," SDMII Jun. 3, 1999, 13 pages.
EP 01992398.6 first examination report, dated Jan. 7, 2005.
EP 01992398.6 notice of grant, dated Nov. 28, 2005.
EP 01992398.6 response to first examination report , dated Jul. 18, 2005.
EP02790154, European Patent Office Communication and Search Report, Mar. 6, 2006, 4 pages.
EP02790154.5, Communication Under Rule 71(3) EPC, dated Feb. 29, 2008.
Eric Kllefeld, "Passports to contain RFID chips next year: Government says it's "more secure"; ACLU raises privacy concerns," Wisconsin Technology Network, published at <http://wistechnology.com/article.php!id=2444>, (published oon Nov. 2, 2005; submitted sheets printed from the internet on Mar. 23, 2006), 3 pages.
Examiner's Report dated May 2, 2006, from CA Application No. 2,470,600 (corresponding to PCT/US02/41681; Published as WO03/056507).
Final Rejection, U.S. Appl. No. 10/836,639, Bi et al., filed Apr. 29, 2004, mailed Apr. 1, 2008.
Final Rejection, U.S. Appl. No. 10/836,639, Bi et al., filed Apr. 29, 2004, mailed Sep. 21, 2006.
Fitzgerald, "Invisible Digital Copyright ID," Editor & Publisher, Jun. 25, 1994, p. 62.
Friedman, "The Trustworthy Digital Camera: Restoring Credibility to the Photographic Image," IEEE Transaction on Consumer Electronics, vol. 39, No. 4, Nov. 1993, pp. 905-910.
Graff, "Laser Marking Makes bigger Imprint in Plastics," Aug. 11, 2004, 7 pages.
Grieco, Jr. et al.,"Behind Bars—Bar Coding Principles and Applications", PT Publication, Inc., 1989 (Table of Contents & Index).
Hecht, "Embedded Data Glyph Technology for Hardcopy Digital Documents," SPIE vol. 2171, Feb. 1994, pp. 341-352.
Hill, "Cure of Thermoset Industrial Coatings," Proc. 2d Pacific Coatings forum, Nov. 1-3, 1997, 6 pages.
Humphrey, "Stamping Out Crime," Hollywood Reporter, Jan. 26, 1994, p. S48.
Jain, "Image Coding Via a Nearest Neighbors Image Model," IEEE Transactions on Communications, vol. COM-23, No. 3, Mar. 1975, pp. 318-331.
JPEG Group's JPEG Software (release 4), ftp.csua.berekeley.edu/pub/cypherpunks/applications/jsteg/jpeg.announcement.gz, Jun. 7, 1993, 2 pages.
Kassam, Signal Detection in Non-Gaussian Noise, Dowden & Culver, 1988, pp. 1-96.
Kawaguchi, et al., "Principle and Applications of BPCS-Streganography," Proc. SPIE vol. 3258: Multimedia Systems and Applications, Nov. 2-4, 1998, pp. 464-473.
Koch, et al., "Copyright Protection for Multimedia Data," Fraunhofer Institute for Computer Graphics, Dec. 16, 1994, 15 pages.
Koch, et al., "Towards Robust and Hidden Image Copyright Labeling," Proc. of 1995 IEEE Workshop on Nonlinear Signal and Image Processing, Jun. 20-22, 1995 4 pages.
Komatsu et al., "Authentication System Using Concealed Image in Telematics," Memoirs of the School of Science & Engineering, Waseda Univ., No. 52, 1988, pp. 45-60.
Komatsu, et al., "A Proposal on Digital Watermarking in Document Image Communication and Its Application to Realizing a Signature," Electronics and Communications in Japan, Part I, vol. 73, No. 5, 1990, pp. 22-23.
Kundur et al., "A Robust Digital Image Watermarking Method and Wavelet-Based Fusion," IEEE Jul. 1997, pp. 544-547.
Kurak et al., "A Cautionary Note on Image Downgrading," 1992 IEEE, pp. 153-159.
Lamy, P. et al., "Content-Based Watermarking for Image Authentication, "Proc. 3.sup.rd Int. Workshop on Information Hiding, Sep. Oct. 1999, pp. 187-198.
Lin, C.-Y. et al., "Generating Robust Digital Signature for Image/Video Authentication," Proc. Multimedia and Security Workshop at ACM Multimedia '98, Sep. 1998, pp. 49-54.
Lin, C.-Y. et al., "Issues and Solutions for Authenticating MPEG Video," Proc. SPIE vol. 3657: Security and Watermarking of Multimedia Contents, Jan. 1999, pp. 54-65.
Luc, "Analysis of Spread Spectrum System Parameters for Design of Hidden Transmission," Radioengineering, vol. 4, No. 2, Jun. 1995, pp. 26-29.
Machado, "Announcing Stego 1.0a2, The First Steganography Tool for the Macintosh," Internet reference, Nov. 28, 1993, 3 pages.
Macq, "Cryptology for Digital TV Broadcasting," Proceedings of the IEEE, vol. 83, No. 6, Jun. 1995, pp. 944-957.
Matsui et al., "Embedding a Signature to Pictures under Wavelet Transformation," Transactions of the Institute of Electronics Information and Communication Engineers D-II, vol. J79D-II, No. 6, Jun. 1996, pp. 1017-1024.
Matsui et al., "Video-Steganography: How to Secretly Embed a Signature in a Picture," IMA Intellectual Property Project Proceedings, Jan. 1995, vol, 1, Issue 1, pp. 187-205.
Matthews, "When Seeing is Not Believing," New Scientist, Oct. 16, 1993, pp. 13-15.
Meerwald et al., "A Survey of wavelet-Domain Watermarking Algorithms," Proc. of SPIE vol. 4314 (2001), pp. 505-516.

Mintzer et al., "Safeguarding Digital library Contents and Users" Digital watermarking, D-Lib Magazine, Dec. 1997: ISSN 1082-9873.

Moller, et al., "Rechnergestutzte Steganographie: Wie sie Funktioniert und warum folglich jede Reglementierung von Verschlusselung unsinnig ist," DuD, Datenschutz und Datensicherung, 18/6 (1994) 318-326.

Nakamura et al., "A Unified Coding Method of Dithered Image and Text Data Using Micropatterns," Electronics and Communications in Japan, Part 1, vol. 72, Nov. 4, 1989, pp. 50-56.

Nakamura et al., "A Unified Coding Method of Image and Text Data Using Discrete Orthogonal Transform," Systems and Computers in Japan, vol. 21, No. 3, 1990, pp. 87-92.

Non-Final Rejection, U.S. Appl. No. 10/836,639, Bi et al., filed Apr. 29, 2004, mailed Apr. 14, 2009.

Non-Final Rejection, U.S. Appl. No. 10/836,639, Bi et al., filed Apr. 29, 2004, mailed Aug. 8, 2007.

Non-Final Rejection, U.S. Appl. No. 10/836,639, Bi et al., filed Apr. 29, 2004, mailed Mar. 10, 2006.

Non-Final Rejection, U.S. Appl. No. 10/836,639, Bi et al., filed Apr. 29, 2004, mailed Aug. 10, 2005.

O'Ranaidh et al., "Rotation, Scale and Translation Invariant Digital Image Watermarking," submitted to Signal Processing, Aug. 21, 1997, pp. 2-19.

O'Ruanaidh et al., "Rotation, Scale and translation Invariant Digital Image Watermarking," Int. Conf. on Image Proc., Oct. 1997 IEEE, pp. 536-539.

O'Ruanaidh et al., "Rotation, Scale and Translation Invariant Spread Spectrum Digital Image Watermarking," Signal Processing 66, May 1, 1998, pp. 303-317.

O'Ruanaidh, et al., Phase Watermarking of Digital Images. Proc ICIP-96, Lausanne, Switzerland, Sep. 16-19, 1996. p. 239-242.

Oct. 18, 2007 Communication from the European Patent Office in Application No. EP 02 805 980.6.

Office Action dated May 13, 2008, from U.S. Appl. No. 10/677,092, 5 pages.

Ohnishi et al., Embedding a Seal into a Picture Under Orthogonal Wavelet Transform, Proceedings of Multimedia '96, 1996, IEEE, pp. 514-521.

Palmer, "The Bar Code Book", Third Edition, Helmers Publishing, Inc., 1995 (Contents & Index).

PCT—International Search Report for International Application No. PCT/US02/41644, mailed on May 30, 2003.

PCT—International Search Report for International Application No. PCT/US02/41681, mailed on Jun. 5, 2003.

PCT—Notification of Transmittal of the International Search Report or the Declaration, for International Application No. PCT/US02/41644, mailed on May 30, 2003.

PCT—Notification of Transmittal of the International Search Report or the Declaration, for International Application No. PCT/US02/41681, mailed on Jun. 5, 2003.

PCT Written Opinion for International Application No. PCT/US01/50843, mailed Mar. 18, 2004. All references cited in this PCT written Opinion were already of record in the U.S. equivalent of this international Application, but are listed herein and copies are provided herein.

PCT—International Search Report for International Application No. PCT/US02/41320.

PCT—Notification of Transmittal of the International Search Report or the Declaration, for International Application No. PCT/US02/41320, mailed on Jul. 28, 2003.

Pennebaker et al., JPEG Still Image Data Compression Standard, Chapter 3, "Aspects of the Human Visual System," pp. 23-27, 1993 Van Nostrand Reinhold, New York.

Pereira et al, "Template Based Recovery of Fourier-Based Watermarks Using Log-polar and Log-log Maps", 1999, IEEE, pp. 870-874.

Pitas et al., "Applying Signatures on Digital Images," IEEE Workshop on Nonlinear and Signal Processing, Neos Marmaras, Greece, pp. 460-463, Jun. 1995.

Plastics Technology, "Laser Marking Has a Bright Future in Plastics," <http://www.plasticstechnology.com/articles/200108fal.html,8/01>, 5 pages.

Port, "halting Highway Robbery on the Internet," Business Week, Oct. 17, 1994, p. 212.

Printed copy of a PolyOne company web page for Fast Mark colorants, 2 printed pages, printed on Dec. 15, 2003 and accessed from: <http://www.polyone.com/bizunit/bizunit_info.asp?ID1={4D07B4ED-C098-43E4-B802-21413A1FA74C} &ID2={8C29FDCA-7C9E-433E-897A-DB6354A01CAA}&ID3-32 {00000000-0000-0000-0000-000000000000} &ID4={FE3434DA-7FA0-4FFF-99AF-CDD99EC16AE1} &bizUnit=NA-P-CM&line=&sub=none>.

Rindfrey, "Towards an Equitable System for Access Control and Copyright Protection in Broadcast Image Services: The Equicrypt Approach," Intellectual Property Rights and New Technologies, Proc. of the Conference, R. Oldenbourg Verlag Wien Munchen 1995, 12 pages.

Roberts, "Picture Coding Using Pseudorandom Noise," IRE Trans. on Information Theory, vol. 8, No. 2, Feb. 1962, pp. 145-154.

Sandford II, et al., "The Data Embedding Method," SPIE vol. 2615, Oct. 23, 1995, pp. 226-259.

Santroprene, "Add Value to Your TPEs with Special Effects," not dated, 12 pages.

Sapwater et al., "Electronic Copyright Protection," PHOTO>Electronic Imaging, vol. 37, No. 6, 1994, pp. 16-21.

Schneider, M. "A Robust Content Based Digital Signiture for Image Authentication," IEEE Proc. Int. Conf. on Image Processing, Sep. 1996, pp. 227-230 (vol. 3).

Schneier, "Digital Signatures, Cryptographic Algorithms Can Create Nonforeable Signatures for Electronic Documents, Making Them Valid Legal Instruments" BYTE, No. 1993, pp. 309-312.

Schreiber et al., "A Compatible High-Definition Television System Using the Noise-Margin Method of Hiding Enhancement Information," SMPTE Journal, Dec. 1989, pp. 873-879.

Search reportPCT/US03/32886, mailed Mar. 30, 2004.

shaggy@phantom.com, "Hide and Seek v. 4.0," Internet reference, Apr. 10, 1994, 3 pages.

Sharma et al., "Practical Challenges for Digital Watermarking Applications", May 3, 2001, pp. 1-10.

Sheng et al., "Experiments on Pattern Recognition Using Invariant Fourier-Mellin Descriptors," Journal of Optical Society of America, vol. 3, No. 6, Jun. 1986, pp. 771-776.

Short, "Steps Toward Unmasking Secure Communications," International Journal of Bifurcaton and Chaos, vol. 4, 1994, pp. 959-977.

Simmons, "Subliminal Channels; Past and Present," ETT, vol. 5 No. 4, Jul.-Aug. 1994, pp. 45-59.

Supplemental European Search Report dated Jul. 20, 2006, from EP Application No. 02805980 (Corresponding to PCT/US02/41681; Published as WO03/056507).

Szepanski, "A Signal Theoretic Method for Creating Forgery-Proof Documents for Automatic Verification", 1979 Carnahan Conference on Crime Countermeasures, University of Kentucky, Lexington, Kentucky, May 16-18, 1979, pp. 101-109.

Szepanski, "Additive Binary Data Transmission for Video Signals," Papers Presented at Conf. of Comm. Engineering Soc. Sep. 30-Oct. 3, 1980, Technical Reports vol. 74, 342-352.

Tanaka et al., "A Visual Retrieval System with Private Information for Image Database," Proceeding International Conference on DSP Applications and Technology, Oct. 1991, pp. 415-421.

Tanaka et al., "Embedding Secret Information into a Dithered Multi-Level Image," Proc. IEEE Military Comm. Conf., Sep. 1990, pp. 216-220.

Tanaka et al., "New Integrated Coding Schemes for Computer-Aided Facsimile," Proc. IEEE, Int'l Conf. on Sys. Integration, Apr. 1990, pp. 275-281.

Tanaka, "Embedding the Attribute Information Into a Dithered Image," Systems and Computers in Japan, vol. 21, No. 7, 1990, pp. 43-50.

Tirkel et al., "Electronic Water Mark," DICTA-93, Macquarie University, Sydney, Australia, Dec. 1993, pp. 666-673.

Toga et al., "Registration Revisited," Journal of Neuroscience Methods, 48 (1993), pp. 1-13.

U.S. Appl. No. 10/836,639, Bi et al., filed Apr. 29, 2004.

U.S. Appl. No. 10/942,321, US Patent Office Communication dated Aug. 4, 2006, 7 pages.

van Schyndel et al., "A Digital Watermark," IEEE International Conference on Image Processing, Nov. 13-16, 1994, pp. 86-90.

Van Schyndel et al., "Towards a Robust Digital Watermark," ACCV '95, vol. 2, Dec. 1995, pp. 504-508.

W. Rankl and W. Effing, "Smart Card Hand Book" 1997, John Wiley & Sons, pp. 35-40.

Wagner, "Fingerprinting," 1983 IEEE, pp. 18-22.

Walton, "Image Authentication for a Slippery New Age," Dr. Dobb's Journal, Apr. 1995, pp. 1826, 82-87.

Weber et al., "Correlative Image Registration," Seminars in Nuclear Medicine, vol. XXIV, No. 4, Oct. 1994, pp. 311-323.

Wise, "The History of Copyright, Photographers' Rights Span Three Centuries," Photo>Electronic Imaging, vol. 37, No. 6, 1994.

WO02/052499 search report, dated Aug. 30, 2002.

WO02/052499 Written Opinion, dated Mar. 18, 2004.

Xie, L. et al., "Secure MPEG Video Communications by Watermarking," Proc. Conf. of ATIRP (Advanced Telecommunications and Information Distribution Research Project), Feb. 1999, pp. 459-462.

Yeung et al., "Digital Watermarks: Shedding Light on the Invisible," Nov.-Dec. 1998, IEEE Micro vol. 18, No. 6, pp. 32-41.

| Elt | XRay | W% | A% | Formula | Ox% |
|---|---|---|---|---|---|
| S | Ka | 36.2 | 53.7 | | 0.0 |
| Zn | Ka | 63.8 | 46.3 | | 0.0 |
| | | 100.0 | 100.0 | | 0.0 |

| Measures & Results | | | | | |
|---|---|---|---|---|---|
| Elt | XRay | W% | A% | Formula | Ox% |
| Na | Ka | 5.6 | 18.2 | | 0.0 |
| Al | Ka | 2.0 | 5.5 | | 0.0 |
| Cl | Ka | 1.4 | 2.9 | | 0.0 |
| K | Ka | 13.8 | 26.4 | | 0.0 |
| Cu | Ka | 2.7 | 3.2 | | 0.0 |
| I | La | 74.5 | 43.8 | | 0.0 |
| | | 100.0 | 100.0 | | 0.0 |

| Measures & Results | | | | | |
|---|---|---|---|---|---|
| Elt | XRay | W% | A% | Formula | Ox% |
| Na | Ka | 3.3 | 10.7 | | 0.0 |
| Al | Ka | 3.7 | 10.2 | | 0.0 |
| K | Ka | 18.1 | 34.5 | | 0.0 |
| Cu | Ka | 1.1 | 1.3 | | 0.0 |
| I | La | 73.7 | 43.2 | | 0.0 |
| | | 100.0 | 100.0 | | 0.0 |

| Measures & Results | | | | | |
|---|---|---|---|---|---|
| Elt | XRay | W% | A% | Formula | Ox% |
| Na | Ka | 3.6 | 12.3 | | 0.0 |
| Al | Ka | 1.9 | 5.7 | | 0.0 |
| K | Ka | 15.2 | 30.7 | | 0.0 |
| Cu | Ka | 3.4 | 4.3 | | 0.0 |
| I | La | 75.8 | 47.0 | | 0.0 |
| | | 100.0 | 100.0 | | 0.0 |

| Measures & Results | | | | | |
|---|---|---|---|---|---|
| Elt | XRay | W% | A% | Formula | Ox% |
| Na | Ka | 5.7 | 18.6 | | 0.0 |
| Al | Ka | 2.0 | 5.7 | | 0.0 |
| K | Ka | 14.0 | 27.0 | | 0.0 |
| Cu | Ka | 3.7 | 4.4 | | 0.0 |
| I | La | 74.6 | 44.3 | | 0.0 |
| | | 100.0 | 100.0 | | 0.0 |

INCREASING THERMAL CONDUCTIVITY OF HOST POLYMER USED WITH LASER ENGRAVING METHODS AND COMPOSITIONS

CROSS REFERENCE TO RELATED APPLICATION

The present application is a continuation of Ser. No. 10/677,092, filed Sep. 30, 2003, now U.S. Pat. No. 7,728,047 which is a continuation-in-part of Ser. No. 10/326,886, filed Dec. 20, 2002 now abandoned and claims priority to 60/471,429, filed May 16, 2003 and claims priority to 60/500,204, filed Sep. 3, 2003, and claims priority to 60/504,352, filed Sep. 19, 2003, the contents of which are incorporated hereby by reference in their entirety:

RELATED APPLICATION DATA

The present application is related to U.S. patent application Ser. Nos. 09/747,735, filed Dec. 22, 2000, 09/602,313, filed Jun. 23, 2000, and 10/094,593, filed Mar. 6, 2002, U.S. Provisional Patent Application No. 60/358,321, filed Feb. 19, 2002, as well as U.S. Pat. No. 6,066,594. Each of the above U.S. Patent documents is herein incorporated by reference. The present application also is related to the following U.S. patent application documents:

Systems, Compositions, and Methods for Full Color Laser Engraving of ID Documents (application Ser. No. 10/330,034, filed Dec. 24, 2002—Inventor Robert Jones);

Laser Etched Security Features for Identification Documents and Methods of Making Same (application Ser. No. 10/330,033, filed Dec. 24, 2002—Inventors George Theodossiou and Robert Jones);

Identification Document and Related Methods (Application No. 60/421,254, Inventors: Geoff Rhoads, et al);

Identification Document and Related Methods (Application No. 60/418,762, Inventors: Geoff Rhoads, et al);

Enhanced Shadow Reduction System and Related Technologies for Digital Image Capture (Application No. 60/447,502, filed Feb. 13, 2003—Inventors Scott D. Haigh, Tuan A. Hoang, Charles R. Duggan, David Bohaker, and Leo M. Kenen);

Enhanced Shadow Reduction System and Related Technologies for Digital Image Capture (application Ser. No. 10/663,439, filed Sep. 15, 2003—Inventors Scott D. Haigh, Tuan A. Hoang, Charles R. Duggan, David Bohaker, and Leo M. Kenen);

TECHNICAL FIELD

The invention generally relates to methods and compositions for laser marking or engraving that contain one or more laser enhancing additives, as well as methods for conveying information, images, and security features on data carriers through laser engraving and marking, including laser engraving and marking using such compositions. In particular, the invention relates to techniques and methods for decreasing the marking speeds of images using a laser for marking of ID documents by increasing the thermal conductivity of the host polymer and its' interpenetrating network (IPN).

BACKGROUND AND SUMMARY

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening, and prior to boarding their flight. In addition, because we live in an ever-evolving cashless society, ID documents are used to make payments, access an ATM, debit an account, or make a payment, etc.

Many types of identification cards and documents, such as driving licenses, national or government identification cards, bank cards, credit cards, controlled access cards and smart cards, carry thereon certain items of information which relate to the identity of the bearer. Examples of such information include name, address, birth date, signature and photographic image; the cards or documents may in addition carry other variant data (i.e., data specific to a particular card or document, for example an employee number) and invariant data (i.e., data common to a large number of cards, for example the name of an employer). All of the cards described above will hereinafter be generically referred to as "ID documents".

In the production of images useful in the field of identification documentation, it is oftentimes desirable to embody into a document (such as an ID card, drivers license, passport or the like) data or indicia representative of the document issuer (e.g., an official seal, or the name or mark of a company or educational institution) and data or indicia representative of the document bearer (e.g., a photographic likeness, name or address). Typically, a pattern, logo or other distinctive marking representative of the document issuer will serve as a means of verifying the authenticity, genuineness or valid issuance of the document. A photographic likeness or other data or indicia personal to the bearer will validate the right of access to certain facilities or the prior authorization to engage in commercial transactions and activities.

Identification documents, such as ID cards, having printed background security patterns, designs or logos and identification data personal to the card bearer have been known and are described, for example, in U.S. Pat. No. 3,758,970, issued Sep. 18, 1973 to M. Annenberg; in Great Britain Pat. No. 1,472,581, issued to G. A. O. Gesellschaft Fur Automation Und Organisation mbH, published Mar. 10, 1976; in International Patent Application PCT/GB82/00150, published Nov. 25, 1982 as Publication No. WO 82/04149; in U.S. Pat. No. 4,653,775, issued Mar. 31, 1987 to T. Raphael, et al.; in U.S. Pat. No. 4,738,949, issued Apr. 19, 1988 to G. S. Sethi, et al.; and in U.S. Pat. No. 5,261,987, issued Nov. 16, 1993 to J. W. Luening, et al. All of the aforementioned documents are hereby incorporated by reference.

The advent of commercial apparatus (printers) for producing dye images by thermal transfer has made relatively commonplace the production of color prints from electronic data acquired by a video camera. In general, this is accomplished by the acquisition of digital image information (electronic signals) representative of the red, green and blue content of an original, using color filters or other known means. These signals are then utilized to print an image onto a data carrier. For example, information can be printed using a printer having a plurality of small heating elements (e.g., pins) for imagewise heating of each of a series of donor sheets (respectively, carrying sublimable cyan, magenta and yellow dye). The donor sheets are brought into contact with an image-receiving element (which can, for example, be a substrate) which has a layer for receiving the dyes transferred imagewise from the donor sheets. Thermal dye transfer methods as aforesaid are known and described, for example, in U.S. Pat. No. 4,621,271, issued Nov. 4, 1986 to S. Brownstein and U.S.

Pat. No. 5,024,989, issued Jun. 18, 1991 to Y. H. Chiang, et al. Each of these patents is hereby incorporated by reference.

Commercial systems for issuing ID documents are of two main types, namely so-called "central" issue (CI), and so-called "on-the-spot" or "over-the-counter" (OTC) issue.

CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail. Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a drivers license card through the mail.

Centrally issued identification documents can be produced from digitally stored information and generally comprise an opaque core material (also referred to as "substrate"), such as paper or plastic, sandwiched between two layers of clear plastic laminate, such as polyester, to protect the aforementioned items of information from wear, exposure to the elements and tampering. The materials used in such CI identification documents can offer the ultimate in durability. In addition, centrally issued digital identification documents generally offer a higher level of security than OTC identification documents because they offer the ability to pre-print the core of the central issue document with security features such as "micro-printing", ultra-violet security features, security indicia and other features currently unique to centrally issued identification documents. Another security advantage with centrally issued documents is that the security features and/or secured materials used to make those features are centrally located, reducing the chances of loss or theft (as compared to having secured materials dispersed over a wide number of "on the spot" locations).

In addition, a CI assembling process can be more of a bulk process facility, in which many cards are produced in a centralized facility, one after another. The CI facility may, for example, process thousands of cards in a continuous manner. Because the processing occurs in bulk, CI can have an increase in efficiency as compared to some OTC processes, especially those OTC processes that run intermittently. Thus, CI processes can sometimes have a lower cost per ID document, if a large volume of ID documents are manufactured.

In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to person, on the spot, after a successful exam.). In some instances, the very nature of the OTC assembling process results in small, sometimes compact, printing and card assemblers for printing the ID document.

OTC identification documents of the types mentioned above can take a number of forms, depending on cost and desired features. Some OTC ID documents comprise highly plasticized polyvinyl chloride (PVC) or have a composite structure with polyester laminated to 0.5-2.0 mil (13-51 .mu.m) PVC film, which provides a suitable receiving layer for heat transferable dyes which form a photographic image, together with any variant or invariant data required for the identification of the bearer. These data are subsequently protected to varying degrees by clear, thin (0.125-0.250 mil, 3-6 .mu.m) overlay patches applied at the print head, holographic hot stamp foils (0.125-0.250 mil 3-6 .mu.m), or a clear polyester laminate (0.5-10 mil, 13-254 .mu.m) supporting common security features. These last two types of protective foil or laminate sometimes are applied at a laminating station separate from the print head. The choice of laminate dictates the degree of durability and security imparted to the system in protecting the image and other data.

FIGS. 1 and 2 illustrate a front view and cross-sectional view (taken along the A-A line), respectively, of an exemplary prior art identification (ID) document 10. In FIG. 1, the prior art ID document 1 includes a photographic image 12, a bar code 14 (which may contain information specific to the person whose image appears in photographic image 12 and/or information that is the same from ID document to ID document), variable personal information 16, such as an address, signature, and/or birthdate, and biometric information 18 associated with the person whose image appears in photographic image 12 (e.g., a fingerprint). Although not illustrated in FIG. 1, the ID document 10 can include a magnetic stripe (which, for example, can be on the rear side (not shown) of the ID document 10), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

Referring to FIG. 2, the ID document 10 comprises a preprinted core 20 (such as, for example, white PVC material) that is, for example, about 25 mil thick. The core 20 is laminated with a transparent material, such as clear PVC material 22, which, by way of example, can be about 1-5 mil thick. The composite of the core 20 and clear PVC material 22 form a so-called "card blank" 25 that can be up to about 30 mils thick. Information 26a-c is printed on the card blank 25 using a method such as Dye Diffusion Thermal Transfer ("D2T2") printing (described further in commonly assigned U.S. Pat. No. 6,066,594, which is incorporated hereto by reference in its entirety.) The information 26a-c can, for example, comprise an indicium or indicia, such as the invariant or nonvarying information common to a large number of identification documents, for example the name and logo of the organization issuing the documents. The information 26a-c may be formed by any known process capable of forming the indicium on the specific core material used.

To protect the information 26a-c that is printed, an additional layer of overlaminate 24 can be coupled to the card blank 25 and printing 26a-c using, for example, 1 mil of adhesive (not shown). The overlaminate 24 can be substantially transparent. Materials suitable for forming such protective layers are known to those skilled in the art of making identification documents and any of the conventional materials may be used provided they have sufficient transparency. Examples of usable materials for overlaminates include biaxially oriented polyester or other optically clear durable plastic film.

The above-described printing techniques are not the only methods for printing information on data carriers such as ID documents. Laser beams, for example can be used for marking, writing, bar coding, and engraving many different types of materials, including plastics. Lasers have been used, for example, to mark plastic materials to create indicia such as bar codes, date codes, part numbers, batch codes, and company logos. It will be appreciated that laser engraving or marking generally involves a process of inscribing or engraving a document surface with identification marks, characters, text, tactile marks—including text, patterns, designs (such as decorative or security features), photographs, etc.

One way to laser mark thermoplastic materials involves irradiating a material, such as a thermoplastic, with a laser beam at a given radiation. The area irradiated by the laser absorbs the laser energy and produces heat which causes a visible discoloration in the thermoplastic. The visible discoloration serves as a "mark" or indicator; it will be appreciated that laser beams can be controlled to form patterns of "marks" that can form images, lines, numbers, letters, patterns, and the like. Depending on the type of laser and the type of material used, various types of marks (e.g., dark marks on light backgrounds, light marks on dark backgrounds, colored marks) can be produced. Some types of thermoplastics, such as polyvinylchloride (PVC), acrylonitrile butadiene styrene (ABS), and polyethylene terephthalate (PET), are capable of absorbing laser energy in their native states. Some materials which are transparent to laser energy in their native state, such as polyethylene, may require the addition of one or more additives to be responsive to laser energy.

For additional background, various laser marking and/or engraving techniques are disclosed, e.g., in U.S. Pat. Nos. 6,022,905, 5,298,922, 5,294,774, 5,215,864 and 4,732,410. Each of these patents is herein incorporated by reference. In addition, U.S. Pat. Nos. 4,816,372, 4,894,110, 5,005,872, 5,977,514, and 6179338 describe various implementations for using a laser to print information, and these patents are incorporated herein in their entirety.

Using laser beams to write or engrave information to ID cards presents a number of advantages over conventional printing. For example, the foaming of the thermoplastic that can occur with some types of laser engraving can be adapted to provide an indicium having a tactile feel, which is a useful authenticator of a data carrier that also can be very difficult to counterfeit or alter. In addition, laser engraving generally does not require the use of ink, which can reduce the cost of consumables used to manufacture an ID card. Laser engraving can also be more durable than ink printing, and more resistant to abrasion (which can be particularly useful if a counterfeiter attempts to "rub off" an indicium on an ID card). The resolution and print quality of laser engraving often can be higher than that of conventional ink-based printing. Laser engraving also can be a more environmentally friendly manufacturing process than printing with ink, especially because solvents and other chemicals often used with ink generally are not used with laser engraving.

Despite the advantages of laser engraving, certain limitations still exist. Even when using known laser-enhancing additives, laser marking of some types of materials does not produce an adequate contrast for all applications. Some types of materials, such as silica filled polyolefin, TESLIN core ID documents and TESLIN composite structures (TESLIN is available from PPG Industries, Inc., Pittsburgh, Pa.) using conventional over-laminate materials, are not easily laser engraved. Further, even with use of known laser additives, laser engraving can take too much time and/or too much laser energy to be useful in some manufacturing environments.

Another limitation of laser engraving has been marking speeds. The ability to mark a rastered image via a laser such as a diode pumped YAG laser requires understanding of at least three primary components: materials (e.g., card or other substrate), image information, and laser conditions. All three can work together to determine the speed at which an acceptable mark is made via laser engraving/marking. Depending on the speed required and the volume of documents to be made, a certain number of lasers will be needed to engrave the documents. Laser engraving machines are quite costly at present, and despite various improvements made to laser engraving machines to increase speed, laser engraving documents at an acceptable speed and throughput and image quality continues to require, in many instances, multiple laser engraving machines. We have found, however, that by making certain changes to the materials being engraved (which changes are described further herein), it is possible to decrease the time required for laser engraving/marking of images. Decreasing this marking speed can help to increase throughput and may help to reduce the number of laser engraving machines that are required.

In one aspect, we have found that laser engraving of some types of materials, including materials that are not easily engraved (such as laminated TESLIN core ID documents), can be improved by increasing the sensitivity to laser radiation of a laminate used with the material and/or increasing the sensitivity to laser radiation of a coating applied to the material.

One inventive technique disclosed herein improves the material being laser marked or laser engraved by introducing inventive laser enhancing additives to the material. The material can be a laminate, a coating, an article having a laminate or coating formed thereon, and even an image receiving layer/image capable layer that is used for receiving images printed in a manner such as D2T2, laser xerography, inkjet, and mass transfer printing. Components of the laser enhancing additive described herein also can be added, alone or combined with other components, to a series of materials having a laser-receptive optical path between them, to enhance the laser engraving of at least one material in the series. These additives facilitate material sensitivity, greatly improving the ability to laser engrave laminated ID documents. In some embodiments, these additives can also improve the performance of laser engraving even on even those structures (e.g., fused polycarbonate card structures, polyvinylchloride (PVC), polyethylene terephthalate (PET), and acrylonitrile butadiene styrene (ABS)) that can tend to be more easily engraved by laser energy.

The inventors have found that by using the inventive additives described herein, the processing time for polycarbonate and other ID card structures may be decreased. In addition, user of the laser enhancing additives described herein may enable laser engraving to be accomplished using less laser energy and/or lower levels of laser energy than in known methods. Another inventive technique disclosed herein improves the sensitivity of a material being laser engraved by applying a coating to the material, the coating containing at least one laser enhancing additive as described below. The material can be part of virtually any type of article to be laser marked or laser engraved. For example, in one embodiment the material is a core layer in an identification document.

In one embodiment, the additive used to enhance laser engraving comprises a mixture of at least one of copper potassium iodide ($CuKI_3$) or Copper Iodide (CuI) or potassium iodide (KI) or sodium iodide (NaI) or aluminum iodide (AlI) along with at least one substance selected from the group consisting of zinc sulfide (ZnS), barium sulfide (BaS), alkyl sulfonate (e.g., $RSO_2Na$ or $R-OSO_2Na$), and Thioester (e.g., substances containing —SH). This additive can be added to a laminate layer (where the laminate layer itself is to be laser engraved or marked) and/or to a coating (where the surface being coated is to be laser engraved or marked).

Advantageously, in one embodiment, the additive comprises an effective amount of copper iodide, potassium iodide, sodium iodide, aluminum iodide, and zinc sulfide in a host material. The host material can, for example, be a laminate or a coating. The host material also can be another material that is later added to a laminate or coating. The host material can, for example, be a thermoplastic or thermoset. The host material can be a material added or applied to another material to make that material more receptive to another type of printing or marking (e.g., an image receiving layer, such as is disclosed in commonly assigned U.S. Pat. No. 6,066,594, the contents of which are hereby incorporated by reference).

In another advantageous embodiment, the additive comprises an effective amount of any combination thereof of copper iodide, potassium iodide, sodium iodide, aluminum iodide, zinc sulfide, barium sulfide (BaS), alkyl sulfonate (e.g., $RSO_2Na$ or $R—OSO_2Na$), and Thioester (e.g., substances containing —SH), in a host material. The host material can, for example, be a laminate or a coating. The host material also can be another material that is later added to a laminate or coating. The host material can, for example, be a thermoplastic or thermoset. The host material can be a material added or applied to another material to make that material more receptive to another type of printing or marking (e.g., an image receiving layer, such as is disclosed in commonly assigned U.S. Pat. No. 6,066,594, the contents of which are hereby incorporated by reference).

For laminates, the host material (as well as the laminate to which the host material may be added) generally can be any material whose laser engraving/marking properties are improved by the addition of the laser enhancing additive described herein, and it is expected that many materials developed in the future will be able to make use of the additive described herein. In at least one embodiment, the addition of the laser enhancing additive described herein enables the laminate to be laser engraved with a grayscale image. In another aspect of the invention, described further herein, we have found that for host materials that are polymers, improving the thermal conductivity of the host material and/or its interpenetrating network (IPN) (e.g., matrices) can help to decrease marking time for laser marking/engraving of images.

In at least one embodiment, the laminate containing the inventive laser enhancing additive can be applied to a layer of material and, after application of heat and pressure to the laminate (e.g., via a platen press), the laminate can comingle with the layer of material enough to actually improve the laser engraving properties of the layer of material that was laminated.

For coatings, in one embodiment, the additive comprises an effective amount of copper potassium iodide and zinc sulfide in a liquid carrier material, which together form a coating that can be applied to an article to be laser engraved. The liquid carrier material can be virtually any known material that can be used as a coating, including resins, polyesters, polycarbonates, vinyls, acrylates, urethanes, and cellulose-base coating. In one embodiment, the liquid carrier material is a material used for coating a surface of a core material (e.g., TESLIN, polycarbonate) of an identification document. The surface being coated generally can be any material (including laminates) whose laser engraving properties are improved by the addition of a coating containing the laser enhancing additive described herein. In at least one embodiment, the addition of the inventive additive to a coating enables the surface to be capable of being engraved with a grayscale image.

For coatings, in another embodiment, the additive comprises an effective amount of at least one of Copper Iodide (CuI), potassium iodide (KI), sodium iodide (NaI), aluminum iodide (AlI), copper potassium iodide, zinc sulfide, and any combination thereof, in a liquid carrier material, which together form a coating that can be applied to an article to be laser engraved. The liquid carrier material can be virtually any known material that can be used as a coating, including resins, polyesters, polycarbonates, vinyls, acrylates, urethanes, and cellulose-base coating. In one embodiment, the liquid carrier material is a material used for coating a surface of a core material (e.g., TESLIN, polycarbonate) of an identification document. The surface being coated generally can be any material (including laminates) whose laser engraving properties are improved by the addition of a coating containing the laser enhancing additive described herein. In at least one embodiment, the addition of the inventive additive to a coating enables the surface to be capable of being engraved with a grayscale image.

In at least one embodiment, the coating containing the inventive laser enhancing laminate can be applied to a layer of material and, after application of heat and pressure to the coating (e.g., via a platen press), the coating can comingle with the layer of material enough to actually improve the laser engraving properties of the layer of material that was coated.

For transparent laminates and/or coatings, the effective amount of the laser enhancing additive can vary depending on the tolerance for possible reduction in the transparency of the laminate or coating. In one embodiment, for transparent laminates or coating, the effective amount of the additive can range from 0.001% by weight up to about 0.1% by weight (based on the total weight of the material to which the additive is added.).

For non-transparent laminates and/or coatings (e.g. colored coatings, colored laminates and/or opaque laminates), the effective amount of the additive can be higher than 1% (e.g., 1%-100%). Those skilled in the art will recognize that the effective amount of the additive for a given use can depend on a number of factors, including the properties of the laminate or coating, the type of laser engraving being performed (e.g., grayscale or non-grayscale), the type of laser used, the desired properties or features of the article or surface being engraved, etc. Advantageously, for at least some transparent laminates and/or coatings used in forming identification documents, the effective amount of the additive is about 0.06% by weight.

In another advantageous embodiment, the constituents of the above-described additive can be present in one or more different layers through which a laser beam can pass. In one example, the copper potassium iodide (or copper Iodide (CuI) or potassium iodide (KI) or sodium iodide (NaI), aluminum iodide (AlI) and any combination thereof) can be present in a first layer of laminate and the zinc sulfide (or barium sulfide (BaS), alkyl sulfonate (e.g., $RSO_2Na$ or $R—OSO_2Na$), Thioester (e.g., substances containing —SH) and combinations thereof) can be present in a second layer of laminate, where the first and second layers are either adjacent or separated by one or more layers of material (e.g., another laminate or an adhesive) that is transparent to laser radiation. When a laser beam is directed such that it passes through both of the layers, the combined action of the copper potassium iodide and zinc sulfide enable laser engraving to occur in either or both of the layers. In another example, an effective amount of copper potassium iodide can be present in a coating applied to an article and an effective amount of zinc sulfide can be present in a laminate applied over the coating.

In another example, each of the constituents of the inventive laser enhancing additive (e.g., copper, potassium, iodine, etc.) can be present in a separate layer of coating and/or laminate, where the respective layers are either adjacent or separated by one or more layers of material (e.g., another laminate or an adhesive) that is transparent to laser radiation.

When a laser beam is directed such that it passes through all of the layers containing a constituent of the inventive laser enhancing additive, the combined action of the constituents enable laser engraving to occur in at least one of the respective layers. The constituents also can be combined with one or more other constituents, in different layers, in this manner. For example, an effective amount of copper iodide and sodium iodide can be present in a coating applied to an article and an effective amount of zinc sulfide and potassium iodide can be present in a laminate applied over the coating, and an effective amount of aluminum iodide can be present in a coating that is then applied over that laminate. This example is not, of course, limiting; those skilled in the art will appreciate that there are many different ways to combine and/or separate the constituents of the inventive laser enhancing additive into one or more layers of coatings and/or laminates.

In another aspect, the invention provides a composition having laser engraving properties, comprising a host material and an effective amount of a laser enhancing additive. The laser enhancing additive comprises a first quantity of least one of: copper potassium iodide ($CuKI_3$), Copper Iodide (CuI), potassium iodide (KI), sodium iodide (NaI), aluminum iodide (AlI), and any combination thereof, and a second quantity of at least one substance selected from the group consisting of zinc sulfide (ZnS), barium sulfide (BaS), alkyl sulfonate, and thioester, and any combination thereof. In one embodiment, the first and second quantities are the same (for example, one part copper iodide and one part barium sulfide). In one embodiment, the first and second quantities are different (for example, three parts potassium iodide to one part zinc sulfide, or 2 parts copper iodide to 4 parts thioester). In one embodiment, the composition is markable by at least one of an excimer, Nd:YAG, and $CO_2$ laser (including both light pumped and diode pumped Nd:YAG lasers).

In one embodiment, the laser enhancing additive is present in the composition in an amount from about 0.001 to 0.100 percent by weight based on the total weight of the composition. In one embodiment, the laser enhancing additive is present in an amount between 0.1 percent and 100 percent by weight based on the total weight of the composition. In one embodiment, the laser enhancing additive is present in an amount that is about 0.06 percent by weight based on the total weight of the composition. In one embodiment, the laser enhancing additive comprises 0.03 percent by weight of at least one of copper potassium iodide ($CuKI_3$), Copper Iodide (CuI), Potassium Iodide (KI), Sodium Iodide (NaI), Aluminum Iodide (AlI) and any combination thereof, and 0.03 percent by weight of at least one of zinc sulfide (ZnS), barium sulfide (BaS), alkyl sulfonate, and thioester, or any combination thereof, each weight based on the total weight of the composition.

In one embodiment, the host material of the composition is be a material that is not sensitive and/or transparent to laser radiation, such as a material that, by itself, is unable to have acceptable gray scale images laser engraved onto it. The host material can be a laminate or a coating. For example, the host material can comprise at least one of a thermosetting material, thermoplastic, polymer, copolymer, polycarbonate, fused polycarbonate, polyester, amorphous polyester, polyolefin, silicon-filled polyolefin, TESLIN, foamed polypropylene film, polyvinyl chloride, polyethylene, thermoplastic resins, engineering thermoplastic, polyurethane, polyamide, polystyrene, expanded polypropylene, polypropylene, acrylonitrile butadiene styrene (ABS), ABS/PC, high impact polystyrene, polyethylene, polyethylene terephthalate (PET), PET-G, PET-F, polybutylene terephthalate PBT), acetal copolymer (POM), polyetherimide (PEI), polyacrylate, poly (4-vinylpyridine, poly(vinyl acetate), polyacrylonitrile, polymeric liquid crystal resin, polysulfone, polyether nitride, and polycaprolactone, and combinations thereof. In one advantageous embodiment, it has been found that selecting host materials with relatively high degrees of crystallinity (e.g., PET) can help to improve the thermal conductivity of the resultant host material when the inventive laser enhancing additive is added to it.

We have further discovered other techniques for improving thermal conductivity of the host material to improve laser engraving efficiency. In one embodiment, the host material comprises a material having cross-linked functionality. In one embodiment, the host material further comprises a second element, such as a transparent, conductive polymer, such as a cross-linked moiety such as polyurethane, glass beads, glass fibers, and CR-39 (a highly cross-linked thermoset prepared by polymerization of diethylene glycol bis(allyl carbonate) monomer, available from PPG Industries). In one advantageous embodiment, a very low concentration of the second element is blended with the host material. In one advantageous embodiment, the host material comprises at least one of glass beads, glass fibers, and glass threads along with a cross-linking agent.

In one embodiment, the thermal conductivity of the host material is changed by processing the host material to change its orientation and/or density. Those skilled in the art will be familiar with the various types of processes and operations that can operate to change orientation and/or density of a host material.

In at least one embodiment, the invention provides an article of manufacture (such as an identification document) capable of being laser engraved with a grayscale image, comprising a core layer, a first layer and a second layer. The core layer has a first surface. The first layer comprises a first host material, the first host material comprising an effective amount of a first laser enhancing additive comprising at least one of one of copper potassium iodide ($CuKI_3$), Copper Iodide (CuI), Potassium Iodide (KI), Sodium Iodide (NaI), Aluminum Iodide (AlI) and any combination thereof. The second layer comprises a second host material and is oriented in relation to the first host material such that a single laser beam can penetrate both at least a portion of the first layer and at least a portion of the second layer. The second host material comprises an effective amount of at least one second laser enhancing additive selected from the group consisting of zinc sulfide (ZnS), barium sulfide (BaS), alkyl sulfonate, and thioester, and any combinations thereof. The first and second layers are operably coupled to each other and at least one of the first and second layers is operably coupled to the first surface of the core layer. In one embodiment, a grayscale image is laser engraved into at least one of the first and second layers.

In one embodiment, first layer is substantially transparent and the first laser enhancing additive is present in an amount from about 0.001 to 0.100 percent by weight based on the total weight of the first host material. In one embodiment, the second layer is substantially transparent, and the second laser enhancing additive is present in an amount from about 0.001 to 0.100 percent by weight based on the total weight of the second host material. In one embodiment, a third layer is disposed between the first and second layers; the third layer comprises a material that permits transmission of a laser beam therethrough.

In another aspect, the invention provides a method of engraving a material by exposing the material to laser radiation. An effective amount of a laser enhancing additive is added to the material. The laser enhancing additive comprises at least one of copper potassium iodide ($CuKI_3$), Copper Iodide (CuI), Potassium Iodide (KI), Sodium Iodide (NaI), Aluminum Iodide (AlI) and any combination thereof, and at least one substance selected from the group consisting of zinc sulfide (ZnS), barium sulfide (BaS), alkyl sulfonate, and thioester, and any combinations thereof. The material is exposed to laser radiation in a manner that causes the material to be engraved by the laser radiation. In one embodiment, the effective amount of the laser enhancing additive comprises 0.01% to 0.1% by weight of the material, e.g. 0.06% by weight. In one embodiment, the effective amount of the laser enhancing additive comprises 0.1% to 100% by weight of the material. In one embodiment, an indicium is formed in grayscale in at least a portion of the material through the exposure of the portion of the material to laser radiation. In one embodiment, the laser engraved material is used in the manufacture of an identification document.

In another embodiment, the invention provides a method of laser engraving a grayscale image on an article having first and second layers. A first effective amount of at least one of copper potassium iodide ($CuKI_3$), Copper Iodide (CuI), Potassium Iodide (KI), Sodium Iodide (NaI), Aluminum Iodide (AlI) and any combination thereof, is added to the first layer. A second effective amount of at least one substance selected from the group consisting of zinc sulfide (ZnS), barium sulfide (BaS), alkyl sulfonate, and thioester, and any combination thereof, is added to the second layer. A laser beam, such as a beam from at least one of an Nd:Yag laser and a $CO_2$ laser, is directed so that it passes through at least a portion of the first layer and at least a portion of the second layer to form a grayscale image in at least one of the first and second layers. In one embodiment, the laser beam is directed so that it that it passes through at least a portion of the first layer and at least a portion of the second layer such that the first and second layers become affixed to each other.

In at least one embodiment, the invention provides a multilayer identification document, comprising a core layer and a film layer. The film layer overlays at least a portion of the core layer and is affixed to the portion of the core layer. The film layer comprising an additive that comprises an effective amount of at least one of copper potassium iodide ($CuKI_3$), Copper Iodide (CuI),), Potassium Iodide (KI), Sodium Iodide (NaI), Aluminum Iodide (AlI) and any combination thereof, and an effective amount of at least one substance selected from the group consisting of zinc sulfide (ZnS), barium sulfide (BaS), alkyl sulfonate, and thioester, and any combination thereof. In one embodiment, the identification document bears a first indicium thereon, the indicia obtained by exposing the film layer to a laser beam. In one embodiment, the indicia comprises at least one of a gray scale image, photograph, text, tactile text, graphics, information, security pattern, security indicia, and a digital watermark.

In another aspect, the invention provides an identification document having improved laser engraving characteristics. The identification document comprises a TESLIN core coated with a coating containing the laser enhancing additive described above. A grayscale image representing variable data (e.g., personalized data) is laser engraved onto the TESLIN core using an Nd:YAG laser. Optionally, a laminate can be affixed to the TESLIN either before laser engraving or after laser engraving. If the laminate is applied before the TESLIN core is laser engraved, the laminate generally will be transparent to laser radiation.

In one embodiment, the invention provides a composition having laser engraving properties, comprising a host material and a laser enhancing additive. The host material comprises a material, such as a polymer, modified by a first process, whereby the host material as modified by the first process has increased thermal conductivity as compared to the host material before the first process. The laser enhancing additive comprises a first quantity of at least one of copper potassium iodide ($CuKI_3$), Copper Iodide (CuI), potassium iodide (KI), sodium iodide (NaI), and aluminum iodide (AlI), and a second quantity of at least one substance selected from the group consisting of zinc sulfide (ZnS), barium sulfide (BaS), alkyl sulfonate, and thioester.

In another embodiment, the invention provides an article of manufacture, such as an identification document, capable of being laser engraved with a grayscale image, comprising a core layer, a first layer, and a second layer. The core layer has a first surface. The first layer comprises a first host material, the first host material comprising a material modified by a first process, whereby the host material as modified by the first process has increased thermal conductivity as compared to the host material before the first process, the host material further comprising an effective amount of a first laser enhancing additive comprising at least one of one of copper potassium iodide ($CuKI_3$), Copper Iodide (CuI), potassium iodide (KI), sodium iodide (NaI), and aluminum iodide (AI). The second layer comprises a second host material, the second layer being oriented in relation to the first host material such that a single laser beam can penetrate both at least a portion of the first layer and at least a portion of the second layer. The second host material comprises an effective amount of a second laser enhancing additive, the second laser enhancing additive selected from the group consisting of zinc sulfide (ZnS), barium sulfide (BaS), alkyl sulfonate, and thioester. The first and second layers are operably coupled to each other and at least one of the first and second layers is operably coupled to the first surface of the core layer.

In one embodiment, the first process comprises at least one of adding cross linked functionality to the host material, adding a conductive material to the host material, the conductive material being a material that is more thermally conductive than the host material, altering at least a portion of the free volume of the host material, and processing the host material to change at least one of its orientation and density.

In another embodiment, the invention provides a method of engraving a host material by exposing the material to laser radiation. A host material is provided, and a process is performed on the host material such as at least one of adding cross linked functionality to the host material, adding a conductive material to the host material, the conductive material being a material that is more thermally conductive than the host material, altering at least a portion of the free volume of the host material, and processing the host material to change at least one of its orientation and density, to increase the thermal conductivity of the host material. An effective amount of a laser enhancing additive is added to the host material, the laser enhancing additive comprising at least one of copper potassium iodide ($CuKI_3$), Copper Iodide (CuI), potassium iodide (KI), sodium iodide (NaI), and aluminum iodide (AI); and at least one substance selected from the group consisting of zinc sulfide (ZnS), barium sulfide (BaS), alkyl sulfonate, and thioester. The host material is exposed to laser radiation in a manner that causes the material to be engraved by the laser radiation.

Although some companies offer laser engraving document materials, such materials and/or the amount of equipment required to laser engrave such materials (especially for high quality grayscale images on identification documents) can be prohibitively expensive. At least some embodiments of our invention can overcome at least some of these and other limitations of the prior art. At least some embodiments of our invention offer a less expensive option for laser engraving with improved grayscale engraving, and ease of manufacture, without giving up desired security features.

The foregoing and other features and advantages of the present invention will be even more readily apparent from the following Detailed Description, which proceeds with reference to the accompanying drawings.

BRIEF DESCRIPTION OF THE DRAWINGS

The advantages, features, and aspects of embodiments of the invention will be more fully understood in conjunction with the following detailed description and accompanying drawings, wherein.

Figure 1:
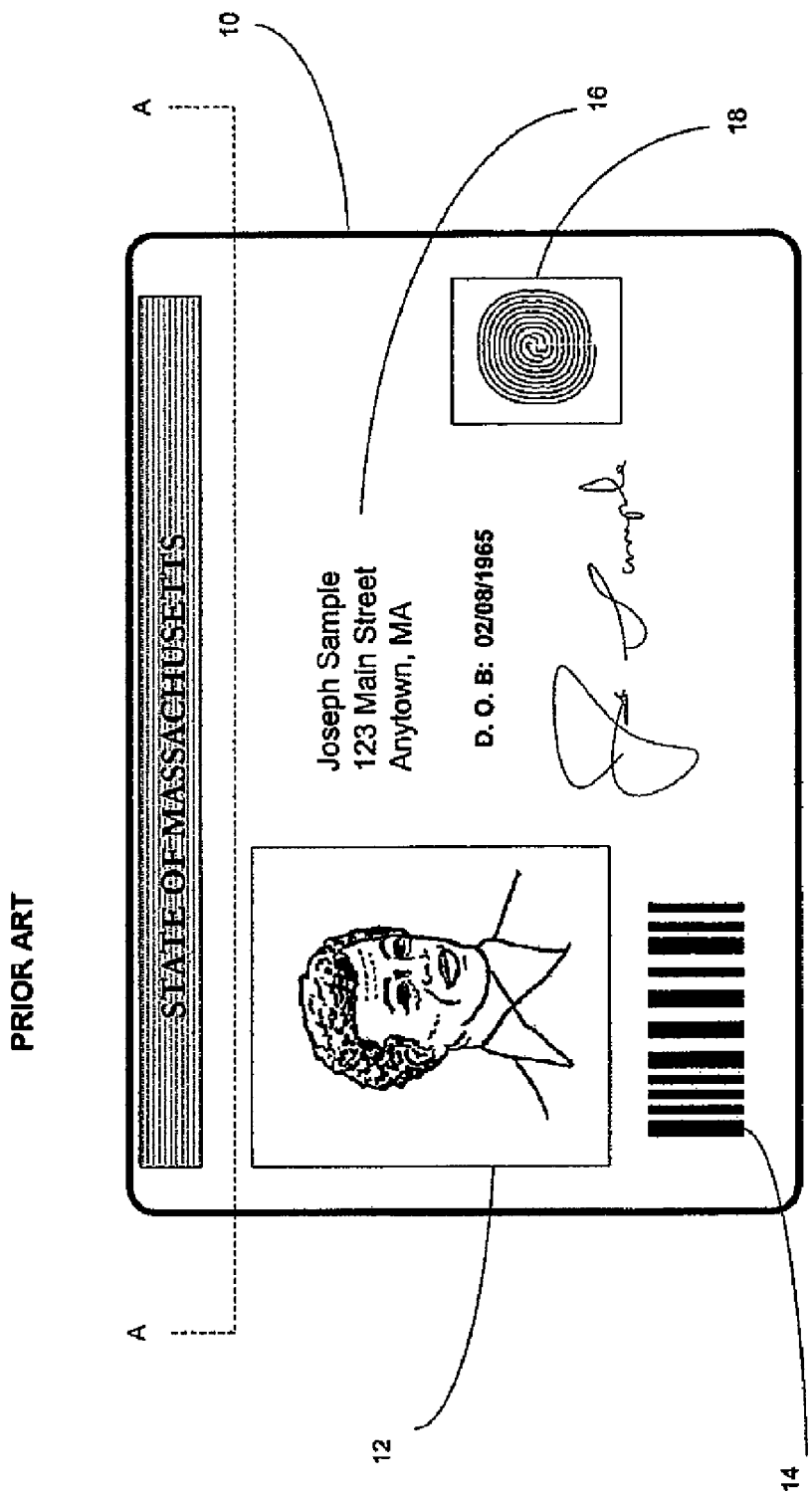
FIG. 1 is an illustrative example of a prior art identification document.

The drawings are not necessarily to scale, emphasis instead generally being placed upon illustrating the principles of the invention. In addition, in the figures, like numbers refer to like elements. Relative dimensions of identification documents, laminate layers, indicia, etc., are provided for illustrative purposes only and are not limiting. Further, throughout this application, laser engraved indicia, information, identification documents, data, etc., may be shown as having a particular cross sectional shape (e.g., rectangular) but that is provided by way of example and illustration only and is not limiting, nor is the shape intended to represent the actual resultant cross sectional shape that occurs during laser engraving or manufacturing of identification documents.

DETAILED DESCRIPTION

A. Introduction and Definitions

In the foregoing discussion, the use of the word "ID document" is broadly defined and intended to include at least all types of ID documents, including (but are not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards and badges, certificates, identification cards or documents, voter registration and/or identification cards, police ID cards, border crossing cards, security clearance badges and cards, gun permits, badges, gift certificates or cards, membership cards or badges, tags, CD's, consumer products, knobs, keyboards, electronic components, etc., or any other suitable items or articles that may record information, images, and/or other data, which may be associated with a function and/or an object or other entity to be identified.

Note that, for the purposes of this disclosure, the terms "document," "card," "badge" and "documentation" are used interchangeably.

In addition, in the foregoing discussion, "identification" includes (but is not limited to) information, decoration, and any other purpose for which an indicia can be placed upon an article in the article's raw, partially prepared, or final state. Also, instead of ID documents, the inventive techniques can be employed with product tags, product packaging, business cards, bags, charts, maps, labels, etc., etc., particularly those items including engraving of an laminate or over-laminate structure. The term ID document thus is broadly defined herein to include these tags, labels, packaging, cards, etc.

"Personalization", "Personalized data" and "variable" data are used interchangeably herein, and refer at least to data, images, and information that are printed at the time of card personalization. Personalized data can, for example, be "personal to" or "specific to" a specific cardholder or group of cardholders. Personalized data can include data that is unique to a specific cardholder (such as biometric information, image information), but is not limited to unique data. Personalized data can include some data, such as birthdate, height, weight, eye color, address, etc., that are personal to a specific cardholder but not necessarily unique to that cardholder (i.e., other cardholders might share the same personal data, such as birthdate). Depending on the application, however, personalized data can also include some types of data that are not different from card to card, but that are still provided at the time of card personalization. For example, a state seal that is laser engraved onto a portion of an overlaminate in an identification document, where the laser engraving occurs during the personalization of the card, could in some instances be considered to be "personalized" information.

The terms "laser engraving" and "laser marking" are used interchangeably herein.

The terms "indicium" and indicia as used herein cover not only markings suitable for human reading, but also markings intended for machine reading. Especially when intended for machine reading, such an indicium need not be visible to the human eye, but may be in the form of a marking visible only under infra-red, ultra-violet or other non-visible radiation. Thus, in at least some embodiments of the invention, an indicium formed on any layer in an identification document (e.g., the core layer) may be partially or wholly in the form of a marking visible only under non-visible radiation. Markings comprising, for example, a visible "dummy" image superposed over a non-visible "real" image intended to be machine read may also be used.

"Laminate" and "overlaminate" include (but are not limited to) film and sheet products. Laminates usable with at least some embodiments of the invention include those which contain substantially transparent polymers and/or substantially transparent adhesives, or which have substantially transparent polymers and/or substantially transparent adhesives as a part of their structure, e.g., as an extruded feature. Examples of usable laminates include at least polyester, polycarbonate, polystyrene, cellulose ester, polyolefin, polysulfone, or polyamide. Laminates can be made using either an amorphous or biaxially oriented polymer as well. The laminate can comprise a plurality of separate laminate layers, for example a boundary layer and/or a film layer.

The degree of transparency of the laminate can, for example, be dictated by the information contained within the identification document, the particular colors and/or security features used, etc. The thickness of the laminate layers is not critical, although in some embodiments it may be preferred that the thickness of a laminate layer be about 1-20 mils. Lamination of any laminate layer(s) to any other layer of material (e.g., a core layer) can be accomplished using any conventional lamination process, and such processes are well-known to those skilled in the production of articles such as identification documents. Of course, the types and structures of the laminates described herein are provided only by way of example, those skilled in the art will appreciated that many different types of laminates are usable in accordance with the invention.

For example, in ID documents, a laminate can provide a protective covering for the printed substrates and provides a level of protection against unauthorized tampering (e.g., a laminate would have to be removed to alter the printed information and then subsequently replaced after the alteration.). Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581. Each of these U.S. patents is herein incorporated by reference.

The material(s) from which a laminate is made may be transparent, but need not be. Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

For purposes of illustration, the following description will proceed with reference to ID document structures (e.g., TESLIN-core, multi-layered ID documents) and fused polycarbonate structures. It should be appreciated, however, that the present invention is not so limited. Indeed, as those skilled in the art will appreciate, the inventive techniques can be applied to many other structures formed in many different ways to improve their laser engraving characteristics. Generally, the invention has applicability for virtually any product which is to be laser engraved, especially products being engraved with grayscale images. For example, in at least some embodiments, the invention is usable with virtually any product which is to be laser engraved or marked, especially articles to which a laminate and/or coating is applied, including articles formed from paper, wood, cardboard, paperboard, glass, metal, plastic, fabric, ceramic, rubber, along with many man-made materials, such as microporous materials, single phase materials, two phase materials, coated paper, synthetic paper (e.g., TYVEC, manufactured by Dupont Corp of Wilmington, Del.), foamed polypropylene film (including calcium carbonate foamed polypropylene film), plastic, polyolefin, polyester, polyethylenetelphthalate (PET), PET-G, PET-F, and polyvinyl chloride (PVC), and combinations thereof.

In addition, at least one embodiment of the invention relates to virtually any article formed from, laminated with, or at least partially covered by a material that not sufficiently responsive to laser radiation to form a desired indicium (e.g., a grayscale image) thereon, but which is rendered more responsive to laser radiation, at least to a sufficient degree to enable its surface to be marked as desired with a laser beam, by adding the inventive laser enhancing additive to the material itself or to another material (e.g., a coating or laminate) that is substantially adjacent to the material.

B. Laser Engraving

It is often desirable to mark a portion of a structure, such as a multi-layered structure (including after lamination), such as an ID document, with text, information, graphics, logos, security indicia, security features, marks, images and/or photographs. It would be advantageous if techniques were available to enable laser engraving to produce some or all of these features, especially gray scale and/or color images and photographs.

In some instances, however, some parts of a multi-layered ID document structure, (for example, a structure that includes polyester or polycarbonate laminate on a core such as TESLIN) can be non-conducive to acceptable engraving of specific types of information. For example, some materials can be laser engraved (using, for example, a $CO_2$ laser) with text information (e.g., dark on light), but cannot be satisfactorily laser engraved with usable grayscale information (e.g., grayscale information conveying up to 256 shades of gray), such as images or photographs, or full color information.

Other materials are difficult to laser engrave even with text information. For example, some materials, such as silica filled polyolefin, TESLIN, polycarbonate and fused polycarbonate, polyethylene, polypropylene (PPRO), polystyrene, polyolefin, and copolymers are not very sensitive to laser radiation and thus are not especially conducive to laser engraving. Attempts to laser engrave structures that include such non-sensitive and non-conducive materials can sometimes result in engraving that appears too faint to be usable to convey information visually (although the engraving might be useful to provide a tactile feel to the structure). Such a multi-layered structure lacks the sensitivity required for favorable laser engraving. The ability to provide gray scale images on an identification document using a laser, in accordance with the invention, can be advantageous because it can provide increased security of the identification document. In addition, it may be possible to use the invention incorporate additional security features (such as digital watermarks) into the laser engraved grayscale image.

As noted previously, three components work together to help determine the speed at which an acceptable laser engraving mark is made with a laser such as a diode pumped YAG laser: materials (card or other substrate), image information, laser conditions. What laser manufacturers have done to aid in this effort (to decrease laser marking time) has been to increase the power of the laser. In so doing, the heat generated per pixel of information is increased, and this heat is dissipated further out. A result of this is an effective decrease in the dots-per-inch (dpi), required of the incoming image data. Reduced dpi can help to decrease marking time. Further improvements, as described herein, have the potential to decrease marking time even further.

In a further aspect of the invention, we have found that, in some instances, certain properties of the material being laser engraved are important factors in the resultant speed of marking of a rastered image. As noted previously, the additives we propose herein can improve the quality of laser engraving, the efficiency of laser engraving, and/or the speed of laser engraving, in a host material to which they are added. We have also discovered various ways that the host material itself (i.e., the material to which the inventive laser enhancing additive is added) can be altered so that the resulting host material plus laser enhancing additive responds to the laser energy in a manner that can help to reduce the marking time. In particular, we have discovered various techniques for designing, processing, and/or selecting the host material to be more heat conductive, which can have an effect of decreasing marking time without requiring increased power from the laser machine.

As noted herein elsewhere herein, we have discovered that an additive system that includes the inventive laser enhancing additive described herein (e.g., an additive that comprises, in one embodiment, (a) an effective amount of least one of copper potassium iodide (CuKI$_3$), Copper Iodide (CuI), potassium iodide (KI), sodium iodide (NaI), and aluminum iodide (AI); and (b) an effective amount of at least one substance selected from the group consisting of zinc sulfide (ZnS), barium sulfide (BaS), alkyl sulfonate, and thioester) can be very sensitive to laser energy. However, even with the use of our inventive laser enhancing additive, there may still be a limitation on dpi of the incoming image to be around 450-600 dpi. This is due at least in part to the thermal properties of amorphous polymers, which can cause amorphous polymers to act as insulators rather than conductors.

In one embodiment of the invention, we have found that increasing the thermal conductivity of the host material (which can, for example be a polymer) and its matrices can help to decrease the marking speed of images. Thermal conductivity relates to the chemical nature of the material and the distance at which heat must travel. Thermal energy generally prefers to travel along covalent bonds and not weak secondary ones. Thus, by performing actions on the host material that help to increase the amount of covalent bonds in the host material, it is possible to further improve the conductivity of the host material (and, of the host material with the inventive laser enhancing additive added to it).

Although we anticipate that nearly any method to increase thermal conductivity in a material can improve laser marking speed of that material, we have determined that for at least some advantageous embodiments of the invention, the material being laser engraved not only has its thermal conductivity has been improved using one or more of the techniques described herein, but also has added to it the inventive laser enhancing additive described herein. Many methods for increasing thermal conductivity in a material should be usable in accordance with the invention, and in certain applications it can be beneficial (or desirable) to increase the thermal conductivity in a manner that permits the host material to remain substantially optically clear to laser radiation.

Accordingly, we have found that any one or more of the following methods can help to improve the thermal conductivity of the host material and/or host material plus inventive laser enhancing additive system while still maintaining an substantially "optically clear to laser energy" polymer:

In one embodiment, we have found that addition of cross linked functionality in the host material, such as by using coupling agents/primers that are reactive and/or form weak secondary bonds between the host material and an additive and/or from additive to additive and/or from host material to additive, can help to improve thermal conductivity in the host material and/or in the host material plus inventive laser enhancing additive. Usable coupling agents include, for example, those that are used in composite systems to aid in mechanical properties. Such a coupling agent can, for example, form a "bridge" between moieties. For example, we have found for this embodiment that a good crosslinking agent that can be added to a host material is gamma-aminopropyltriethoxy silane, which is available from General Electric (GE) Silicones of Wilton, Conn.

We note, however, that virtually any silicon compounds, silicones, silanes, and/or related products are usable as cross linking/coupling agents/primers, as will be understood by those skilled in the art. In other embodiments of the invention, we have found that the technical manual entitled "Silicon Compounds, Register and Review, Silanes and Silicones for Creative Chemists" ($5^{th}$ ed.), published by Hills America of Piscataway, N.J. (later purchased by United Chemical Technologies, inc., whose silicone business was later purchased by Crompton Corporation, whose organosilicone business was later purchased by GE). We also anticipate that many vinyl additives will be usable with at least some embodiments of the invention.

The amount of additional material required to add sufficient cross-linked functionality so as to improve thermal conductivity can be readily determined through experimentation, as those skilled in the art will appreciate. In at least some embodiments of the invention, the additional material can be added in any concentration that does not reduce optical transparency to laser radiation by an unacceptable degree. In at least one embodiment, the concentration of this additional material in the host material by weight is relatively low (e.g., less than 10%). In at least one embodiment, the concentration of this additional material in the host material, by weight, ranges from 0.001% to 75%.

In another embodiment, we have found that the addition to the host material of one or more polymers (or other materials) that are more thermally conductive than the host material and that are substantially optically transparent to laser radiation, can help to improve thermal conductivity in the host material and/or in the host material plus inventive laser enhancing additive. In one embodiment, such polymers can include one or more polymers such as glass beads, glass fibers, glass threads, and cross linked moieties, i.e. CR-39, polyurethane. Those skilled in the art will recognize that many different thermally conductive polymers which also are optically substantially transparent to laser radiation are known and could be usable in accordance with the invention. It also can be possible to use thermally conductive materials that are not necessarily substantially transparent to laser radiation as long as the presence and/or concentrations of the thermally conductive materials does not interfere with the host material's substantial optical transparency to laser radiation in a way that is unacceptable. Companies that can supply many different types of thermally conductive polymers include, for example, Cool Polymers, Inc., of Warwick, R.I., Epoxies, Etc., of Cranston, R.I., can supply.

The concentrations of "more conductive" polymer/material in the host material can be (as with cross linking agents) virtually any concentration that does not negatively impact the host material's optical transparency to laser radiation to an unacceptable degree. In at least one embodiment, the concentration of the "more conductive" polymer/material by weight is relatively low (e.g., less than 10%). In at least one embodiment, the concentration of this additional material in the host material, by weight, ranges from 0.001% to 75%.

In at least some embodiments, selection of a particular thermally conductive polymer will depend at least in part on the particular host material being used. We anticipate that it may be advantageous to select thermally conductive polymers that are readily miscible with the host material. For example, Cool Polymers product number E4503 is a thermally (and electrically) conductive polycarbonate that could be advantageously added to a polycarbonate host material.

In at least one advantageous embodiment, we have found that adding both a cross linking agent (as described above) and a glass product (e.g., beads, threads, and/or fibers, as described above) can provide noticeable improvements in the thermal conductivity of a host material.

We have also found, in accordance with at least some embodiments of the invention, that adding materials or performing processes on the host material to fill up or reduce at least a portion of the free volume in the host material (while still maintaining the optical transparency of the host material to laser radiation at an acceptable level) also can be used to improve the thermal conductivity of the host material. As is understood by those skilled in the art, the free volume of a polymer corresponds to the unoccupied regions of the polymer that are accessible to segmental motions; that is, the excluded volume of a polymer system, i.e. the space not taken up by the polymer atoms. The amount of free volume can be altered by changing the physical state of the polymer. For example, processes such as deformation under compression can reduce free volume. Processes such as adding a volume filling material to the host material also can reduce free volume. Volume filling materials can, for example, include the other techniques and methods described herein that involve adding another material or substance to the host material. We presume that those skilled in the art are aware of processes, materials, and techniques for filling up portions, free volume in material, such as a polymer material.

Another technique that we have found for increasing thermal conductivity of a host material, in accordance with one embodiment of the invention, involves processing the host material to change its orientation and/or density. We have determined that because the thermal conductivity of materials such as polymers can be at least partially dependent on orientation of the polymer, changing properties of the polymer such as orientation may increase thermal conductivity in a manner that can, in accordance with at least one embodiment of the invention, improve the speed and/or efficiency of laser engraving the polymer.

Those skilled in the art will be familiar with the various types of processes and operations that can operate to change orientation and/or density of a host material. For example, in one embodiment of the invention, the host material is processed using a so-called "blowing tunnels" technique. The host material is blown into an elongated tunnel (e.g., a vertical tunnel) and the host material is stretched or oriented in all directions (e.g., cross directions and/or machine directions) to give a strong, substantially stiff material that has a predetermined orientation or high density. Note that oriented polymers can be stiffer along the chain direction, than unoriented polymers, and can be much stiffer than those polymers oriented in a transverse direction. Stretching polymer chains, as by the process known as molecular orientation, can cause the polymer chains to orient preferentially in a particular direction (e.g., monaxial orientation), and this type of orientation can, in at least one embodiment of the invention, increase thermal conductivity of the polymer (or other host material). These methods is not, of course, limiting, and other methods (e.g., spinning, photomanipulation, ribbon extrusion, tubular extrusion, etc.) can, of course, be usable and are intended within the scope of at least some embodiments of the invention. In one embodiment, we anticipate that processing the host material so that it becomes oriented biaxially can be advantageous for increasing the thermal conductivity of the host material to improve laser marking speed.

In at least some embodiments, we have found that selecting host materials having relatively high degrees of crystallinity (e.g., selecting a material such as PET or polyethylene over PC) can help to increase thermal conductivity and speed of laser engraving. Those skilled in the art will appreciate that many other host materials having high degrees of crystallinity (or which have been processed to have high degrees of crystallinity) can be usable as host materials in these embodiments provides such materials do not impact the optical transparency to laser radiation in an unacceptable manner.

C. First Aspect of the Invention

C.1 Features

In a first aspect, one embodiment of the invention involves sensitizing at least one of the layers in a multi-layered structure, such as at least one laminate layer, to help to overcome the problem of the laminate material not being responsive to laser engraving and/or not being responsive enough to be capable of having grayscale images laser engraved thereon. We have found that the quality of laser engraving can be improved, while reducing engraving time, through over-laminate sensitization using one or more of the inventive formulations described herein. In one implementation of this embodiment, a layer of laminate is modified by adding an effective amount of one or more laser sensitive additives to the laminate material. We also have found that the laser sensitive additives described herein can be divided over two or more layers to provide improved laser engraving performance. Moreover (as described later herein in the second and third aspects of the invention), we have found that the laser sensitive additives also will improve laser engraving if they are present in a coating applied to a material to be engraved.

A least one embodiment of the first aspect of the invention is based on the surprising discovery that the process of laser engraving of materials such as laminates is improved and enhanced by adding to the laminate a first effective amount of a first composition, the first composition being at least one of copper potassium iodide ($CuKI_3$), copper iodide (CuI), Potassium Iodide (KI), Sodium Iodide (NaI), and Aluminum Iodide (AlI), and any combination thereof, together with a second effective amount of a second composition, the second composition being at least one of the following: zinc sulfide (ZnS), barium sulfide (BaS), alkyl sulfonate (e.g., $RSO_2Na$ or $R—OSO_2Na$), and Thioester (e.g., substances containing —SH), and any combination thereof. The combination of the first composition and the second composition will hereinafter be referred to as the "inventive laser enhancing additive". The components of the inventive laser enhancing additive, namely the component comprising at least one of copper potassium iodide (CuKI$_3$) copper iodide (CuI), Potassium Iodide (KI), Sodium Iodide (NaI), and Aluminum Iodide (AlI), and the component comprising at least one of zinc sulfide (ZnS), barium sulfide (BaS), alkyl sulfonate (e.g., RSO$_2$Na or R—OSO$_2$Na), and Thioester, will sometimes be referred to as the "inventive laser enhancing additives").

As those skilled in the art will appreciate, the effective amounts of the first and second compositions can vary depending on the material to which the inventive laser enhancing additive is added and on the laser engraving technique being employed. In at least one embodiment, the inventive laser enhancing additive includes equivalent amounts of the first and second compositions. In at least one embodiment, the inventive laser enhancing additive includes more of the second composition than the first composition. In at least one embodiment, the inventive laser enhancing additive includes more of the first composition than the second composition.

We have also found an advantageous embodiment of the invention wherein the laser enhancing additive comprises copper iodide (CuI), Potassium Iodide (KI), Sodium Iodide (NaI), Aluminum Iodide (AlI), together with Zinc Sulfide (ZnS).

In addition, we also have found advantageous embodiment of the invention wherein a first part of the inventive laser enhancing additive has been chemically analyzed to have the composition shown in Table 1, below, and a second part of the inventive laser enhancing additive has been chemically analyzed to have the composition shown in Table 2, below.

TABLE 1

Breakdown of one embodiment of first part of the additive

| Element | % by Weight | % by Volume |
| --- | --- | --- |
| Sodium (Na) | 3-7% | 9-20% |
| Aluminum (Al) | 0-5% | 0-12% |
| Chlorine (Cl) | 0-2% | 0-4% |
| Potassium (K) | 10-20% | 24-38% |
| Copper (Cu) | 0.5-5% | 0.5-6% |
| Iodine (I) | 70-80% | 40-50% |

TABLE 2

Breakdown of one embodiment of second part of the additive

| Element | % by Weight | % by Volume |
| --- | --- | --- |
| Zinc (Zn) | 60-70% | 40-50% |
| Sulfur (S) | 30-40% | 48-58% |

Note that although the above tables show relative concentrations of particular constituents that make up the additive, these tables do not necessarily represent their respective concentrations when the inventive laser enhancing additive is added to the host material. For example (as discussed further herein), referring to Table 3 in a given embodiment the respective concentrations of materials in the additive itself may be as follows:

TABLE 3

Breakdown of one embodiment of the additive

| Element | % by Weight | % by Volume |
| --- | --- | --- |
| Sodium (Na) | 5% | 25% |
| Aluminum (Al) | 3% | 5% |

TABLE 3-continued

Breakdown of one embodiment of the additive

| Element | % by Weight | % by Volume |
| --- | --- | --- |
| Chlorine (Cl) | 0% | 0% |
| Potassium (K) | 17% | 32% |
| Copper (Cu) | 4% | 4% |
| Iodine (I) | 75% | 45% |
| Zinc (Zn) | 65% | 47% |
| Sulfur (S) | 35% | 54% |

However, the overall percentage of the additive in the host material (e.g., a laminate) in this illustrative embodiment is 0.06%. The respective breakdown of the percentages of constituent material in the laminate would thus have to be multiplied by 0.06%, as shown in Table 4 below:

TABLE 4

Example of concentrations of constituents in host material containing inventive laser enhancing additive of one embodiment of the additive

| Element | % by Weight in host material |
| --- | --- |
| Sodium (Na) | 0.5 |
| Aluminum (Al) | 0.18 |
| Chlorine (Cl) | 0.00 |
| Potassium (K) | 1.02 |
| Copper (Cu) | 0.24 |
| Iodine (I) | 4.50 |
| Zinc (Zn) | 3.9 |
| Sulfur (S) | 2.16 |

FIGS. 9-13 show the results of a chemical analysis that we ran on an embodiment of a laser enhancing additive that was eventually added to various coatings and laminates. Tables 1 and 2 summarize the results of the analysis in FIGS. 9-13. We have found that additives in accordance with FIGS. 9-13 and Tables 1-3 have worked well for improving the responsiveness to laser radiation of the material to which they are added when added to laminates and/or coatings in the concentrations that are discussed further below. Further details about this improvement and the concentrations are described herein.

The exact nature of the mechanism by which our various embodiments of the inventive laser enhancing additives work is not yet established. It is possible that the inventive laser enhancing additive increases the molecular activity within the laminate when the heat from the laser is applied, enabling the laminate to respond faster and/or more intensely to the laser energy. It also is possible that the additive increases the opacity of the laminate, enabling it to better respond to laser energy. It also is possible that the components of the inventive laser enhancing additive react with each other and/or with the host material to form black species within the host material.

Using the inventive laser enhancing additive, high quality images and other engravings can be formed on articles such as multi-layered ID documents at acceptable throughput rates by modifying the materials being engraved by adding the inventive laser enhancing additives to the material (or by coating the material with a coating containing the inventive laser enhancing additive, as discussed further in the second aspect of the invention). The inventive laser enhancing additive can not only make a material that is non-sensitive to laser radiation more sensitive to laser radiation, but also can reduce the laser engraving time as well. In addition, because the inventive laser enhancing additive can improve the responsiveness of the material being laser engraved to laser energy, high definition images, such as gray scale images (which can be used on identification documents), can be created with the laser engraving process. We have also found that in situations where a first material containing the laser enhancing additive is able to co-mingle or otherwise mix with a second material during processing (e.g., during application of heat and/or pressure), the responsiveness to laser energy of the second material is improved.

In at least one embodiment, use of any of the above laser enhancement formulations improves the quality of the laser engraving by increasing the contrast, (including at least dark colors on light backgrounds) that can occur when using a laser having a given power level. In at least some embodiments, the increased contrast resulting from use of one of the above-described laser enhancing additives may enable the laser engraving to be accomplished using a lower-power laser than would need to be used without user of the laser enhancing additive. It at least some embodiments, the increased sensitivity resulting from use of one of the above-described laser enhancing additives may reduce the time necessary to accomplish the laser engraving.

In accordance with at least some embodiments of the first aspect of the invention, any of the above-described inventive laser enhancing additives can be added to virtually any material (including all known thermoplastics and thermosets) to enhance the process of laser marking and/or laser engraving of either the material to which the inventive laser enhancing additive is added or any material disposed substantially adjacent thereto. Advantageously, the addition of the inventive laser enhancing additive enables whatever material(s) it has been added to be laser engraved with a grayscale image.

In accordance with another embodiment of the first aspect of the invention, a first part of the inventive laser enhancing additive (i.e., a part that contains an effective amount of at least one of CuI, KI, NaI, an AlI and all combinations thereof) can be added to a first layer of laminate and a second part of the inventive laser enhancing additive (i.e., a second part that contains an effective amount at least one of ZnS, BaS, alkyl sulfonate, and thioester and all combinations thereof) can be added to a second layer of laminate, wherein a single laser beam passes through both layers and enables the laser engraving of either or both layers. In accordance with still another embodiment of the first aspect invention, the inventive laser enhancing additive can be added to a core material that is laminated with a material that is transparent to laser radiation, wherein the core material also can be laser engraved.

In at least one advantageous embodiment, the inventive laser enhancing additive is added to core, laminate and/or over laminate materials used in the manufacture of identification documents, to improve the process of laser engraving or marking of the identification documents and to enable laser engraving of a grayscale image on the identification documents.

In another advantageous embodiment, the inventive laser enhancing additive is added to an image receptive layer (such as the image receiving layer described in U.S. Pat. No. 6,066,594), to make the image receptive layer a layer that can be imaged both with laser energy and with another printing method (e.g., D2T2 printing).

Note that the laser enhancing additives in accordance with the invention are usable for both materials that usually are not sensitive to laser radiation as well as materials that are already sensitive to laser radiation. The inventive laser enhancing additive can be present in a material, such as a laminate, at the same time that other compositions (e.g., other laser enhancing or absorbing additives, reinforcing fillers, antioxidants, flame retardants, stabilizers, plasticizers, lubricants, dispersants, and the like) are present in the same material and/or a separate layer of material. We also note that the presence of other materials (e.g., contaminants) within the additive, in small amounts, does not appear to negatively impact the laser enhancing function of the inventive laser enhancing additive. For example, in one embodiment, chemical analysis (see FIGS. 9-13) showed the presence of additional constituents in the additive, such as Carbon (C), Oxygen (O), Chlorine (Cl). We further note that it is possible that any or all of these additional constituents may, in face, contribute to the laser enhancing properties of this embodiment of the inventive laser enhancing additive.

Illustrative examples of laminate materials to which the inventive laser enhancing additive may be added include (but are not limited to) polyester, polycarbonate (PC), fused polycarbonate, polyvinyl chloride (PVC), polyethylene, thermosets, thermoplastic and thermoplastic resins (including those that foam when heated), engineering thermoplastics (ETP), polyurethane, polyamides, expanded polypropylene (EPP), polypropylene, acrylonitrile butadiene styrene (ABS), ABS/PC and ABS/PC products, high impact polystyrene (HIPS), polyethylene terephthalate (PET), PET-G, PET-F, polybutylene terephthalate (PBS), acetal copolymer (POM), and polyetherimide (PEI), polymer, copolymer, polyester, amorphous polyester, polyolefin, silicon-filled polyolefin, TESLIN, foamed polypropylene film, polystyrene, polyacrylate, poly(4-vinylpyridine, poly(vinyl acetate), polyacrylonitrile, polymeric liquid crystal resin, polysulfone, polyether nitride, and polycaprolactone, as well as virtually any known plastic or polymer. Of course, it will be appreciated that embodiments of the invention have applicability for the laser engraving and/or marking of plastic materials used to make many different articles formed by virtually any known method, including molding and extruding.

In at least some embodiments, the resultant concentration of the inventive laser enhancing additive in the laminate, by weight, ranges from 0.001% to 0.1% by weight. Note that in at least some embodiments, the inventive laser enhancing additive is added at larger concentrations (e.g., from 0.1% to 100%). At concentrations larger than 0.1%, the inventive laser enhancing additive can still be used to enhance laser marking or engraving, but at possible sacrifice of some of the transparency of the laminating material (if, in fact, the laminating material is substantially transparent or translucent to begin with).

Advantageously, in at least one embodiment, the laser enhancing additive is about 0.06% by weight in the laminate. In another advantageous embodiment, the 0.06% by weight includes 0.03% by weight of at least one of CuI, $CuKI_3$, KI, NaI, and AlI (and any combinations thereof), and 0.03% by weight of at least one of ZnS, BaS, alkyl sulfonate, and thioester (and any combinations thereof). Of course, those skilled in the art will appreciate that other concentration ranges for the laser enhancing formulations may be usable, especially when using opaque materials and colored materials. In addition, it will be appreciated that the proportions of the at least one of CuI, KI, NaI, AlI, and $CuKI_3$ (and any combinations thereof) and of the at least one of ZnS, BaS, alkyl sulfonate, and thioester (and any combinations thereof) also can vary.

The concentration of the inventive laser enhancing additive that is usable with a given laminate is at least in part dependent on the properties of the laminate and the ultimate use, durability, environmental conditions, etc., to which the laminate is subject. It is possible that higher concentrations of the laser enhancing formulations in the laminate may affect one or more properties of the laminate, such as transparency, durability, malleability, opacity, rigidity, etc. Of course, appropriate quantities of the additives can be determined for a particular over-laminate application without undue experimentation. Additional factors may include engraving time and process, base over-laminate material or composition, and desired engraving quality.

It is contemplated that the inventive laser enhancing additive can be added to a laminate that is affixed (e.g., by adhesive, lamination, chemical reaction, etc.) to virtually any product, to enable the laminate to be laser engraved, especially with a grayscale image, thereby producing (especially if the laminate is substantially transparent or translucent) a laser engraving or marking on the laminate affixed to the article. Accordingly, we believe that the inventive laser enhancing laminate has applicability to the manufacture many different articles that can be laminated, including but not limited to identification documents, identification cards, credit cards, prepaid cards, phone cards, smart cards, contact cards, contactless cards, combination contact-contactless cards, proximity cards (e.g., radio frequency (RFID) cards), electronic components, tags, packaging, containers, building materials, construction materials, plumbing materials, automotive, aerospace, and military products, computers, recording media, labels, tools and tooling, medical devices, consumer products, and toys. Further, we contemplate that entire articles of manufacture could be formed wholly or partially using a material that contains the inventive laser enhancing additive and then laser engraved or marked.

C.2 Preparation/Manufacture

The inventive laser enhancing additive can be added to the laminate in many different ways. The following technique describes the preparation and addition of the inventive laser enhancing additive to the laminate in accordance with one embodiment of the first aspect of the invention. By way of example only, the technique will be described in connection with an illustrative embodiment wherein the laminate comprises polycarbonate and the inventive laser enhancing additive comprises CuI, KI, NaI, and AlI and ZnS, but illustration of this particular formulation should not be viewed as limiting.

In this example, preparation of the inventive laser enhancing additive can be accomplished by using a twin screw extruder to create a highly concentrated polymer blend (so-called "masterbatch") of the inventive laser enhancing additive. The masterbatch is created by combining the desired host material (e.g., polycarbonate) with the inventive laser enhancing additive, (e.g., ZnS and CuI, KI, NaI, and AlI). The host material and the inventive laser enhancing additive are dried prior to blending to minimize any degradation of each of the components. The following are illustrative examples of inventive laser enhancing additive preparations that can be utilized in at least some embodiments of the invention:

Masterbatching the inventive laser enhancing additive together in the same material (e.g., polycarbonate) as the final film material (e.g., polycarbonate) of the laminate.
Masterbatching the inventive laser enhancing additive together in a different material (e.g., polystryene) than the final film material (e.g., polycarbonate) of the laminate.
Masterbatching the inventive laser enhancing additive separately in the same material (e.g., polycarbonate) as the final film material (e.g., polycarbonate) of the laminate
Masterbatching the inventive laser enhancing additive separately in a different material (e.g., polystyrene) than the final film material (e.g., polycarbonate) of the laminate.

The above masterbatch formulations are taken and drawn down to the desired concentration using a single screw extruder to form a monolayer film. To reduce costs, a colayer can be made whereby sensitized material (i.e., material to which the inventive laser enhancing additive is added) is extruded against nonsensitive material. In one embodiment, the optimum concentration for marking of polycarbonate and maximizing optical properties is 0.06% by weight. Concentrations can be used up to 0.1% by weight; concentrations higher than 0.1% may cause visible reductions of the transparency of transparent materials. In one embodiment, more than one of the previously described inventive laser-enhancing additives can be used as an additive (e.g., ZnS and CuI, KI, NaI, and AlI, along with $CuKI_3$ along with BaS and CuI), and other known laser-enhancing additives can also be combined with one or more of the previously described inventive laser-enhancing additives in the above techniques.

Of course, those skilled in the art will appreciate that the above examples of masterbatch formulations and materials are provided by way of example and are not limiting. For example, those skilled in the art will readily understand how the inventive laser enhancing additive can be adapted to work with acrylics, acetates, polystyrenes, urethanes, polyesters (aromatic and aliphatic), polyether nitrides, ABS and polyvinyl chloride, as well as the other laminate materials previously described.

C.3 Illustrative Examples

After the film for the laminate is made, various known processes can be used to adapt it for use with the article being laser engraved or marked. In the example of an ID document to be laser engraved or marked, the following are illustrative exemplary embodiments for constructing an ID document using a film and/or laminate containing the inventive laser enhancing additive.

Figure 3:
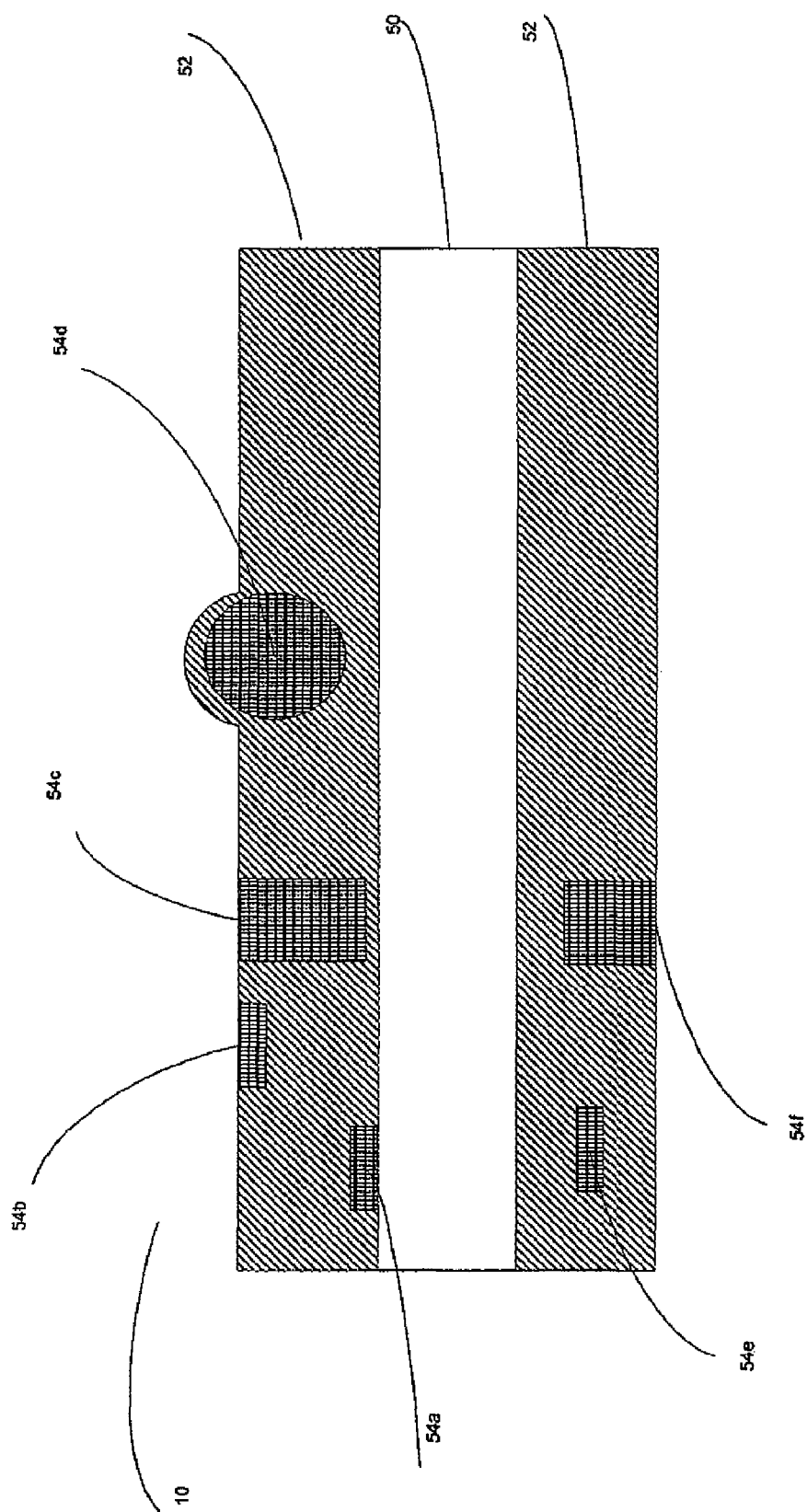
FIG. 3 is an illustrative cross-sectional view of an identification document in accordance with a first embodiment of a first aspect of the invention.

FIG. 3 is an illustrative cross-sectional view of an ID document 10 in accordance with a first embodiment of the first aspect of the invention. In this first embodiment, an inventive ID document 10 preferably includes a multi-layered structure, as shown in FIG. 3. For purposes of illustration, however, the ID document 10 may have a front outward appearance generally similar to the identification document 10 of FIG. 1, although the construction and components of the cross-section shown in FIG. 3 differs from the prior art. The identification document 10 comprises a layer of core material 50 and at least one layer of a first laminate 52 to which the inventive laser enhancing additive has been added (a laminate to which the inventive laser enhancing additive is added will also be referred to herein as the "inventive laminate"). A laminate layer is preferably added to the front and back surface of the core to form the multi-layer structure.

In this example, the core material 50 is 10 mils of a substantially opaque white laminate core, such as a TESLIN-based core. Prior to lamination, the core material 50 can be pre-printed to include an indicium 54A such as fixed or variable information or data. The pre-printing can include screen-printing, offset printing, laser or ink-jet printing, flexography printing, or the like. "Fixed" information may include non-individual dependent information, such as department or company information, state information, etc., etc. Variable information, or information that is unique to the ID document holder, can be printed, for example, via a color laser XEROGRAPHY process.

The fixed and/or variable information can also include one or more built in security features, as well, to help reduce identity fraud. For example, in one embodiment of the invention, portions of the ID document 10, including either or both of the core material 50 and/or the laminate 52, can include a security feature such as a security indicia or security pattern. The security pattern can be applied in an ordered arrangement having a tightly-printed pattern, i.e., having a plurality of finely-divided printed and unprinted areas in close proximity to one another. A tightly-printed pattern may, for example, appear as an often-repeated logo or design or a fine-line printed security pattern such is used in the printing of banknote paper, stock certificates and like and may take the form of filigree, guilloche or other fine-line printing. U.S. Pat. No. 4,653,775 provides an example of such security printing and is hereby incorporated by reference. Note that the laser engraving facilitated by the invention can be used to print a security indicia or security pattern.

In addition, the laser engraving facilitated by the invention can be used to add a digital watermark to any indicia printed (whether conventionally or by laser engraving) on any layer of the ID document 10. Digital watermarking is a process for modifying physical or electronic media to embed a machine-readable code therein. The media may be modified such that the embedded code is imperceptible or nearly imperceptible to the user, yet may be detected through an automated detection process. The code may be embedded, e.g., in a photograph, text, graphic, image, substrate or laminate texture, and/or a background pattern or tint of the photo-identification document. The code can even be conveyed through ultraviolet or infrared inks and dyes.

Digital watermarking systems typically have two primary components: an encoder that embeds the digital watermark in a host media signal, and a decoder that detects and reads the embedded digital watermark from a signal suspected of containing a digital watermark. The encoder embeds a digital watermark by altering a host media signal. To illustrate, if the host media signal includes a photograph, the digital watermark can be embedded in the photograph, and the embedded photograph can be printed on a photo-identification document. The decoding component analyzes a suspect signal to detect whether a digital watermark is present. In applications where the digital watermark encodes information (e.g., a unique identifier), the decoding component extracts this information from the detected digital watermark.

Several particular digital watermarking techniques have been developed. The reader is presumed to be familiar with the literature in this field. Particular techniques for embedding and detecting imperceptible watermarks in media are detailed, e.g., in Digimarc's U.S. patent application Ser. No. 09/503,881 and U.S. Pat. No. 6,122,403. Techniques for embedding digital watermarks in identification documents are even further detailed, e.g., in Digimarc's U.S. patent application Ser. Nos. 10/094,593, filed Mar. 6, 2002, and 10/170,223, filed Jun. 10, 2002, U.S. Provisional Patent Application No. 60/358,321, filed Feb. 19, 2002, and U.S. Pat. No. 5,841,886. Each of the above-mentioned U.S. Patent documents is herein incorporated by reference. Additionally, it is noted that the invention encompasses ID documents including more or less features than the illustrated ID document 10.

Referring again to FIG. 3, after printing, the core material 50 is laminated on both sides with 10 mils of the first laminate 52 that has been sensitized to laser energy by the addition of the inventive laser enhancing additive. In this example, the first laminate 52 contains ZnS and at least one of CuI, KI, NaI, and AlI additives in a base laminate material such as polyester or polycarbonate. In one implementation of this embodiment, the front and back first laminates 52 can be laminated using an adhesive (not visible in FIG. 3) such as co-polyester or olefin containing adhesive. Other adhesives usable in accordance with this embodiment of the invention include polyester, polyester urethane, polyether urethane or polyolefin hot melt or ultraviolet or thermally cured adhesive. The multi-layered structure is formed during a lamination process, in which adjustments to the processing time, temperature and pressure can be varied to optimize laminations.

In at least some embodiments of the first aspect of the invention, usable laminates usable include those which contain substantially transparent polymers and/or substantially transparent adhesives, or which have substantially transparent polymers and/or substantially transparent adhesives as a part of their structure, e.g., as an extruded feature. The first laminate 52 can comprise a plurality of separate laminate layers, for example a boundary layer and/or a film layer. The first laminate 52 can comprise an optically clear durable plastic film, such as amorphous or biaxially oriented polyester. In at least some embodiments, the laminate need not be substantially transparent, but can be colored or opaque, so long as a grayscale image can be laser engraved onto it. Of course, the types and structures of the laminates described herein are provided only by way of example, those skilled in the art will appreciated that many different types of laminates are usable in accordance with the invention.

In at least some embodiments, the first laminate layers 52 can provide additional security features for the identification document 10. For example, the first laminate 52 may include a low cohesivity polymeric layer, an optically variable ink, an image printed in an ink which is readable in the infra-red or ultraviolet but is invisible in normal white light, an image printed in a fluorescent or phosphorescent ink, or any other available security feature which protects the document against tampering or counterfeiting, and which does not compromise the ability of the first laminate 52 to be laser engraved.

In at least one embodiment (not shown), the first laminate is formed into a pouch into which the core material 50 slips. With a pouch, methods such as heat, pressure, adhesives, and the like, are usable to bond the core material 50 to the first laminate 52 formed into a pouch. Those skilled in the art will appreciate that many known structures and configurations for laminating are usable with the invention.

Referring again to FIG. 3, adhesive can be applied to the first laminate 52 via methods such as solvent coating, casting, or hot melt extrusion. The adhesive may also be coated, cast or extruded onto a surface of the core material 50. The first laminate 52 can then be heat laminated to the core material 50 to form a secure bond. Additional processes that can be used to form the first laminate 52 onto the core material include injection molding or extrusion of a hot melt onto the core material 50. Those skilled in the art will appreciate that virtually any known method can be used to couple the first laminate 52 to the core material 50. For example, techniques such as standard heat and pressure, pressure only, chemical fusion via solvent blending, ultraviolet (UV) methodologies, and/or electron beam (EB) methodologies can be used to laminate the first laminate 52 to the core material 50.

When first laminate 52 is appropriately coupled to the core material 50, the ID document 10 is ready for laser engraving. In at least one embodiment, the laser engraving is used to personalize the ID document. In at least one embodiment, a usable laser for engraving is a neodymium:yttrium aluminum garnet (Nd:YAG) laser using both 3 Watt (W) (103 D) and 10 W (Powerline E) power outputs (a laser that is usable with at least one embodiment of the invention can be purchased from Rofin Baasel Lasertech of Boxborough, Mass.). The 10 W laser of this device uses a true grey scale marking software compared to the 3 W which does not. In at least one embodiment, the Nd:YAG laser emits light at a wavelength of about 1064 nanometers (nm).

Because the inventive laser enhancing additive improves the responsiveness of the first laminate 52 to the laser, the time to laser engrave a given area can be decreased as compare to the time to mark a given area in a laminate that does not have the inventive laser enhancing additive, when using the same laser". In addition, the improvement in responsiveness can enable grayscale images, such as images with up to 256 different shades of gray, to be laser engraved into the laminate 52, especially when an Nd:Yag laser (including lamp pumped YAG lasers, diode pumped Nd:Yag lasers, and light pumped Nd:Yag lasers) is used. Those skilled in the art will appreciate that the effective amount of the inventive laser enhancing additive used and the material in which it is used can be adapted to achieve similar improvements in laser engraving when using other types of lasers, such as, excimer lasers and $CO_2$ lasers.

In addition, use of the inventive laser enhancing additive can improve the laser engraving of so-called "vector information" of an identification document. Vector information is non-captured information (such as logos) in an identification document and generally does not include so-called "pixel" information, which is information that is captured, such as signature images and/or photographic images. When the inventive laser enhancing additive is added to a material being laser engraved with vector information, it is possible to sufficiently sensitize the material such that the vector information can be engraved to achieve the "tactile feel" known in the art of laser engraving.

Referring again to FIG. 3, one or more indicia 54B-54F, such as variable information (e.g., birth date, address, biometric information, etc.) is engraved into the over laminate layer 52 through a focused laser beam. In one embodiment, the laser used is an Nd:YAG laser; other suitable lasers (e.g., $CO_2$) can, of course, be similarly employed. As described previously, the area irradiated by the laser absorbs the laser energy and produces heat which causes a visible discoloration in the first laminate 52. The visible discoloration serves as a "mark" or indicator. With some laminates and lasers, the heat from the laser beam causes a foaming as shown in indicia 54D; the foaming can create a raised area in the first laminate 52 that provides a tactile feel when touched. The indicia 54B-F can comprise virtually any type of information, including photographs, data, images, fingerprints, and text. Although not apparent in the cross sectional view of FIG. 3, our testing has shown that the indicia 54B-F can comprise a usable grayscale image (by usable, it is at least meant that image can be used for security purposes, such as identification or authentication). In experiments, the inventor was able to engrave an acceptable gray scale photograph, non-tactile text and tactile text into the laminate layer 52. We further note that the technology described in a commonly assigned patent application entitled "Enhanced Shadow Reduction System and Related Technologies for Digital Image Capture" (Application No. not yet assigned, Attorney Docket No. P0883D, filed Sep. 15, 2003—Inventors Scott D. Haigh, Tuan A. Hoang, Charles R. Duggan, David Bohaker, and Leo M. Kenen), and its predecessor provisional patent applications, can be used to further improve images printed with a laser in accordance with one embodiment of the invention (by reducing shadows and improving image quality). As an example, we compared laminate to which the inventive laser enhancing additive was added (in this test, we used formulations of an additive based on those shown in FIGS. 9-13), the additive comprising ZnS and CI plus KI plus NaI plus AlI) against a commercially available polycarbonate laminate, manufactured by the Bayer Polymer Division. We engraved a 0.75-inch by 1.0-inch photograph at 750 dpi in each of the Bayer material and our inventive over-laminate containing the inventive laser enhancing additive. Using the same laser at the same power for each (a 3 W 103 D laser, as described above), we found that the Bayer material required approximately 40 seconds to engrave an acceptable gray scale photograph. In comparison, the laminate to which the inventive laser enhancing additive was added needed only approximately 20 seconds to engrave an acceptable gray scale photograph by adjusting the frequency of the laser.

Although the embodiment of FIG. 3 illustrates that the first laminate 52 that contains the inventive laser enhancing additive overlays substantially all of the core material 50, in at least some embodiments of the invention, the inventive laser enhancing additive can be added to a laminate that forms merely a portion of the laminate covering a core material 50.

Figure 4:
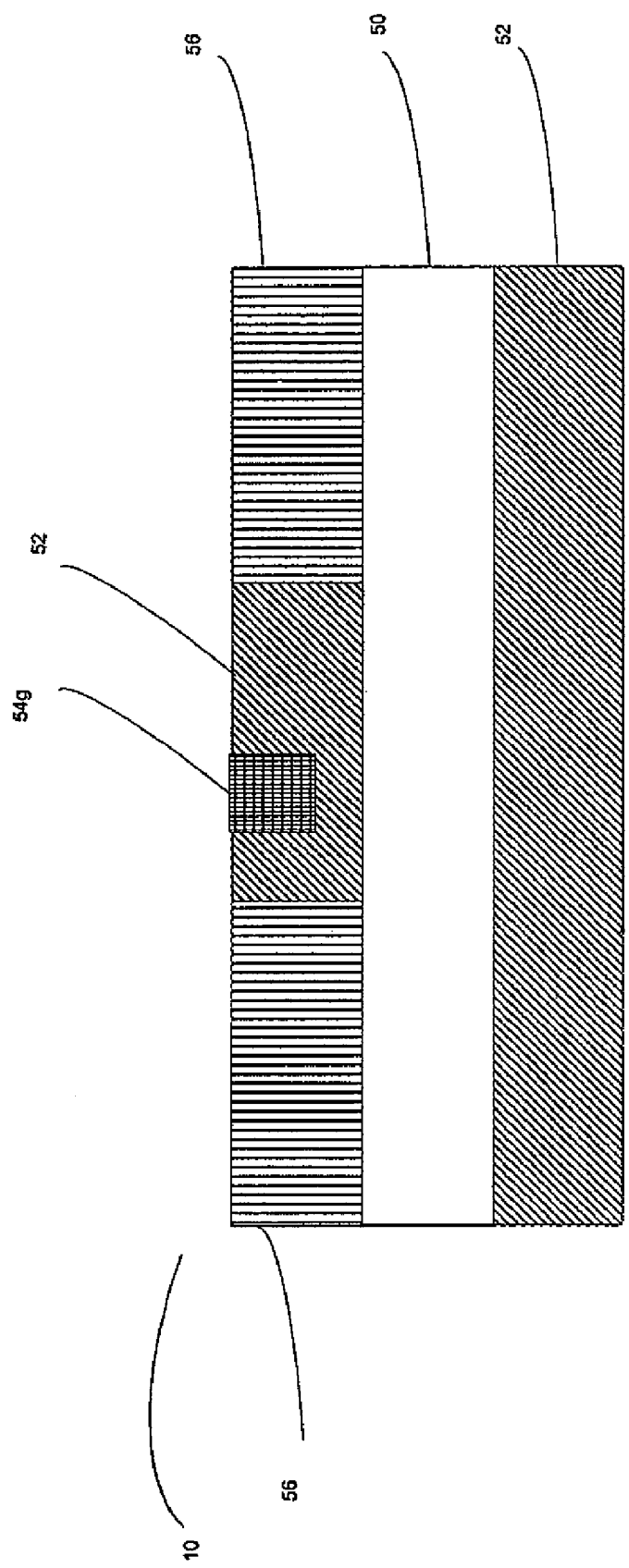
FIG. 4 is an illustrative cross sectional view of an identification document in accordance with a second embodiment of the first aspect of the invention.

For example, FIG. 4 is an illustrative cross sectional view of an identification document in accordance with a second embodiment of the first aspect of the invention. In the embodiment of FIG. 4, the ID document 10 preferably includes a multi-layered structure. For purposes of illustration, however, the ID document 10 may have a front outward appearance generally similar to the identification document 10 of FIG. 1, although the construction and components of the cross-section shown in FIG. 4 differs from the prior art. In the embodiment of FIG. 4, the portion of first laminate 52 containing the inventive laser enhancing additive is disposed at least partially within a layer of another material, such as so-called "plain" laminate 56 (i.e., laminate that does not contain the inventive laser enhancing additive). When a laser beam is applied to the first laminate 52, a third indicium 54G is formed. The plain laminate 56 may comprise a material that is inherently sensitive to laser radiation or can be a material that is insensitive to laser radiation. Note also that the layer of other material in which the first laminate 52 containing the inventive laser enhancing additive is disposed need not even be a laminate at all. Thus, in some articles, the surface of the article can include a portion or "window" of first laminate 52 containing the inventive laser enhancing additive, whereas the rest of the surface is some other material (e.g., ceramic). This configuration may be applicable, for example, in the marking of electronic components and/or devices.

Figure 5:
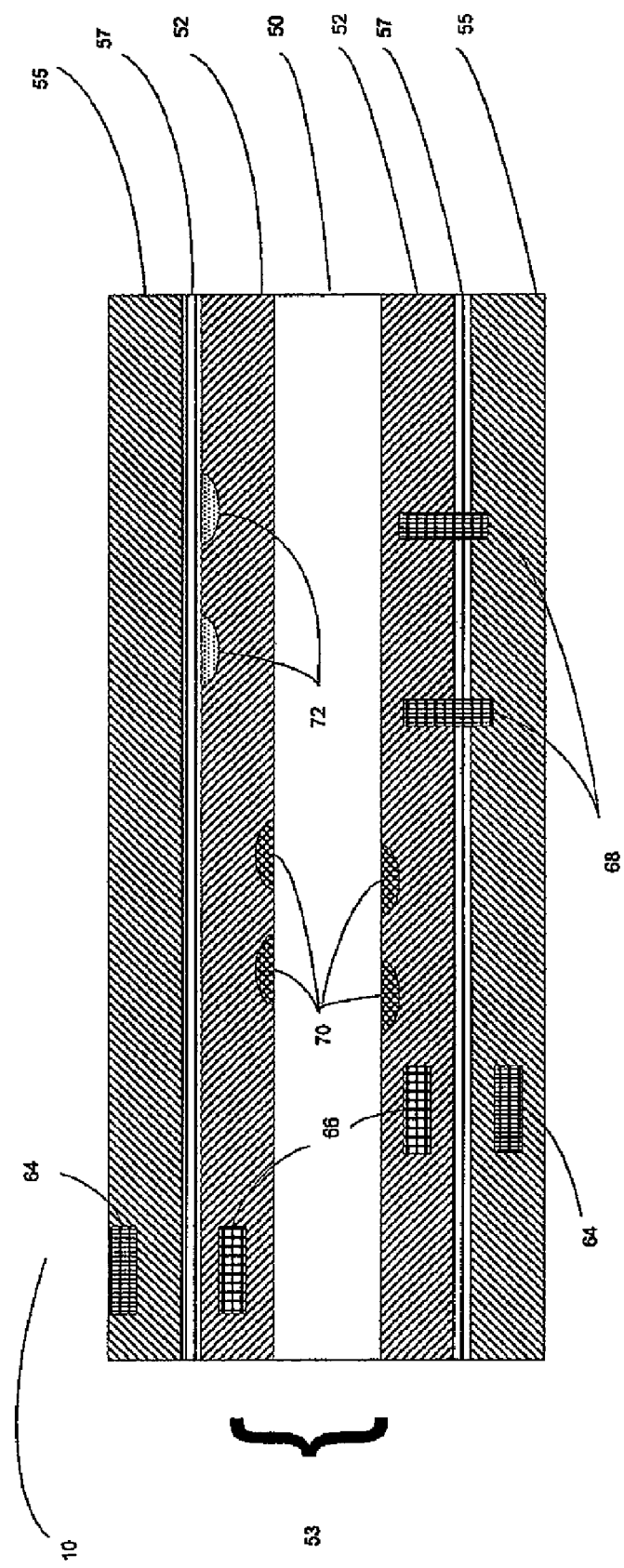
FIG. 5 is an illustrative cross sectional view of an identification document in accordance with a third embodiment of the first aspect of the invention.

FIG. 5 is an illustrative cross sectional view of an identification document 10 in accordance with a third embodiment of the first aspect invention. In the embodiment of FIG. 5, the ID document 10 preferably includes a multi-layered structure. For purposes of illustration, however, the ID document 10 may have a front outward appearance generally similar to the identification document 10 of FIG. 1, although the construction and components of the cross-section shown in FIG. 5 differs from the prior art. In the embodiment of FIG. 5, a first portion of the inventive laser enhancing additive is disposed in a first laminate layer 52 and a second portion of the inventive laser enhancing additive is disposed in a second laminate layer 55. Specifically, in this embodiment, the first laminate layer 52 contains an effective amount of at least one of copper potassium iodide ($CuKI_3$), copper iodide (CuI), Potassium Iodide (KI), Sodium Iodide (NaI), and Aluminum Iodide (AlI) and the second laminate layer 55 contains an effective amount of at least one of the following: zinc sulfide (ZnS), barium sulfide (BaS), alkyl sulfonate and thioester. The first laminate layer 52 and second laminate layer 55 are constructed and arranged so that a laser beam can pass through both the first laminate layer 52 and the second laminate layer 55, to form indicia 66, 64 in one or both of the first and second laminate layers 52, 55, respectively. As those skilled in the art will appreciate, whether an indicia is formed in a given laminate layer depends on the particular type of laser used the manner in which the laser is used (e.g., pumped), and the duration of the application of laser energy.

It should be understood that although the example of FIG. 5 shows that the first laminate layer 52 contains the effective amount of at least one of copper potassium iodide ($CuKI_3$), copper iodide (CuI),), Potassium Iodide (KI), Sodium Iodide (NaI), and Aluminum Iodide (AlI) and the second laminate layer 55 contains the effective amount of at least one of zinc sulfide (ZnS), barium sulfide (BaS), alkyl sulfonate and thioester, the positions of the two compounds in the respective first and second layers could be reversed. That is, the first laminate layer 52 could contain the effective amount of at least one of zinc sulfide (ZnS), barium sulfide (BaS), alkyl sulfonate and thioester, and the second laminate layer 55 could contain the effective amount of copper potassium iodide ($CuKI_3$), copper iodide (CuI),), Potassium Iodide (KI), Sodium Iodide (NaI), and Aluminum Iodide (AlI).

Referring again to FIG. 5, the ID document 10 further comprises a layer of core material 50 (in this example, the layer of core material is 10-20 mils thick) to which the first laminate 52 is laminated on either side. The core material 50 is printed with pre-printing 70 on its outer surface. In one embodiment, the pre-printing 70 is nonvariable information, such as organization name, logo, and the like. The first laminate layer 52 can also be printed with printed information 72 using a technique such as dye diffusion thermal transfer. Also, in FIG. 5, a third layer 57 is disposed between the first laminate layer 52 and the second laminate layer 55. The third layer 57 is a material (for example, a laminate or an adhesive) that is transparent to laser radiation and permits a laser beam directed at the second layer 55 to penetrate, at least partially to the first layer 52.

In at least one embodiment, the first laminate 52 can be made from a material that is inherently (i.e., even without the addition of the inventive laser enhancing additive or any portion thereof) more responsive to laser radiation than is the second laminate 55. In this embodiment, when a laser beam is directed through the second and first laminate layers 55, 52, the area in the first laminate 52 that is irradiated can "bubble up" to the second layer 55, to form a bond 68 between the first laminate 52, second laminate 55, and (optionally) the third layer.

In one embodiment, the ID document 10 of the embodiment of FIG. 5 is a multi-layer fused polycarbonate structure used as an ID document. The multi-layered structure preferably includes a core and at least a top and bottom over-laminate. The core material 50 may include a titanium dioxide ($TiO_2$) filled polycarbonate (PC) film, which generally has a whitish color. The core material 50 can have pre printed information 70 thereon prior to the fusing process. Examples of acceptable pre-printing processes include screen-printing, offset printing, laser or ink-jet printing, flexography printing, and the like.

The core material 50 and first laminate 52 are fused (e.g., using heat and pressure, such as by a platen press) together to form a structure 53, which helps to deter delaminating attempts. The structure 53 in this example is a solid PC ID document 10. Adjusting the time, temperature and pressure can help to bond the first laminate 52 to the polycarbonate core material 50. The second laminate 55 can be an overlaminate material.

In one experiment, we compared the engraving properties of an inventive fused polycarbonate structure, including a titanium dioxide filled polycarbonate core and polycarbonate over-laminates with ZnS and (CuI+KI+NaI+AlI) additives, against a Muhlbauer polycarbonate card. The comparison involved engraving a 0.75 by 1.0 inch photograph at 750 dpi. The Muhlbauer engraving required between 20 and 25 seconds, while the inventive fused polycarbonate structure required 11-15 seconds engraving time to achieve similar acceptable gray scale tones by adjusting the frequency of the laser.

Figure 6:
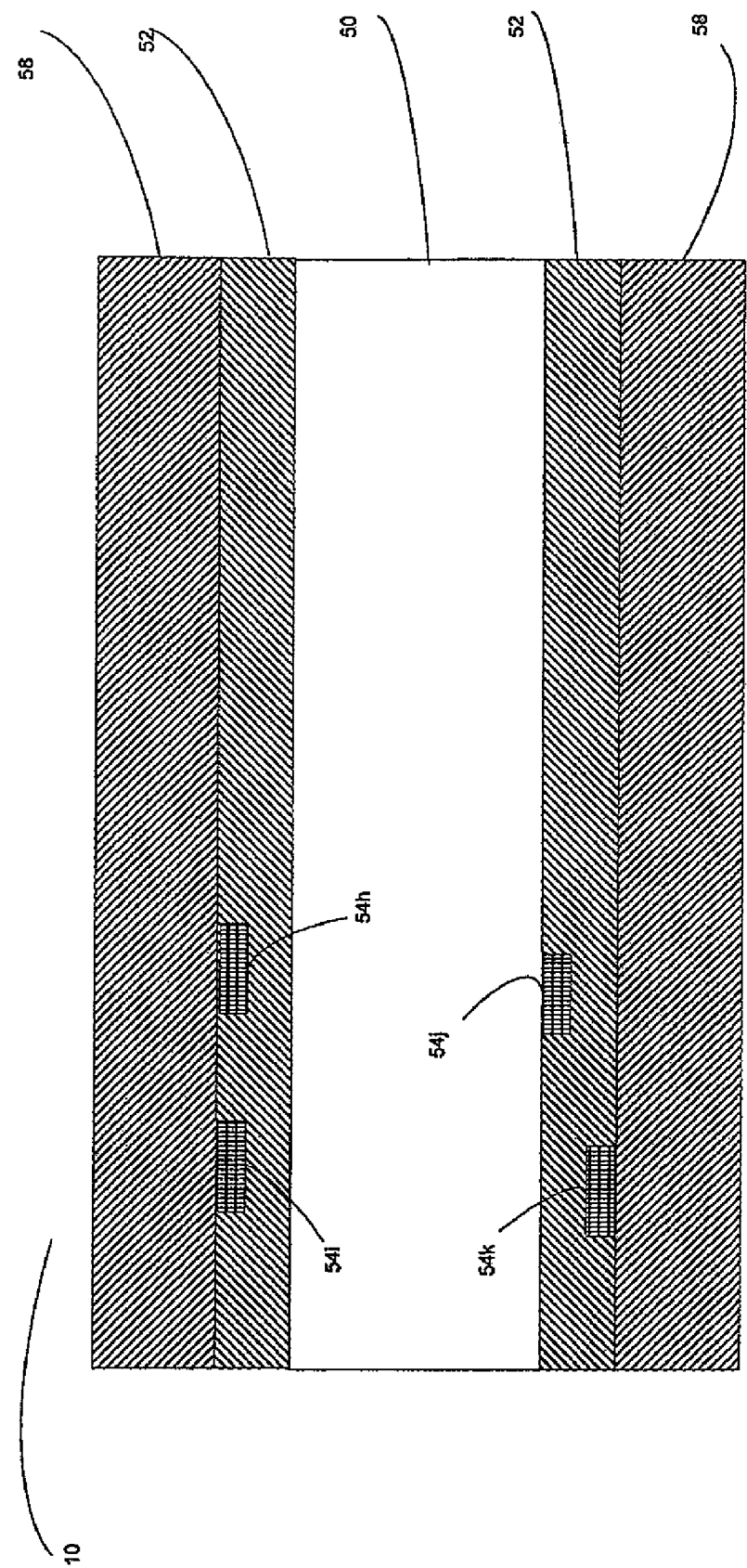
FIG. 6 is an illustrative cross sectional view of an identification document in accordance with a fourth embodiment of the first aspect of the invention.

The inventive laser enhancing additive also can be used in a laminate that has one or more additional laminate layers bonded over it. For example, FIG. 6 is an illustrative cross sectional view of an identification document in accordance with a fourth embodiment of the invention. In the embodiment of FIG. 6, the ID document 10 preferably includes a multi-layered structure. For purposes of illustration, however, the ID document 10 may have a front outward appearance generally similar to the identification document 10 of FIG. 1, although the construction and components of the cross-section shown in FIG. 6 differs from the prior art. In FIG. 6, the ID card 10 includes a core material 50 (shown for illustrative purposes only to be about 10 mils thick) to which is laminated a layer (shown for illustrative purposes only to be about 5 mils thick) of first laminate 52 to which the inventive laser enhancing additive is added. Over the first laminate 52 is a layer of second laminate 58 (shown for illustrative purposes to be about 5 mils thick), which in this embodiment is made from a material that is not sensitive to laser radiation. In this example, the second laminate 58 is a transparent material. A laser is used to engrave the first laminate 52 with indicia 54I-54J. The total thickness of the ID document 10 of FIG. 6 is about 30 mils, which, in at least one embodiment, allows the architecture of the ID document 10 to meet and/or exceed American Association of Motor Vehicle Administrators (AAMVA), American National Standards Institute (ANSI). The total thickness of the ID document 10 of FIG. 6 can also be adapted to meet and International Organization for Standardization (ISO) specifications for identification documents such as ID Cards. It will be appreciated that many other thicknesses of layers are usable to make an ID document that satisfies one or more of the AAMVA, ANSI, and ISO requirements. For example, in FIG. 6, the core material 50 could be 20 mils thick, the first laminate 52 could be 2 mils thick, and the second laminate 58 could be 3 mils thick.

Although FIG. 6 only illustrates a single layer of laminate over the first laminate 52 (which has added to it the inventive laser enhancing additive), it will be appreciated that many more layers can be added over the first laminate 52, so long as the laser being used is able to reach the first laminate 52.

We have found that the inventive laminates described herein may offer one or more advantages. For example, using the inventive laminates can enable the inventive laminates to be laser marked or engraved with usable grayscale images. In addition, using the inventive laminates can enable faster laser engraving or marking at lower laser power levels. Further, the laser engraving that is possible using the inventive laminates is durable, abrasion resistant, and environmentally friendly.

C.4 Additional Embodiments of First Aspect of the Invention

We anticipate that at least the following combinations, and others like them, can be useful embodiments of the first aspect of the invention:

1. A composition having laser engraving properties, comprising:
   a host material; and
   an effective amount of a laser enhancing additive, the laser enhancing additive comprising:
      a first quantity of at least one of copper potassium iodide ($CuKI_3$), Copper Iodide (CuI), Potassium Iodide (Kr), Sodium Iodide (NaI), and Aluminum Iodide (AlI); and
      a second quantity of at least one substance selected from the group consisting of zinc sulfide (ZnS), barium sulfide (BaS), alkyl sulfonate, and thioester.

2. The composition as recited in 1 above, wherein the laser enhancing additive is present in an amount from about 0.001 to 100 percent by weight based on the total weight of the composition.

3. The composition as recited in 1 above wherein host material is substantially transparent and the laser enhancing additive is present in an amount from about 0.001 to 0.1 percent by weight based on the total weight of the composition.

4. The composition as recited in 1 above wherein the laser enhancing additive is present in an amount that is about 0.06 percent by weight based on the total weight of the composition.

5. The composition as recited in 4 above, wherein the first and second quantities each comprise about 0.03 percent by weight based on the total weight of the composition.

6. The composition as recited in 1 above wherein the first quantity and the second quantity are the same.

7. The composition as recited in 1 above wherein the first quantity is greater than the second quantity.

8. The composition as recited in 1 above wherein the first quantity is less than the second quantity.

9. The composition as recited in 1 above wherein the composition is laser engraveable by at least one of a diode pumped Nd:Yag laser, light pumped Nd:Yag laser, $CO_2$ laser and excimer laser.

10. The composition as recited in 8 above wherein the composition is laser engraveable to form a grayscale image.

11. The composition as recited in 1 above wherein the host material comprises a material that is not, by itself, sufficiently sensitive to laser radiation to permit gray scale images to be laser engraved in the host material.

12. The composition as recited in 1 above wherein the host material comprises at least one material selected from the group consisting of thermosetting material, thermoplastic, polymer, copolymer, polycarbonate, fused polycarbonate, polyester, amorphous polyester, polyolefin, silicon-filled polyolefin, TESLIN, foamed polypropylene film, polyvinyl chloride, polyethylene, thermoplastic resins, engineering thermoplastic, polyurethane, polyamide, polystyrene, expanded polypropylene, polypropylene, acrylonitrile butadiene styrene (ABS), ABS/PC, high impact polystyrene, polyethylene terephthalate (PET), PET-G, PET-F, polybutylene terephthalate PBT), acetal copolymer (POM), polyetherimide (PEI), polyacrylate, poly(4-vinylpyridine, poly(vinyl acetate), polyacrylonitrile, polymeric liquid crystal resin, polysulfone, polyether nitride, and polycaprolactone.

13. An article of manufacture capable of being laser engraved with a grayscale image, comprising:
   a core layer having a first surface;
   a first layer comprising a first host material, the first host material comprising an effective amount of a first laser enhancing additive comprising at least one of one of copper potassium iodide ($CuKI_3$), Copper Iodide (CuI), Potassium Iodide (KI), Sodium Iodide (NaI), and Aluminum Iodide (AlI); and
   a second layer comprising a second host material, the second layer oriented in relation to the first host material such that a single laser beam can penetrate both at least a portion of the first layer and at least a portion of the second layer, the second host material comprising an effective amount of a second laser enhancing additive, the second laser enhancing additive selected from the group consisting of zinc sulfide (ZnS), barium sulfide (BaS), alkyl sulfonate, and thioester;
   wherein the first and second layers are operably coupled to each other and at least one of the first and second layers is operably coupled to the first surface of the core layer.

14. The article of manufacture as recited in 13 above, further comprising a grayscale image laser engraved into at least one of the first and second layers.

15. The article of manufacture recited in 13 above, wherein the article of manufacture is an identification document.

16. The article of manufacture of recited in 13 above, wherein the first layer is substantially transparent and the first laser enhancing additive is present in an amount from about 0.001 to 0.100 percent by weight based on the total weight of the first host material.

17. The article of manufacture recited in 13 above, wherein the second layer is substantially transparent and the second laser enhancing additive is present in an amount from about 0.001 to 1.00 percent by weight based on the total weight of the second host material.

18. The article of manufacture recited in 13 above wherein at least one of the first and second host materials comprises a material that is less sensitive to laser radiation than the other of the first and second host materials.

19. The article of manufacture recited in 13 above, wherein at least one of the first and second host materials comprises at least one material selected from the group consisting of thermosetting material, thermoplastic, polymer, copolymer, polycarbonate, fused polycarbonate, polyester, amorphous polyester, polyolefin, silicon-filled polyolefin, foamed polypropylene film, polyvinyl chloride, polyethylene, thermoplastic resins, engineering thermoplastic, polyurethane, polyamide, polystyrene, expanded polypropylene, polypropylene, acrylonitrile butadiene styrene (ABS), ABS/PC, high impact polystyrene, polyethylene terephthalate (PET), PET-G, PET-F, polybutylene terephthalate PBT), acetal copolymer (POM), polyetherimide (PEI), polyacrylate, poly(4-vinylpyridine, poly(vinyl acetate), polyacrylonitrile, polymeric liquid crystal resin, polysulfone, polyether nitride, and polycaprolactone.

20. The article of manufacture recited in 13 above further comprising a third layer disposed between the first and second layers, the third layer comprising a material that permits transmission of a laser beam therethrough.

21. The article of manufacture recited in 13 above, wherein the first and second layers are substantially transparent.

22. The article of manufacture recited in 13 above, wherein the core layer is substantially opaque.

23. A method of engraving a material by exposing the material to laser radiation, comprising:
   adding to the material an effective amount of a laser enhancing additive, the laser enhancing additive comprising:
      at least one of copper potassium iodide ($CuKI_3$), Copper Iodide (CuI), Potassium Iodide (KI), Sodium Iodide (NaI), and Aluminum Iodide (AlI); and
      at least one substance selected from the group consisting of zinc sulfide (ZnS), barium sulfide (BaS), alkyl sulfonate, and thioester; and
   exposing the material to laser radiation in a manner that causes the material to be engraved by the laser radiation.

24. The method recited in 23 above wherein the effective amount of the laser enhancing additive comprises 0.001% to 100% by weight of the material.

25. The method recited in 23 above wherein the material is substantially transparent and wherein the effective amount of the laser enhancing additive comprises 0.001% to 0.1% by weight of the material.

26. The method recited in 23 above further comprising laser engraving an indicium in grayscale in at least a portion of the material.

27. The method recited in 23 above further comprising using the laser engraved material in the manufacture of an identification document.

28. A method of laser engraving a gray scale image on an article having first and second layers, comprising:
adding to the first layer a first effective amount of least one of copper potassium iodide ($CuKI_3$), Copper Iodide (CuI), Potassium Iodide (KI), Sodium Iodide (NaI), and Aluminum Iodide (AlI);
adding to the second layer a second effective amount of at least one substance selected from the group consisting of zinc sulfide (ZnS), barium sulfide (BaS), alkyl sulfonate, and thioester; and
directing a laser beam so that it passes through at least a portion of the first layer and at least a portion of the second layer to form a grayscale image in at least one of the first and second layers.

29. The method recited in 23 above, further comprising:
directing a laser beam so that it that it passes through at least a portion of the first layer and at least a portion of the second layer such that the first and second layers become affixed to each other.

30. The method recited in 28 above wherein the first effective amount and the second effective amount together comprise about 0.001 to 0.1 percent by weight of the total weight of the first and second layers.

31. The method recited in 28 above further comprising using the material in the manufacture of an identification document.

32. A multilayer identification document, comprising:
a core layer;
a film layer overlaying at least a portion of the core layer and affixed to the portion of the core layer, the film layer comprising an additive that comprises:
an effective amount of least one of copper potassium iodide ($CuKI_3$), Copper Iodide (CuI), Potassium Iodide (KI), Sodium Iodide (NaI), and Aluminum Iodide (AlI); and
an effective amount of at least one substance selected from the group consisting of zinc sulfide (ZnS), barium sulfide (BaS), alkyl sulfonate, and thioester.

33. The identification document recited in 32 above, wherein the identification document bears a first indicium thereon, the indicia obtained by exposing the film layer to a laser beam.

34. The identification document recited in 33 above, wherein the indicia comprises at least one of a gray scale image, photograph, text, tactile text, graphics, information, security pattern, security indicia, and digital watermark.

35. The identification document recited in 33 above wherein the first indicium comprises variable information.

36. The identification document recited in 32 above, wherein the film layer is substantially transparent and wherein the additive comprises about 0.001 to 0.10 percent by weight of the film layer.

37. The identification document recited in 36 above, wherein the film layer further comprises:

a first sub layer comprising an effective amount of least one of copper potassium iodide ($CuKI_3$), Copper Iodide (CuI), Potassium Iodide (IU), Sodium Iodide (NaI), and Aluminum Iodide (AlI); and
a second sub layer comprising an effective amount of at least one substance selected from the group consisting of zinc sulfide (ZnS), barium sulfide (BaS), alkyl sulfonate, and thioester.

38. A process for making an identification document, comprising:
overlaying at least a portion of a core layer with a film layer, the film layer comprising:
at least one of copper potassium iodide ($CuKI_3$), Copper Iodide (CuI), Potassium Iodide (KI), Sodium Iodide (NaI), and Aluminum Iodide (AlI); and
at least one substance selected from the group consisting of zinc sulfide (ZnS), barium sulfide (BaS), alkyl sulfonate, and thioester; and affixing the film layer to the portion of the core layer.

39. The process recited in 38 above, further comprising directing a laser beam to at least a portion of the film layer to produce a first grayscale indicium in the portion of the film layer.

D. Second Aspect of the Invention

D.1 Features

In a second aspect of the invention, the above-described inventive laser enhancing additive can be added to a coating on a at least a portion of a surface to be laser engraved or marked, to help to overcome the problem that the material being laser engraved or marked is responsive to laser engraving and/or is not responsive enough to be capable of having grayscale images laser engraved thereon. We have found that the ability to laser engrave at least some materials can be improved and/or the time to laser engrave at least some materials can be reduced, by coating the area of the given material to be engraved with a coating that contains the inventive laser enhancing additive. Note also that the coating containing the inventive laser enhancing additive can be applied to a laminate or another coating. We also have found that the compounds that make up the inventive laser sensitive additives described herein can be divided over two or more coatings, or a coating and a laminate, to provide improved laser engraving performance.

A least one embodiment of the second aspect of the invention is based on the surprising discovery that the process of laser engraving of materials, especially materials used in the manufacture of identification documents, is improved and enhanced by coating the area of the material to be engraved with a coating that includes a first effective amount of a first composition, the first composition being at least one of copper potassium iodide ($CuKI_3$), copper iodide (CuI), Potassium Iodide (KI), Sodium Iodide (NaI), and Aluminum Iodide (AlI) (and any combination thereof) together with a second effective amount of a second composition, the second composition being at least one of the following: zinc sulfide (ZnS), barium sulfide (BaS), alkyl sulfonate (e.g., $RSO_2Na$ or $R—OSO_2Na$), and Thioester (e.g., substances containing —SH) (and any combination thereof). As with the first aspect of the invention, the combination of at least one of CuI, KI, NaI, AlI (and any combination thereof), and $CuKI_3$ together with at least one of ZnS, BaS, alkyl sulfonate, and thioester (and any combination thereof) continues to be referred to as the "inventive laser enhancing additive".

In at least some embodiments, the resultant concentration of the inventive laser enhancing additive in the coating, by weight, ranges from 0.001% to 0.1% by weight. In at least some embodiments, the inventive laser enhancing additive is added at larger concentrations (e.g., from 0.1% to 100%). At concentrations larger than 0.1%, the inventive laser enhancing additive can still be used to enhance laser marking or engraving of an article or surface being coated, but at possible sacrifice of some of the transparency of the coating (if, in fact, the coating is substantially transparent or translucent to begin with). Advantageously, in at least one embodiment, the laser enhancing additive is about 0.06% by weight in the coating. In another advantageous embodiment, the 0.06% by weight includes 0.03% by weight of at least one of CuI, KI, NaI, AlI, and $CuKI_3$ (and any combination thereof) and 0.03% by weight of at least one of ZnS, BaS, alkyl sulfonate, and thioester (and any combination thereof).

We further note that the previous examples and concentrations discussed in connection with FIGS. 9-13 and Tables 1-4 are equally applicable to coatings as they are to laminates.

Of course, those skilled in the art will appreciate that other concentration ranges for the laser enhancing formulations may be usable, especially when the coating is applied to opaque materials and colored materials. In addition, it will be appreciated that the proportions of the at least one of CuI, KI, NaI, AlI, and $CuKI_3$ can vary, as can proportions of the at least one of ZnS, BaS, alkyl sulfonate, and thioester also can vary. That is, a given composition could have, for example (using for purely illustrative purposes the example of a composition containing CuI and BaS), equal amounts of CuI and BaS, or 3 parts CuI to 5 parts BaS, 2 parts CuI to 1 part BaS, etc. We expect that those skilled in the art will be able to determine optimum proportions without undue experimentation. In addition, we note that at least one advantageous compound that we have tested uses the two sub compositions (e.g., the CuI and BaS, in this example) in equal proportions.

The concentration of the inventive laser enhancing additive that is usable with a given coating is at least in part dependent on the properties of the coating (especially the binder material in the coating) laminate and the ultimate use, durability, environmental conditions, etc., to which the coating is subject. It is possible that higher concentrations of the laser enhancing formulations in the coating may affect one or more properties of the coating, such as transparency, durability, malleability, opacity, rigidity, etc. Of course, appropriate quantities of the additives can be determined for a particular coating application without undue experimentation. Additional factors may include engraving time and process and desired engraving quality.

It is contemplated that the inventive laser enhancing additive can be added to a coating that is applied (by virtually any known method) to virtually any surface, article, or product, to enable the surface, article, or product to be laser engraved, especially with a high quality grayscale image. Accordingly, we believe that the inventive laser enhancing laminate has applicability to the manufacture many different articles that can be coated, including but not limited to identification documents, identification cards, credit cards, prepaid cards, phone cards, smart cards, contact cards, contactless cards, combination contact-contactless cards, proximity cards (e.g., radio frequency (RFID) cards), electronic components, tags, packaging, containers, building materials, construction materials, plumbing materials, automotive, aerospace, and military products, computers, recording media, labels, tools and tooling, medical devices, consumer products, and toys. Further, we contemplate that entire articles of manufacture could be formed wholly or partially using a coating material that contains the inventive laser enhancing additive and then laser engraved or marked.

As those skilled in the art will appreciate, the effective amounts of the first and second compositions that are added to the coating can vary depending on the type of coating (e.g., the binder material and/or other additives present in the coating), the material being coated, and on the laser engraving technique being employed. In at least one embodiment, the inventive laser enhancing additive in the coating includes equivalent amounts of the first and second compositions described above. In at least one embodiment, the coating includes more of the second composition than the first composition. In at least one embodiment, the coating includes more of the first composition than the second composition.

As those skilled in the art also will appreciate, the inventive laser enhancing additive can be added to many different types of coatings, including organic coatings and aqueous coatings, substantially transparent coatings and non-transparent coatings. In addition, in at least some embodiments, the coating containing the inventive laser enhancing additive can further comprise a binder, which can be, for example, latex, emulsion, a thermoset binder or a thermoplastic binder. Illustrative examples of binder materials which we have found to be usable include resins, polyesters, polycarbonates, vinyls, acrylates, urethanes, and cellulose based materials. We anticipate that those skilled in the art will readily be able to formulate coatings containing the inventive laser enhancing additive using many other binder materials, such as lacquer, varnish, latex, acrylic, epoxy resins, nitrocellulose, alkyd resins, melamine formaldehyde, polyamides, silicone, and polyvinyl butyral. Those skilled in the art also will appreciate that virtually any resin able to be formed into a coating could be used with the invention. Of course, a coating containing the inventive laser enhancing additive can also include other additives known in the art, such as colorants (e.g., pigments or dyes), stabilizers, lubricants, adhesion promoting agents, toners, surfactants, anti-static agents, thickeners, thixotropic agents, and the like.

By applying a coating containing the inventive laser enhancing additive (also referred to herein as the "inventive coating") to a surface of a material to be laser engraved, we have found that we can form high quality images and other engravings on articles such as multi-layered ID documents, at acceptable throughput rates. The high quality images can include both grayscale laser engraved images (as described herein) and full color laser engraved images (which are more particularly described in applicants' commonly assigned U.S. patent application, application Ser. No. 10/330,034, entitled "Systems, Compositions, and Methods for Full Color Laser Engraving of ID Documents," attorney docket no. P0734D, filed Dec. 24, 2002). Further, we anticipate that the inventive coating can be applied to virtually any part of the surface of any article where laser marking, especially laser engraving of grayscale images, is desired. The entire article or surface need not be coated.

We believe that the laser engraving or marking of various articles, including but not limited to identification documents, identification cards, credit cards, prepaid cards, phone cards, smart cards, contact cards, contactless cards, combination contact-contactless cards, proximity cards (e.g., radio frequency (RFID) cards), electronic components, tags, packaging, containers, building materials, construction materials, plumbing materials, automotive, aerospace, and military products, computers, recording media, labels, tools and tooling, medical devices, consumer products, toys, etc., can be improved by coating the surface of the article to be engraved with the inventive coating. This improvement can be achieved on articles whose surface is a laminate to be laser engraved. In addition, the inventive coating, as contemplated herein, can be applied over other coatings (or materials) that cover the surface of an article to be laser engraved or marked, so long as the "intervening" materials between the surface being laser engraved or marked and the inventive coating are transparent to laser radiation.

Figure 2:
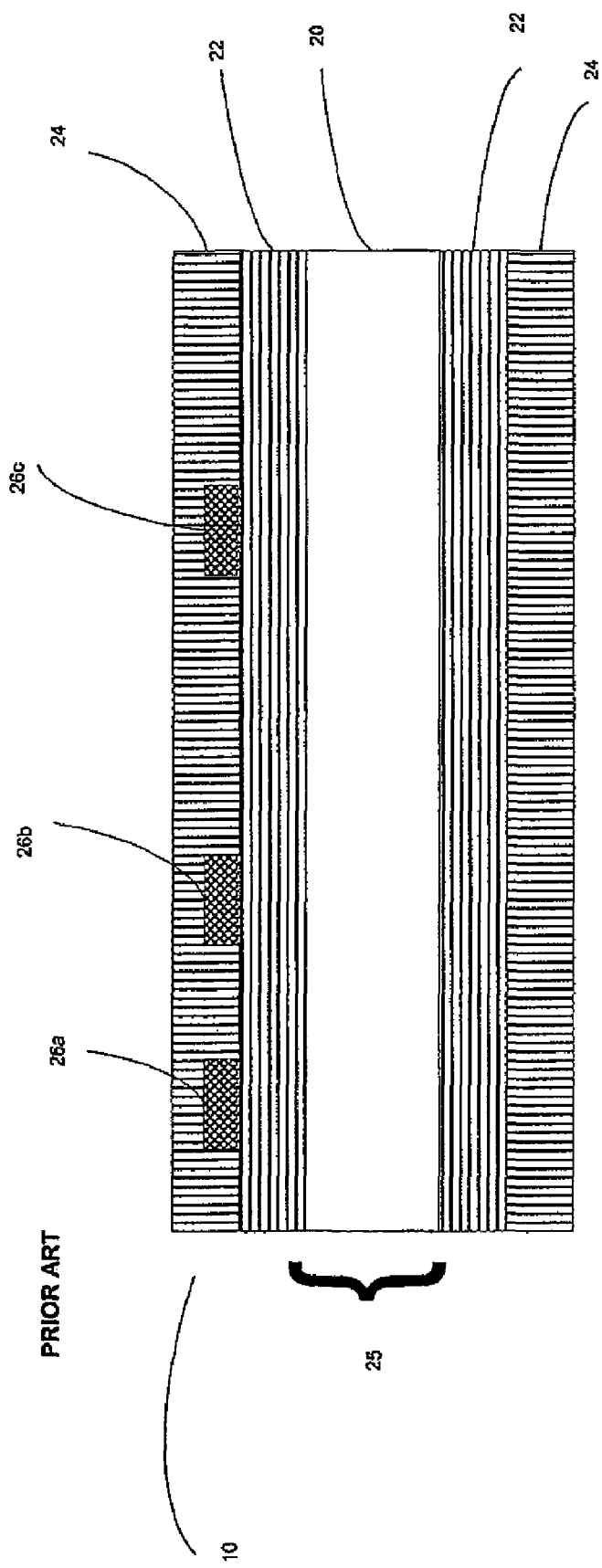
FIG. 2 is an illustrative cross section of the prior art identification document of FIG. 1, taken along the A-A line.

In at least one embodiment, the inventive coating is used to improve the manufacture of an identification document, such as the identification document 10 shown in FIGS. 1 and 2. The security of the document can be enhanced through selective coating of the core layer of the identification document 10 with the inventive coating Because the coating material can be applied through a controlled process (e.g., offset, flexography, pad printing, or screen printing), the placement of the inventive coating (and, thus, the laser enhancing additive) can be precisely controlled. The coating material is sensitive (or responsive to) the laser, so the placement of the inventive coating dictates the location of the engraved information. Selective placement of the laser sensitive materials also helps to prevent counterfeiting, since the laser engraveable areas are limited.

In one embodiment, the inventive coating is applied to an identification document and the issuing authority for the identification document (e.g., a state's DMV, a passport authority, etc.) can be involved with the design layout, creating unique coating patterns for the document's core. The coating layout can be held secret, further enhancing the security of the document, while creating obstacles for the counterfeiter. Changing the coating materials (e.g., the binder) or additive concentration or adhesive will alter the coating placement and response, creating even further obstacles for the counterfeiter and may make one or more portions of the identification document impossible to engrave with a usable indicia and difficult to duplicate.

Note also that use of the inventive coating described herein may provide at least some of the same advantages (especially in the production of grayscale images) previously described in connection with use of the inventive laser enhancing laminate, and they are not repeated here. Further, the lasers previously described in connection with the first aspect of the invention are similarly usable in this second aspect of the invention, and their description is not repeated here.

In another embodiment of the invention (illustrated further herein in connection with FIG. 8), the inventive laser enhancing additive can be divided between multiple optically adjacent layers (e.g., a first layer having a coating and a laminate, or multiple adjacent laminates (as previously described), or a first layer having a coating, a second layer having a coating, a third layer having a laminate, a fourth layer having a coating, etc.). This embodiment can be advantageous for security purposes. For example, during laser engraving, the same visible image can be engraved in any one or more of the plurality of layers, but, depending on the proportions of the inventive laser additive (and/or its layer component parts) disposed in each layer, the visible image will not necessarily look exactly the same in each layer. This can provide a visual effect that is difficult to duplicate.

For example, assume that a layer that is optically "closer" to the laser beam (e.g., a top layer) has a first concentration of the inventive laser enhancing additives and a second layer that is optically more distant (e.g., a layer below the top layer) has a second, higher concentration of the inventive laser enhancing additives. When these two layers are laser engraved, the bottom layer will have a visible laser engraved image (e.g., a grayscale image) and the top layer will have a so-called "latent" laser engraved image that can be fainter but still visually perceptible to the naked human eye. It also is contemplated that the either of the two layers could contain colorants (e.g., both visible and non visible (e.g., IR, UV) colorants that further differentiate between the visible laser engraved image and the latent laser engraved image.

By "optically adjacent", it is meant that a laser can pass through from one layer (e.g., a laminate) to another layer (e.g., a second laminate or a core layer or layer having a coating thereon), such that both layers can be laser engraved by the same laser beam at substantially the same time. Two layers that are optically adjacent need not be literally adjacent, although they can be. The two layers can be directly adjacent (e.g., two layers that are fused together), or can be separated by a material that permits the laser beam to pass therethrough but does not itself necessarily have to react to the laser beam. As an example, for optical adjacency, the two layers can be separated by an adhesive that permits laser light to pass therethrough), or can be separated by another type of layer (e.g., a thin film layer) that permits laser light to pass through).

By "dividing the laser enhancing additive", at least any one or more of the following embodiments is included:

(a) the entire additive in the entire desired concentration, e.g. 0.06% by weight, is divided between two optically adjacent layers, for example 0.03% in a first layer of laminate and 0.03% in a coating applied to a second laminate that is optically adjacent to the first laminate, or 0.06% by weight in one layer comprising a coating and 0.03% by weight in another layer comprising a coating); or (b) a first component of the inventive laser enhancing additive is provided in a first layer (the "first component" is one of the two components in the inventive laser enhancing additive, either the component comprising at least one of copper iodide, copper potassium iodide, potassium iodide, sodium iodide, and aluminum iodide (and any combination thereof) or the component comprising at least one of zinc sulfide, barium sulfide, alkyl sulfonate, and thioester (and any combination thereof)) and a second component of the inventive laser enhancing additive (e.g., the other of the two components in the inventive laser enhancing additive) is provided in another layer that is optically adjacent to the first layer; or (c) Each of the constituents of the inventive laser enhancing additive (e.g., copper, potassium, iodine, etc.) can be present in a separate layer of coating and/or laminate, where the respective layers are either adjacent or separated by one or more layers of material (e.g., another laminate or an adhesive) that is transparent to laser radiation. When a laser beam is directed such that it passes through all of the layers containing a constituent of the inventive laser enhancing additive, the combined action of the constituents enable laser engraving to occur in at least one of the respective layers. The constituents also can be combined with one or more other constituents, in different layers, in this manner. For example, an effective amount of copper iodide and sodium iodide can be present in a coating applied to an article and an effective amount of zinc sulfide and potassium iodide can be present in a laminate applied over the coating, and an effective amount of aluminum iodide can be present in a coating that is then applied over that laminate. This example is not, of course, limiting; those skilled in the art will appreciate that there are many different ways to combine and/or separate the constituents of the inventive laser enhancing additive into one or more layers of coatings and/or laminates.

For any of (a), (b), and (c), above, the layers can be, for example:

(i) a plurality of laminates
(ii) a plurality of coatings applied to a given laminate;
(iii) a plurality of coatings applied to a given coating;
(iv) a mixture of a plurality of laminates and/or a plurality of coatings
(v) a core layer with a one or more coatings and one or more laminates coupled to the core layer;
(vi) at least on layer of laminate and at least one layer of coating applied over the at least one layer of laminate;
(vii) at least a first laminate with a coating coupled to at least a second laminate with a coating.

Finally, in another aspect of the invention, we have made the surprising discovery, however, that the LAZERFLAIR pigment can be added to a coating (in a similar manner as adding the above described inventive laser enhancing additive to a coating) to enable the laser engraving or marking of grayscale indicia on the article. It is known that the LAZERFLAIR pigment is a laser enhancing additive when added to the actual material to be engraved (see, e.g., the Internet web page http://www.empigments.com/LazerFlair.cfm) such that contrast can be improved. Our testing has shown, however, that LAZERFLAIR also can be added to a coating to improve the laser engraving of an article (e.g., a core layer in an identification document) to which the coating is applied. The LAZERFLAIR additive is available from EM Pigments (EM Pigments can be contacted through 7 Skyline Drive, Hawthorne, N.Y. 10532 USA)

D.2 Preparation/Manufacture

Embodiments of the inventive coating can be prepared in any customary manner known to those skilled in the art. For example, in one embodiment where the inventive coating comprises an organic polymeric binder, copper potassium iodide, and zinc sulfide, the copper potassium iodide and zinc sulfide can be mixed into the organic polymeric binder during mixing using a blender; the additive can be ground using, for example, a ball mill to reduce particle size.

In another embodiment, the inventive laser enhancing additive can be added to the coating as part of a masterbatch, such as was described previously for the inventive laser enhancing additives that were added to laminates. For example, a masterbatch containing 0.03% by weight of at least one of copper potassium iodide, copper iodide, potassium iodide, sodium iodide, and aluminum iodide and 0.03% by weight of zinc sulfide can be produced and mixed with orgy, each of the two compounds.

Although at least one advantageous embodiment of the invention uses a coating that is a liquid form when applied to the ID document, use of a liquid coating is not necessary. For example, those skilled in the art can, without undue experimentation, use the inventive laser enhancing additive in a coating that is applied in a non-liquid form (e.g., solid or powder that liquefies upon heating).

D.3 Illustrative Examples

Figure 7:
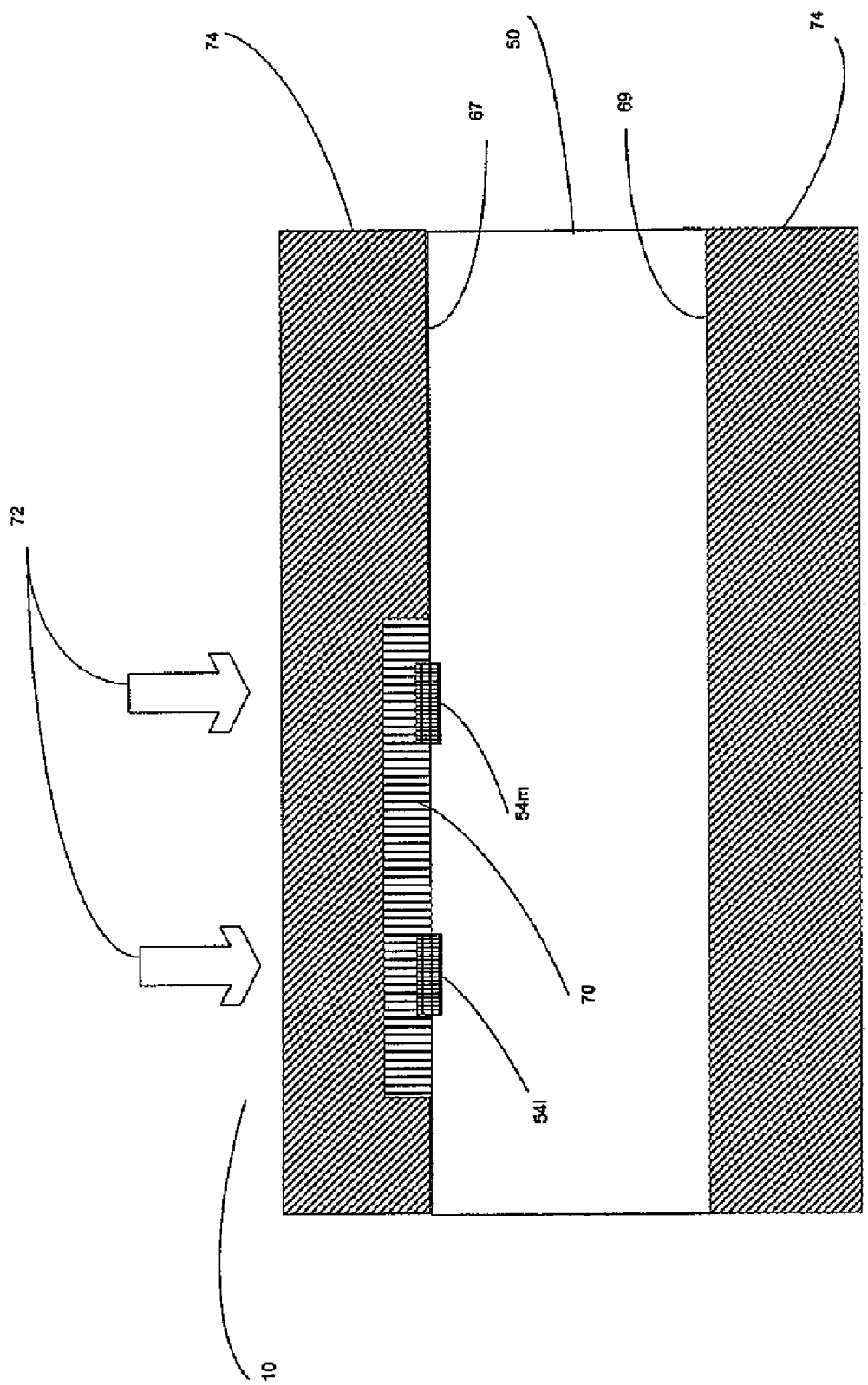
FIG. 7 is an illustrative cross sectional view of an identification document in accordance with a first embodiment of a second aspect of the invention.

FIG. 7 is an illustrative cross sectional view of an identification document 10 in accordance with a one embodiment of the second aspect of the invention. In the embodiment of FIG. 7, the ID document 10 preferably includes a multi-layered structure. For purposes of illustration, however, the ID document 10 may have a front outward appearance generally similar to the identification document 10 of FIG. 1, although the construction and components of the cross-section shown in FIG. 7 differs from the prior art. In FIG. 7, a core material 50 (which for illustrative purposes only is TESLIN), has top surface 67 and bottom surface 69. Although not illustrated in FIG. 7, the core material 50 also could be pre printed with one or more indicia, such as variable information about the bearer of the identification document 10, by a method such as color laser Xerography (note that illustrative examples of printing on the core layer 50 are shown in FIG. 5). A portion of the top surface 67 of the core layer 50 is coated with an inventive coating 70 containing the inventive laser enhancing additive. The inventive coating 70 could, of course, be applied to the bottom surface 69, if desired.

In FIG. 7, the coating 70 can be applied selectively, so that only specific areas of the core material 50 are sensitized for laser engraving. Thus, energy 72 from a laser (not shown) can be specifically directed at the area of the ID document 10 that contains the inventive coating 70, to produce indicia 54*l*, 54*m* on the material that was coated (which, in this example, is the core layer 50). Such selective application of the inventive coating 70 can be advantageous, for example, in the manufacture of identification documents, because the placement and locations of the coating can be kept secret, to help hinder fraud. For example, counterfeiters may not be able to tell what information on the card has been laser engraved and what has not. Even those counterfeiters with access to a laser may not know which areas of the identification document are engraveable. Changing any of the components in the identification document, such as the binder, the inventive laser enhancing additive, or the concentration of the inventive laser enhancing additive, can affect the appearance of the identification document, making detection of a fraud, counterfeit, or forged document perceptible.

Another anti-fraud advantage can be seen in the embodiment of FIG. 7. If the core layer 50 is pre-printed with non-variable or non-personal information (such as the name of the issuing authority), then coated with the inventive coating 70, the ID document 10 can later be personalized (e.g., have variable information, such an image, signature, birthdate, or biometric data) by laser engraving the coated portions of the core layer 50 with the variable information. This laser engraving can even occur if a laminate is applied over the inventive coating 70, if the laminate permits laser energy 72 to pass therethrough to the inventive coating 70 and the core layer 50.

In FIG. 7, a laminate 74 is shown as being disposed on top of the inventive coating 70. The laminate 74 can be applied before or after the coated areas of the core layer 50 are laser engraved. For example, if the laminate 74 is transparent to laser radiation, applying it over the inventive coating 70 will not interfere with the ability of the laser radiation 72 to penetrate through to the inventive coating 70 and the core layer 50. If, however, the laminate 74 is not transparent to laser radiation 72, it can be applied after the laser engraving of the core material 50 has occurred.

The inventive coating 70 can be applied to the surface 67 by any known method (e.g., by offset, flexography, screen-printing, spraying, dipping, immersion, brushing, rolling, masking desired coating areas, etc.). The thickness of the coating 70 is dependent on the article being coated, but can range from about 0.01 microns to about 50 microns for ID documents such as ID cards. It will be appreciated that other articles being laser engraved may require or use coatings having different thicknesses.

Although FIG. 7 illustrates that the coating 70 covers only a portion of the top surface 67, this is not limiting. The coating 70 can be applied to any surface, and can, if desired, cover the entire surface.

We have found that the inventive coatings described herein may offer one or more advantages. For example, using the inventive coatings can enable the materials being coated to be laser marked or engraved with usable grayscale images. In addition, using the inventive coatings can enable faster laser engraving or marking, at lower laser power levels. Also, the inventive coatings can be selectively applied to articles such as identification documents to increase security and deter fraud. Further, the laser engraving that is possible using the inventive coatings is durable, abrasion resistant, and environmentally friendly.

D.4 Additional Embodiments of the Second Aspect of the Invention

We anticipate that at least the following combinations, and others like them, can be useful embodiments of the second aspect of the invention:

1. A coating having laser engraving properties, comprising:
   a liquid carrier material; and
   an effective amount of a laser enhancing additive, the laser enhancing additive comprising:
      a first quantity of at least one substance selected from the group consisting of copper potassium iodide ($CuKI_3$), copper iodide (CuI), potassium iodide (CuI), sodium iodide (NaI), aluminum iodide (AlI); and
      a second quantity of at least one substance selected from the group consisting of zinc sulfide (ZnS), barium sulfide (BaS), alkyl sulfonate, and thioester.

2. The coating recited in 1 above wherein the laser enhancing additive is present in an amount from about 0.001 to 100 percent by weight based on the total weight of the composition.

3. The coating recited in 1 above wherein the liquid carrier material is substantially transparent and the laser enhancing additive is present in an amount from about 0.001 to 0.1 percent by weight based on the total weight of the composition.

4. The coating recited in 1 above wherein the laser enhancing additive is present in an amount that is about 0.06 percent by weight based on the total weight of the composition.

5. The coating recited in 4 above, wherein the first and second quantities each comprise about 0.03 percent by weight based on the total weight of the composition.

6. The coating recited in 1 above wherein the first quantity and the second quantity are the same.

7. The coating recited in 1 above wherein the first quantity is greater than the second quantity.

8. The coating recited in 1 above wherein the first quantity is less than the second quantity.

9. The coating recited in 1 above wherein a substrate coated with the coating is laser engraveable by at least one of a diode pumped Nd:Yag laser, light pumped Nd:Yag laser, $CO_2$ laser and excimer laser.

10. The coating recited in 1 above wherein the liquid carrier material comprises at least one material selected from the group consisting of resins, polyesters, polycarbonates, vinyls, acrylates, urethanes, and cellulose based materials, thermosetting material, thermoplastic, polymer, copolymer, polycarbonate, fused polycarbonate, polyester, amorphous polyester, polyolefin, silicon-filled polyolefin, TESLIN, foamed polypropylene film, polyvinyl chloride, polyethylene, thermoplastic resins, engineering thermoplastic, polyurethane, polyamide, polystyrene, expanded polypropylene, polypropylene, acrylonitrile butadiene styrene (ABS), ABS/PC, high impact polystyrene, polyethylene terephthalate (PET), PET-G, PET-F, polybutylene terephthalate PBT), acetal copolymer (POM), polyetherimide (PEI), polyacrylate, poly(4-vinylpyridine, poly(vinyl acetate), polyacrylonitrile, polymeric liquid crystal resin, polysulfone, polyether nitride, and polycaprolactone.

11. A substrate capable of being laser engraved with a grayscale indicia, comprising:
   a core layer having a first surface; and
   a coating applied to at least a first area of the first surface, the coating comprising:
      a first effective amount of a first compound, the first compound selected from the group consisting of copper potassium iodide ($CuKI_3$), Copper Iodide (CuI), Potassium Iodide (KI), sodium iodide (NaI), and aluminum iodide (AlI); and
      a second effective amount of a second compound, the second compound selected from the group consisting of zinc sulfide (ZnS), barium sulfide (BaS), alkyl sulfonate, and thioester;
   wherein laser energy directed at the first area of the core layer is capable of forming a grayscale indicium therein.

12. A substrate capable of being laser engraved with a grayscale indicia, comprising:
   a core layer having a first surface;
   a first coating applied to at least a first area of the first surface, the first coating comprising an effective amount of a first laser enhancing additive comprising at least one of one of copper potassium iodide ($CuKI_3$), copper iodide (CuI), potassium iodide (KI), sodium iodide (NaI), and aluminum iodide (AlI); and
   a second coating applied to at least a second area of the core layer, the second coating comprising an effective amount of a second laser enhancing additive, the second laser enhancing additive selected from the group consisting of zinc sulfide (ZnS), barium sulfide (BaS), alkyl sulfonate, and thioester;
   the first and second areas at least partially overlapping on the core layer to define a third area on the core layer;
   wherein laser energy directed at the third area of the core layer is capable of forming a grayscale indicium therein.

13. A method of producing an identification document, comprising:
   providing a core including a top surface and a bottom surface; and
   coating at least a portion of the top surface with a laser sensitive additive, the laser sensitive additive comprising:
      an effective amount of at least one of one of copper potassium iodide ($CuKI_3$), Copper Iodide (CuI) potassium iodide (KI), sodium iodide (NaI), and aluminum iodide (AlI); and
      an effective amount of at least one of zinc sulfide (ZnS), barium sulfide (BaS), alkyl sulfonate, and thioester.

14. The method recited in 13 above further comprising laminating at least the top surface of the core with a laminate.

15. The method recited in 13 above further comprising directing a laser beam so that it passes through at least a portion of the coating and reaches the core layer to form a grayscale indicium on the core layer.

16. The method recited in 13 above, wherein the core comprises at least one of TESLIN, polycarbonate, polyester, and polyvinyl chloride.

17. The method of recited in 13 above wherein the coating comprises Copper Iodide (CuI) potassium iodide (KI), sodium iodide (NaI), and aluminum iodide (AlI).

E. Third Aspect of the Invention

In a third aspect of the invention, the invention utilizes the inventive laser enhancing laminate (or components thereof) in more than one layer on the identification document. Several embodiments of this aspect already have been presented above in the first and second aspects of the invention. Still another embodiment of this aspect is provided below.

Figure 8:
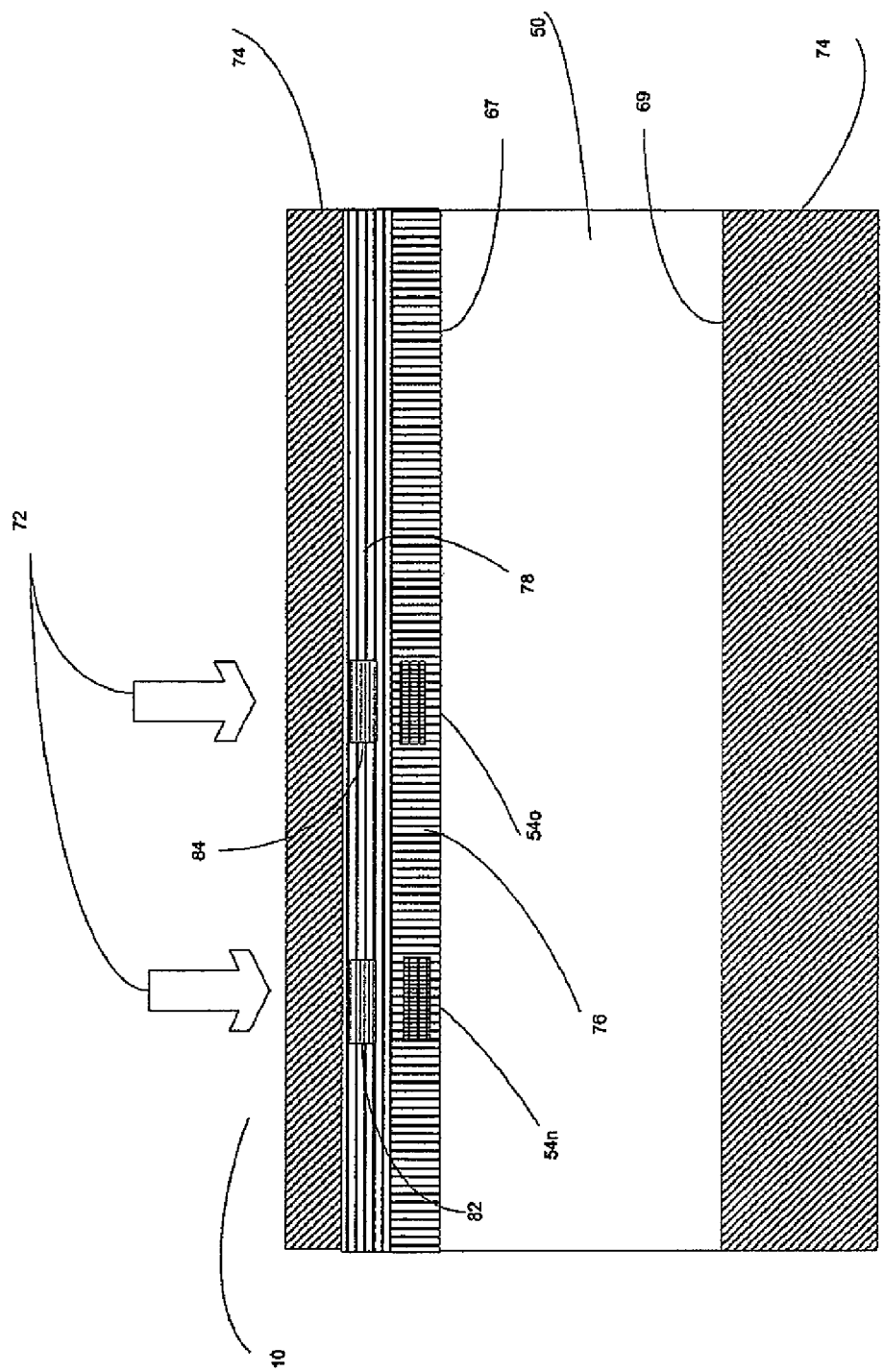
FIG. 8 is an illustrative cross sectional view of an identification document in accordance with a second embodiment of the second aspect of the invention.
Figures 9A, 9B:
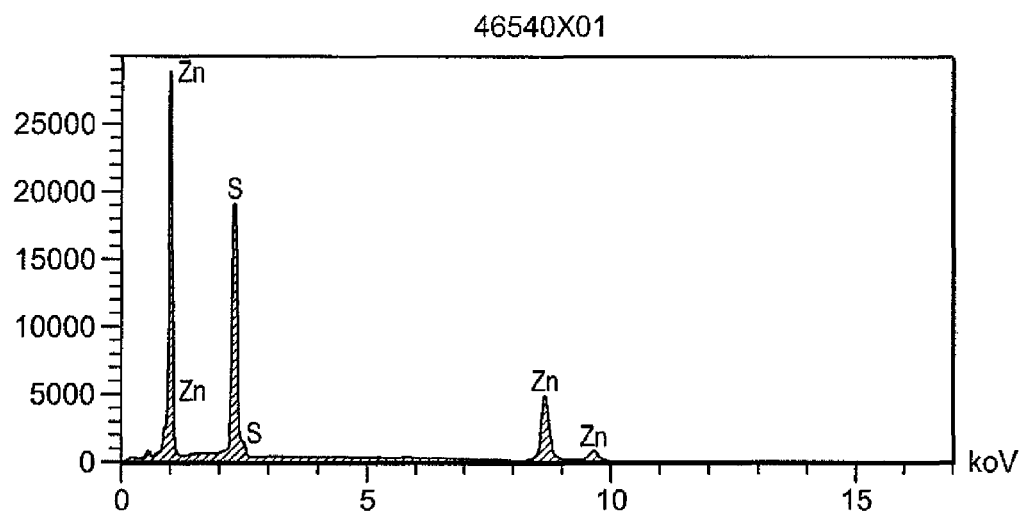
FIGS. 9A-9B are an analytical graph and test data, respectively, from a chemical analysis of a first laser enhancing additive used with one embodiment of the invention.
Figures 10A, 10B:
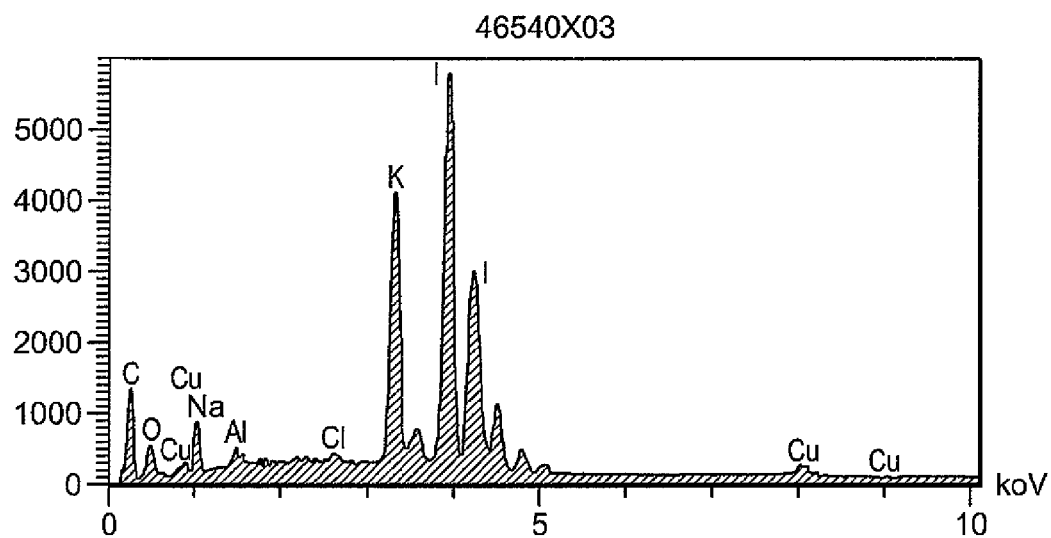
FIGS. 10A-10B are an analytical graph and test data, respectively, from a chemical analysis of a second laser enhancing additive used with one embodiment of the invention.
Figures 11A, 11B:
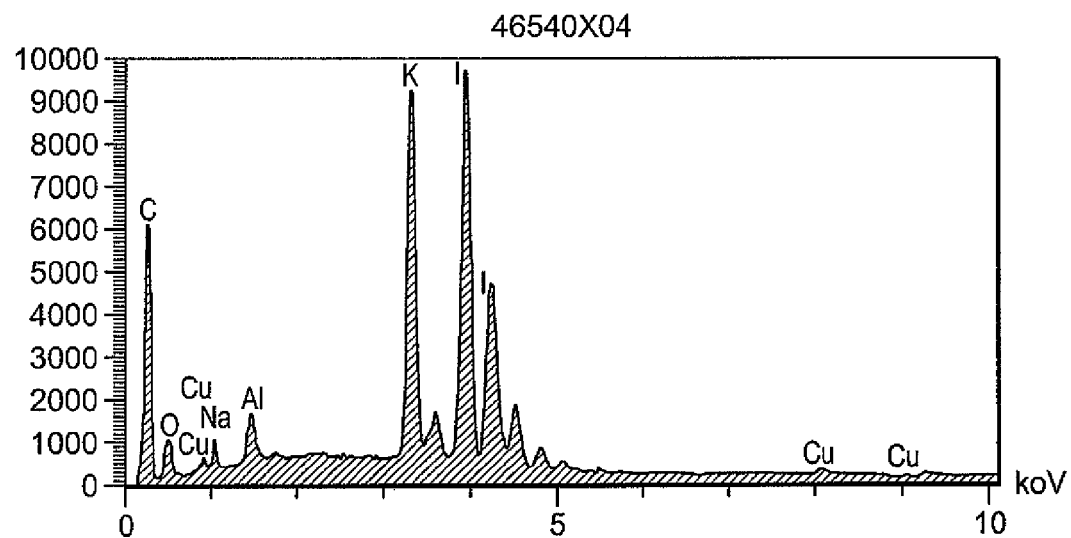
FIGS. 11A-11B are an analytical graph and test data, respectively, from a chemical analysis of a third laser enhancing additive used with one embodiment of the invention.
Figures 12A, 12B:
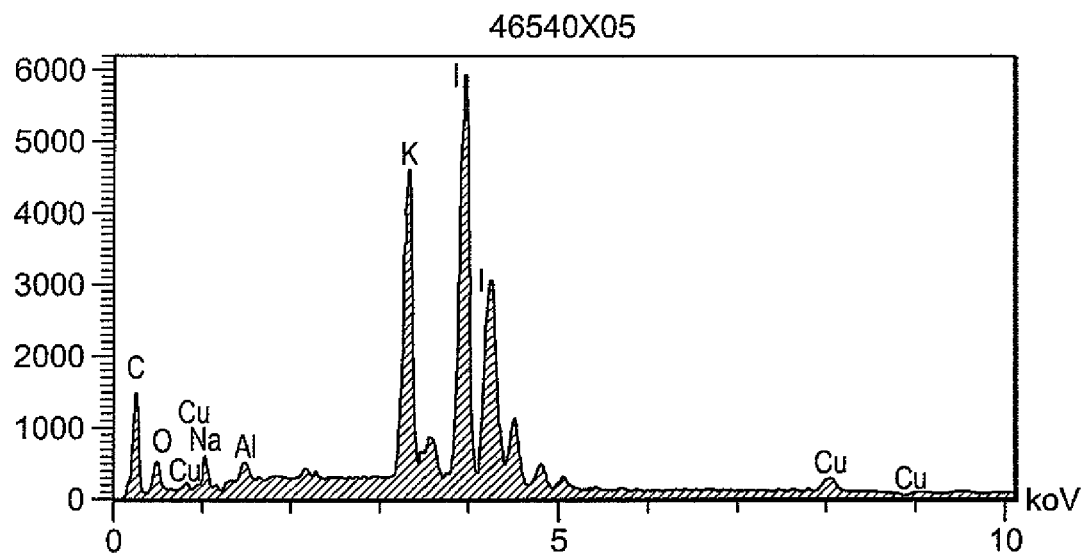
FIGS. 12A-12B are an analytical graph and test data, respectively, from a chemical analysis of a fourth laser enhancing additive used with one embodiment of the invention.
Figures 13A, 13B:
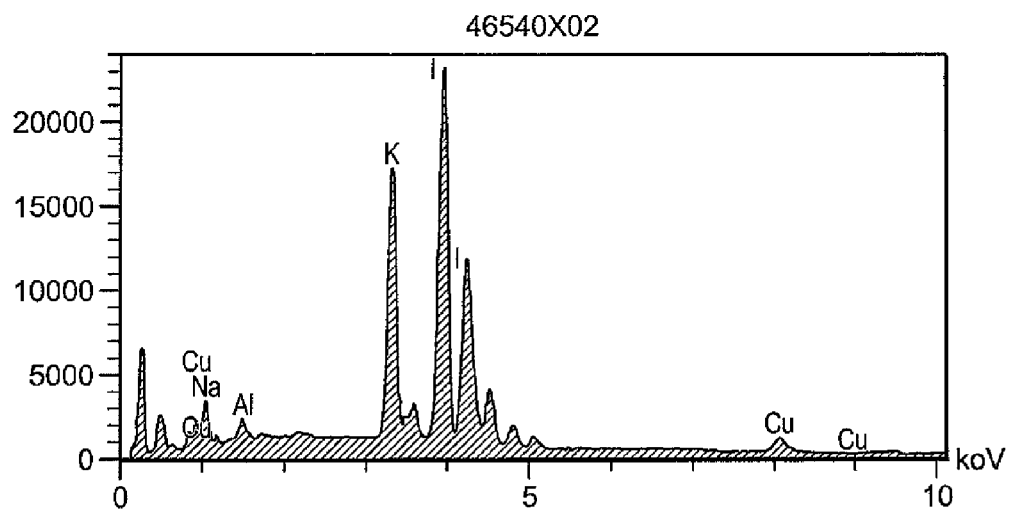
FIGS. 13A-13B are an analytical graph and test data, respectively, from a chemical analysis of a fifth laser enhancing additive used with one embodiment of the invention.

FIG. 8 is an illustrative cross sectional view of an identification document in accordance with a second embodiment of the second aspect of the invention. In the embodiment of FIG. 8, the ID document 10 preferably includes a multi-layered structure, and the inventive laser enhancing additive is divided between two optically adjacent layers, as previously described. For purposes of illustration, however, the ID document 10 may have a front outward appearance generally similar to the identification document 10 of FIG. 1, although the construction and components of the cross-section shown in FIG. 8 differs from the prior art. In the embodiment of FIG. 8 a first portion of the inventive laser enhancing additive is disposed in a first coating 76 and a second portion of the inventive laser enhancing additive is disposed in a middle laminate 78 applied over the first coating 76. An overlaminate 74 is applied over the middle laminate 78. The first coating 76 is applied to the core layer 50, which in FIG. 8 is made from an opaque white material, such as TESLIN or polycarbonate.

In the embodiment of FIG. 8, the first coating 76 contains a first effective amount of at least one of copper potassium iodide (CuKI$_3$), copper iodide (CuI), potassium iodide (KI), sodium iodide (NaI), and aluminum iodide (AlI), and the middle laminate 78 contains a second effective amount of at least one of the following: zinc sulfide (ZnS), barium sulfide (BaS), alkyl sulfonate and thioester. The first effective amount is greater than the second effective amount, in this embodiment. The first coating 76 and middle laminate 78 are constructed and arranged so that the laser radiation 72 can pass through both the first coating 76 and middle laminate 78 to form indicia 54n, 54o and latent indicia 82, 84 on the ID document 10. Although not apparent in the cross sectional view of FIG. 8, our testing has shown that the indicia 54l, 54m formed on the core layer 50 can be a usable grayscale image (by usable, it is at least meant that image can be used for security purposes, such as identification or authentication). As previously described, the latent indicia 82, 84 can comprise lighter or fainter (but still visible) version of the indicia 54n, 54o.

The latent indicia 82, 84 can be advantageous as a security feature because a counterfeiter may remove the middle laminate 78 in an attempt to alter information in the middle laminate 78, but the information will still be present on the core layer 50 that has the first coating 76. Similarly, a counterfeiter may attempt to remove then replace the middle laminate 78, in order to alter information on the core layer 78, but the latent indicia 82, 84 will still be present and visible in the middle laminate 78. As those skilled in the art will appreciate, the type and placement of an indicia is formed on the core layer 50 depends on the particular type of laser used the manner in which the laser is used (e.g., pumped), and the duration of the application of laser energy.

It should be understood that although the example of FIG. 8 shows that the first coating 76 contains the effective amount of at least one of copper potassium iodide (CuKI$_3$), copper iodide (CuI), potassium iodide (KI), sodium iodide (NaI), and aluminum iodide (AlI), and the middle laminate 78 contains the effective amount of at least one of zinc sulfide (ZnS), barium sulfide (BaS), alkyl sulfonate and thioester, the positions of the two compounds in the respective first and second layers could be reversed. That is, the first coating 67 could contain the effective amount of at least one of zinc sulfide (ZnS), barium sulfide (BaS), alkyl sulfonate and thioester, and the second coating 78 could contain the effective amount of copper potassium iodide (CuKI$_3$), copper iodide (CuI), potassium iodide (Kr), sodium iodide (NaI), and aluminum iodide (AlI).

CONCLUDING REMARKS

Depending on the availability of lasers, identification documents manufactured in accordance with the invention can be produced in both over the counter and central issue environments. One example of a printing device that may be usable for at least some over the counter embodiments of the invention is the DATACARD DCL30 Desktop Card Laser Personalization System, available from Datacard Group of Minnetonka, Minn.

In one embodiment, following lamination and laser engraving, the ID document 10 is cooled and is cut (e.g., by die-cutting) to a predetermined size. In at least one embodiment, however, the substrate and laminate can be sized such that cutting the laminated printed substrate is not necessary.

The identification document 10 of the invention may be manufactured in any desired size. For example, identification documents can range in size from standard business card size (47.6.times.85.7 mm) up to identification booklet documents (127.times.177.8 mm), and can have thicknesses in the range of from about 0.3 to about 1.3 mm. At least some identification documents produced in accordance with embodiments of the invention conform to all the requirements of ISO 7810, 1985 and will thus be of the CR-80 size, 85.47-85.73 mm wide, 53.92-54.03 mm high and 0.69-0.84 mm thick. The corners of such CR-80 documents are rounded with a radius of 2.88-3.48 mm.

In addition, while the preferred embodiments have been described with reference to cyan, magenta and yellow dyes, the present invention is not so limited. The present invention can include addition color, alternative color schemes and even spot colors. Also, while the present invention has been described with reference to NIR, the inventive technique can be expanded to include dyes responsive in the ultra-violet spectrum and other IR ranges.

Further, while some of the examples above are disclosed with specific core components (e.g., TESLIN), we note that our inventive compositions, methods, articles, features, and processes can be applied to other core-based identification documents as well, including those documents manufactured from other materials. For example, where an embodiment has shown polycarbonate or polyester as an example over-laminate, those skilled in the art will appreciate that many other over laminate materials can be used as well.

We specifically contemplate that embodiments of the invention described herein will be usable and can be combined with at least some of the card structures disclosed in many of our previous patent applications, including at least commonly assigned patent application Ser. No. 60/471,429 entitled "Identification Document" (especially card structures that include polycarbonate) and in commonly assigned patent application Ser. No. 60/500,204, entitled "Identification Document with Optical Memory and Related Method of Manufacture". The contents of these patent documents are incorporated by reference in their entirety.

We also specifically contemplate that embodiments of the invention described herein will be usable and can be combined with the teachings of commonly assigned patent application Ser. No. 10/330,034, entitled "Systems, Compositions, and Methods for Full Color Laser Engraving of ID Documents".

We further specifically contemplate that embodiments of the invention described herein will be usable and can be combined with the teachings of a commonly assigned patent application filed on Sep. 15, 2003, entitled "Enhanced Shadow Reduction System and Related Technologies for Digital Image Capture", Attorney Docket No. P0883D.

The inventive coatings described herein may be used to sensitize other core components as well. Also, we note that the coating can be applied to both a document core and to an over-laminate, and that the laser engraving can be preformed in both (or either) the core and over-laminate.

To provide a comprehensive disclosure without unduly lengthening the specification, applicants herein incorporate by reference each of the patent documents referenced previously, along with U.S. Pat. Nos. 6,022,905, 5,298,922, 5,294,774, 4,652,722, 5,824,715 and 5,633,119, and U.S. patent Ser. Nos. 09/747,735 (filed Dec. 22, 2000) and 09/969,200 (filed Oct. 2, 2001).

Having described and illustrated the principles of the technology with reference to specific implementations, it will be recognized that the technology can be implemented in many other, different, forms.

Although certain words, languages, phrases, terminology, and product brands have been used herein to describe the various features of the embodiments of the invention, their use is not intended as limiting. Use of a given word, phrase, language, terminology, or product brand is intended to include all grammatical, literal, scientific, technical, and functional equivalents. The terminology used herein is for the purpose of description and not limitation.

The technology disclosed herein can be used in combination with other technologies. Examples include the technology detailed in the following applications, the disclosures of which are incorporated herein by reference: 09/747,735 (filed Dec. 22, 2000), 09/969,200 (filed Oct. 2, 2001). Also, instead of ID documents, the inventive techniques can be employed with product tags, product packaging, business cards, bags, charts, maps, labels, etc., etc., particularly those items including engraving of an over-laminate structure. The term ID document is broadly defined herein to include these tags, labels, packaging, cards, etc. In addition, while some of the examples above are disclosed with specific core components, it is noted that-laminates can be sensitized for use with other core components.

To provide a comprehensive disclosure without unduly lengthening the specification, applicant hereby incorporates by reference each of the patents and patent applications referenced above.

The particular combinations of elements and features in the above-detailed embodiments are exemplary only; the interchanging and substitution of these teachings with other teachings in this and the incorporated-by-reference patents/applications are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto.

The invention claimed is:

1. A multi-layered identification document comprising:
a core material layer;
a first laminate over the core material layer;
a second laminate over the first laminate;
a laser sensitizing additive to the first laminate including a first quantity of at least one of copper potassium iodide ($CuKI_3$), Copper Iodide (CuI), potassium iodide (KI), sodium iodide (NaI) and aluminum iodide (AlI);
a laser sensitizing additive to the second laminate including a second quantity of at least one substance related from the group comprising of zinc sulfide (ZnS), barium sulfide (BaS), alkyl sulfonate, and thioester.

2. The identification document of claim 1, further comprising a layer of material between the first and second laminates, the layer of material being transparent to laser light radiation.

3. The identification document of claim 1, wherein the core material layer includes a titanium dioxide ($TiO_2$) filled polycarbonate film.

4. The identification document of claim 1, wherein the core material layer includes preprinted information thereon.

5. The identification document of claim 1, wherein the core material layer and the first and second laminate are fused together, such fused materials deterring delamination attempts.

6. The identification document of claim 1, wherein the identification document bears a first indicium thereon, the first indicium obtained by exposing the laser sensitizing additive to a laser beam.

7. The identification document of claim 6, wherein the indicium comprises at least one of: a gray scale image, photograph, text, tactile text, graphic information, security pattern, security indicia, and digital watermark.

8. The identification document of claim 6, wherein the first indicium comprises variable information.

9. A process of making an identification document comprising: providing a core layer material; overlying a first laminate over the core material, wherein the first laminate includes a first laser sensitizing material having first quantity of at least one of copper potassium iodide (CuKI), copper iodide (CuI), potassium iodide (KI), sodium iodide (NaI) and aluminum iodide (AlI); overlying the first laminate with a second laminate, wherein the second laminate includes a second laser sensitizing material having a second quantity of at least one substance selected from the group consisting of zinc sulfide (ZnS), barium sulfide (BaS), alkyl sulfonate and thioester; and
fusing together the core laser material, the first laminate and the second laminate using at least one of heat and pressure.

10. The method of claim 9, further comprising the step of providing preprinted information on the core material layer prior to overlying the core material layer with the first laminate.

11. The method of claim 9, wherein the identification document bears a first indicium thereon, the first indicium obtained by exposing the laser sensitizing additive to a laser beam.

12. The method of claim 11, wherein the first indicium comprises variable information.

* * * * *

UNITED STATES PATENT AND TRADEMARK OFFICE
CERTIFICATE OF CORRECTION

| | | |
|---|---|---|
| PATENT NO. | : 7,980,596 B2 | Page 1 of 1 |
| APPLICATION NO. | : 12/687270 | |
| DATED | : July 19, 2011 | |
| INVENTOR(S) | : Brian C. Labrec | |

It is certified that error appears in the above-identified patent and that said Letters Patent is hereby corrected as shown below:

<u>Title page, item [57] Abstract</u>: The first word "the" should read -- The --

Signed and Sealed this
Thirtieth Day of August, 2011

David J. Kappos
*Director of the United States Patent and Trademark Office*